US012143653B2

(12) United States Patent
Jinnouchi et al.

(10) Patent No.: US 12,143,653 B2
(45) Date of Patent: Nov. 12, 2024

(54) INFORMATION PROCESSING APPARATUS, INFORMATION PROCESSING METHOD, IMAGING APPARATUS, AND IMAGE TRANSFER SYSTEM

(71) Applicant: Sony Group Corporation, Tokyo (JP)

(72) Inventors: Ryo Jinnouchi, Kanagawa (JP); Hiroshi Kanma, Chiba (JP)

(73) Assignee: Sony Group Corporation, Tokyo (JP)

( * ) Notice: Subject to any disclaimer, the term of this patent is extended or adjusted under 35 U.S.C. 154(b) by 86 days.

(21) Appl. No.: 17/928,837

(22) PCT Filed: May 25, 2021

(86) PCT No.: PCT/JP2021/019769
§ 371 (c)(1),
(2) Date: Nov. 30, 2022

(87) PCT Pub. No.: WO2021/251127
PCT Pub. Date: Dec. 16, 2021

(65) Prior Publication Data
US 2023/0179811 A1   Jun. 8, 2023

(30) Foreign Application Priority Data
Jun. 10, 2020   (JP) ................................ 2020-100971

(51) Int. Cl.
*H04N 21/239*   (2011.01)
*H04N 21/235*   (2011.01)
(52) U.S. Cl.
CPC ....... *H04N 21/2393* (2013.01); *H04N 21/235* (2013.01)

(58) Field of Classification Search
CPC ............. H04N 21/2393; H04N 21/235; H04N 1/00172; H04N 1/2125; H04N 21/23418;
(Continued)

(56) References Cited

U.S. PATENT DOCUMENTS

2004/0095396 A1 * 5/2004 Stavely .................... G09G 5/00
2006/0112413 A1   5/2006 Ando
(Continued)

FOREIGN PATENT DOCUMENTS

CN   106804014 A   6/2017
JP   2007150781 A   6/2007
(Continued)

OTHER PUBLICATIONS

International Search Report (PCT/ISA/210), International Application No. PCT/JP2021/019769, dated Jul. 27, 2021.

*Primary Examiner* — Anthony Bantamoi
(74) *Attorney, Agent, or Firm* — Michael Best & Friedrich LLP

(57) ABSTRACT

An information processing apparatus as a server apparatus that performs transfer from an imaging apparatus to a client terminal includes: a control unit that performs: initial information transfer processing of obtaining additional information on the basis of associated information and transmitting the associated information and the additional information to a client terminal in response to reception of the associated information that is information associated with an image captured by the imaging apparatus and has a smaller data amount than a captured image, and main image transfer processing of transmitting an image transmitted from the imaging apparatus to the client terminal according to request information generated by selection processing in the client terminal.

19 Claims, 52 Drawing Sheets

(58) Field of Classification Search
CPC ......... H04N 9/8205; H04N 2201/0084; H04N 2201/325; H04N 1/00244; H04N 1/32117; H04N 21/4223; H04N 21/4227; H04N 21/8153; H04N 23/661; H04N 21/47217; H04N 21/2343; H04N 5/77; H04N 21/4821; H04N 21/482
See application file for complete search history.

(56) References Cited

U.S. PATENT DOCUMENTS

| | | |
|---|---|---|
| 2010/0088368 A1 | 4/2010 | Yamane |
| 2015/0124106 A1 | 5/2015 | Tomita |
| 2016/0034497 A1* | 2/2016 | Ikeda ..................... G06F 17/30 |
| 2017/0272583 A1 | 9/2017 | Kasa |
| 2018/0052923 A1 | 2/2018 | Tudor |
| 2018/0330204 A1 | 11/2018 | Kim |

FOREIGN PATENT DOCUMENTS

| | | |
|---|---|---|
| JP | 2013175883 A | 9/2013 |
| JP | 2016123069 A | 7/2016 |

* cited by examiner

FIG. 12
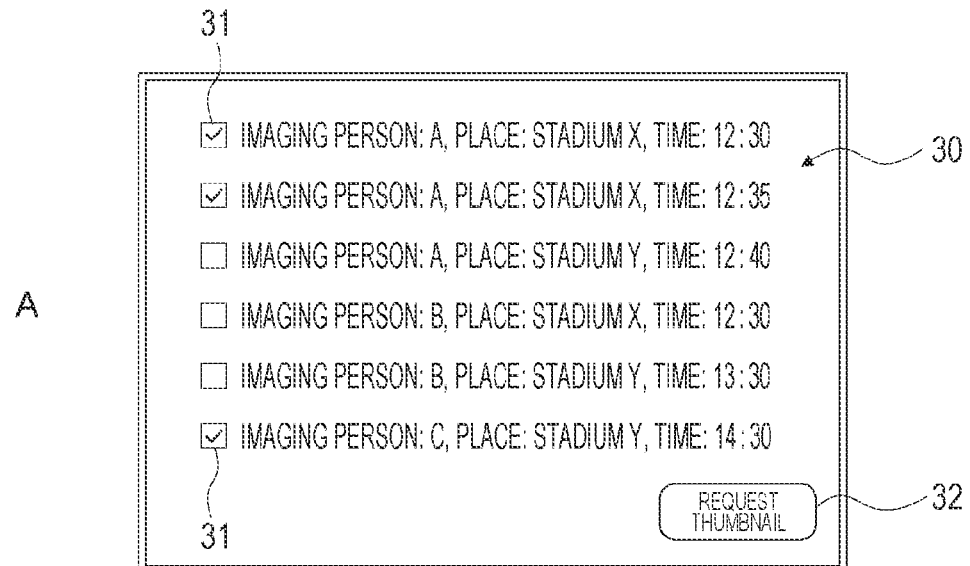
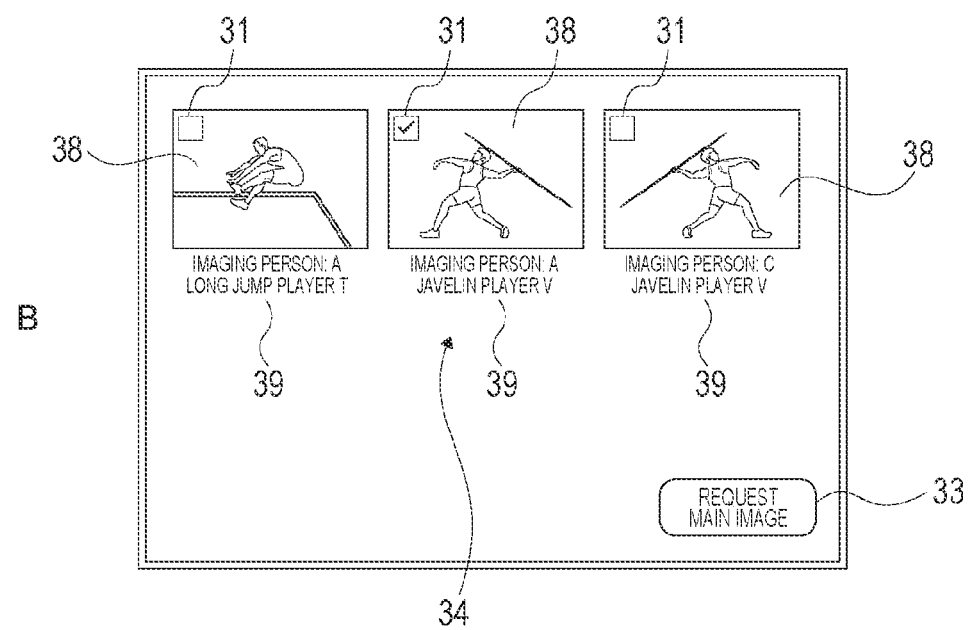
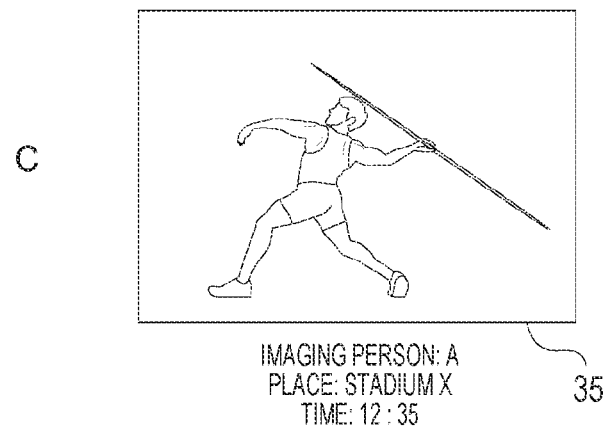

FIG. 26
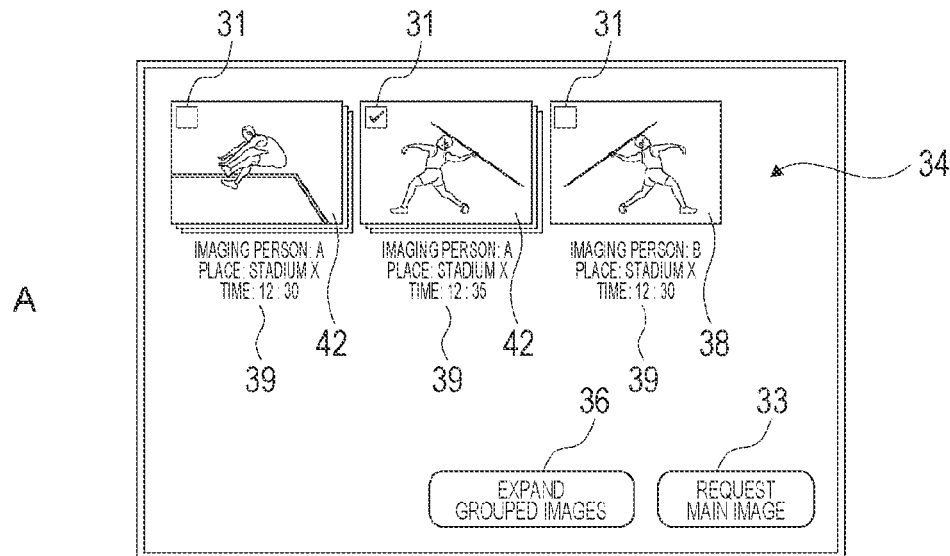
A
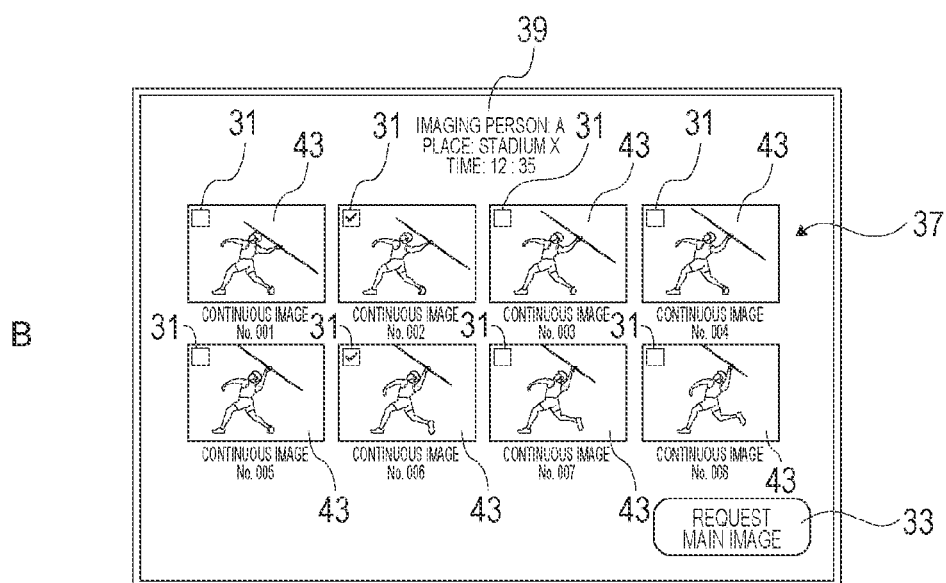
B
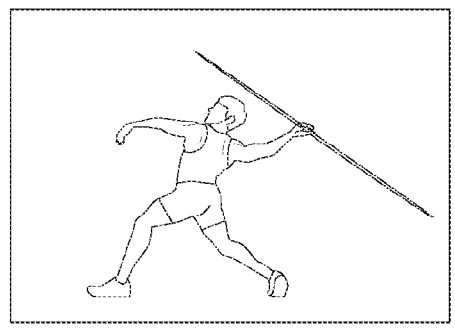
C

FIG. 31
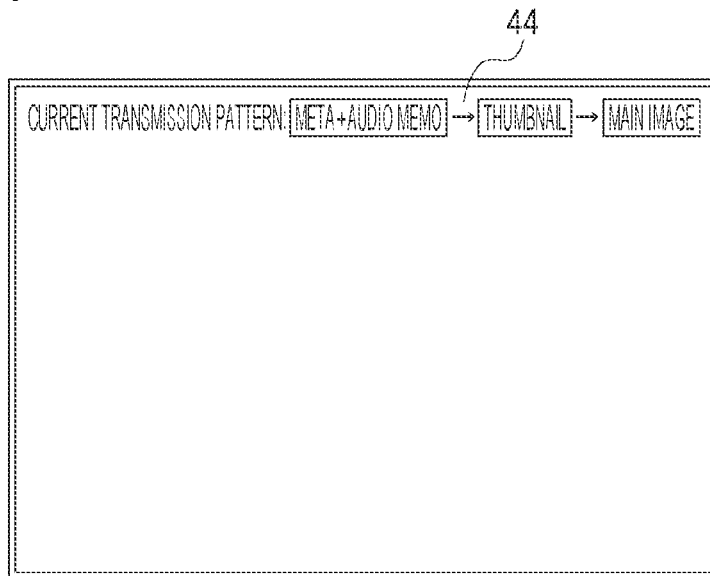
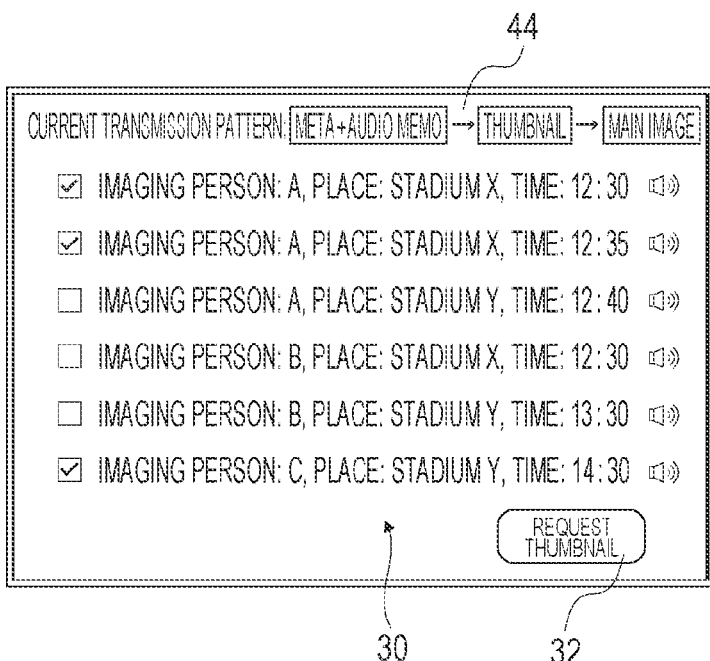
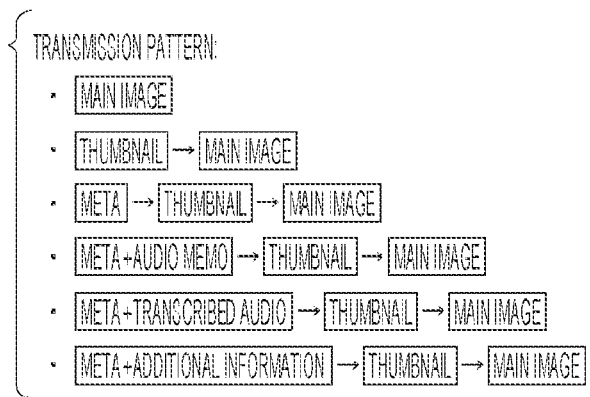

FIG. 46
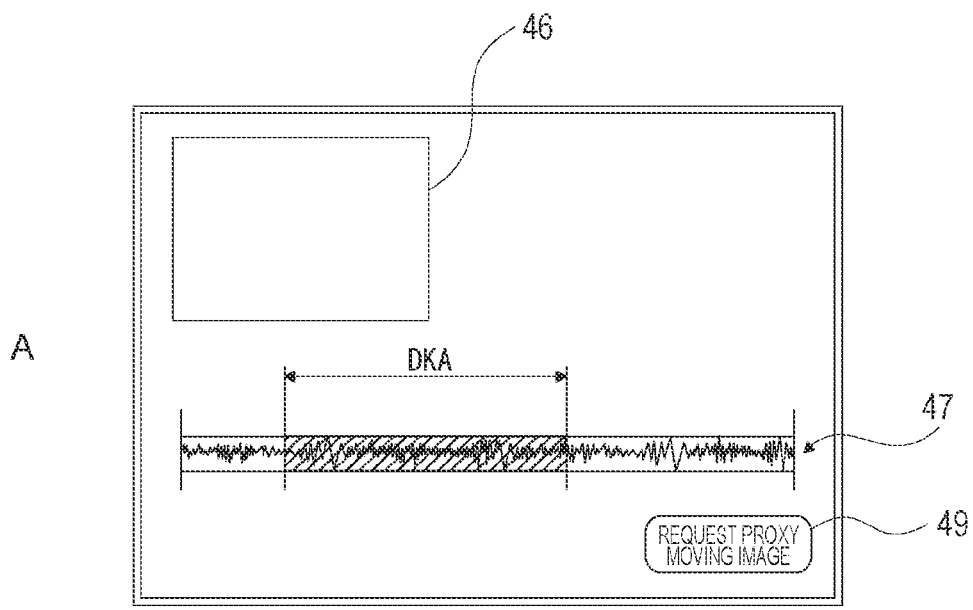
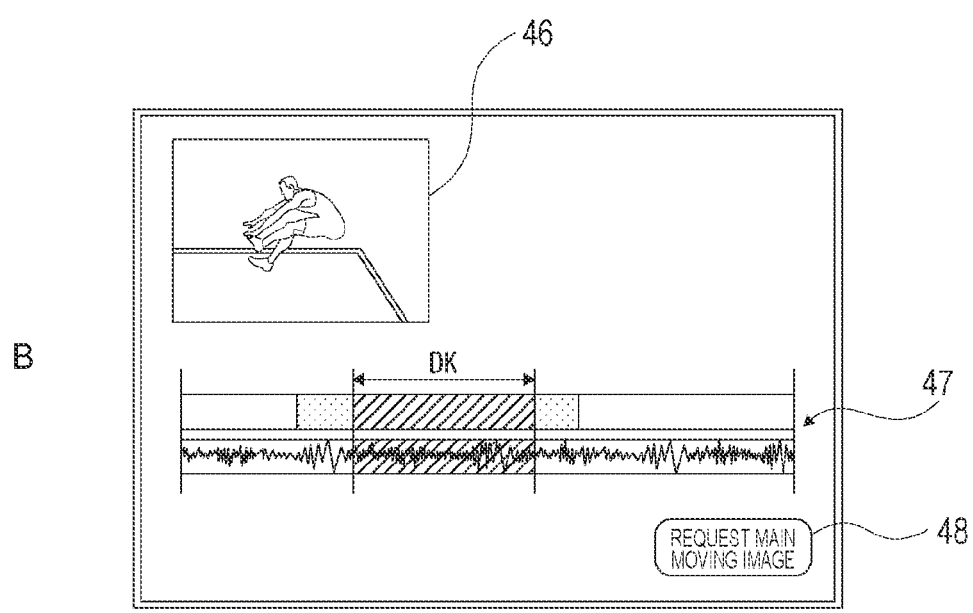

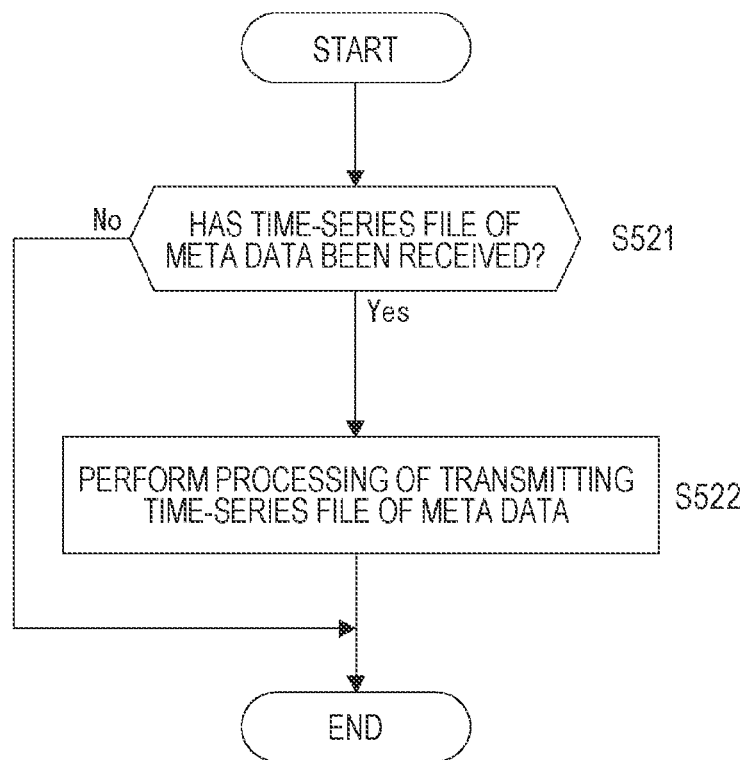

INFORMATION PROCESSING APPARATUS, INFORMATION PROCESSING METHOD, IMAGING APPARATUS, AND IMAGE TRANSFER SYSTEM

TECHNICAL FIELD

The present technology relates to an information processing apparatus, an information processing method, an imaging apparatus, and an image transfer system, and particularly relates to a technology suitable for a case where an image captured by an imaging apparatus is transferred to another apparatus.

BACKGROUND ART

It is common to transmit an image (a still image or a moving image) captured by an imaging apparatus to another apparatus, for example, a computer apparatus.

Patent Document 1 below discloses a technology of first transmitting related data having a smaller data amount with respect to image data.

CITATION LIST

Patent Document

Patent Document 1: Japanese Patent Application Laid-Open No. 2007-150781

SUMMARY OF THE INVENTION

Problems to be Solved by the Invention

For the purpose of news reporting or the like by television broadcasting, web distribution, or the like, there is a case where it is required for a camera operator to promptly deliver an imaged still image or moving image immediately after imaging on site.

In this case, the camera operator connects the imaging apparatus to the network at the imaging site, and transmits the captured image to the network for delivery. In a delivery destination apparatus (for example, an apparatus of a broadcasting station or the like and denoted as a "client terminal"), a person in charge of selection separately on standby selects delivered images, and uses the selected images for a news report.

In such a case, it may take time to transmit a large-sized image (image data of quality/data amount used for news reporting) from the imaging apparatus to an external apparatus (for example, a relaying cloud server or a client terminal) due to an increased network load, and it may take time to perform image selection work accordingly.

Furthermore, when all the captured images are transmitted from the imaging apparatus to the external apparatus, it is necessary to increase the storage capacity required for the transmission destination apparatus, and the system load increases.

Therefore, the present disclosure proposes a technology capable of transmitting an appropriate image without greatly increasing the load on network communication and a system.

Solutions to Problems

An information processing apparatus according to the present technology includes: a control unit that performs: initial information transfer processing of obtaining additional information on the basis of associated information and transmitting the associated information and the additional information to a client terminal in response to reception of the associated information that is information associated with an image captured by an imaging apparatus and has a smaller data amount than the image; and main image transfer processing of transmitting an image transmitted from the imaging apparatus to the client terminal according to request information generated by selection processing in the client terminal based on transmission of the associated information or the additional information.

For example, an information processing apparatus capable of performing information transfer with an imaging apparatus and also performing information transfer with a client terminal is assumed. The information processing apparatus first transmits associated information and additional information to the client terminal before transferring image data (main image), which is a captured image. Then, the main image is transferred from the imaging apparatus to the client terminal according to the request information obtained as a result of the selection processing based on the associated information and the additional information.

In the information processing apparatus according to the present technology described above, it is conceivable that the control unit obtains the additional information by performing database search on the basis of the associated information in the initial information transfer processing.

By performing database search on the basis of the associated information supplied from the imaging apparatus, more detailed information regarding the image (subject) can be acquired from the associated information. This is referred to as additional information.

In the information processing apparatus according to the present technology described above, it is conceivable that the associated information includes an image having a smaller data amount and representing an image captured by the imaging apparatus, and the control unit obtains the additional information by image recognition processing on an image included in the associated information in the initial information transfer processing.

In a case where the associated information supplied from the imaging apparatus includes an image such as a thumbnail image or a screen nail image, the information regarding the subject can be acquired by analyzing the image. This is referred to as additional information.

In the information processing apparatus according to the present technology described above, it is conceivable that the control unit performs, as the initial information transfer processing, switching processing of a plurality of transmission patterns including a transmission pattern to which the additional information is added and a transmission pattern to which the additional information is not added.

As the transmission pattern, for example, a plurality of transmission patterns such as a pattern in which the additional information is obtained on the basis of the associated information supplied from the imaging apparatus, and the associated information and the additional information are transmitted to the client terminal, a pattern in which the associated information supplied from the imaging apparatus is transferred to the client terminal as it is, and a pattern in which contents of the associated information are different can be changed.

In the information processing apparatus according to the present technology described above, it is conceivable that the control unit performs processing of transmitting audio information included in the associated information to the client terminal as transmission of a predetermined transmission pattern that is one of the plurality of transmission patterns.

For example, in a case where audio information associated with an image as a still image is transferred from the imaging apparatus, the audio information is transmitted as it is to the client terminal.

In the information processing apparatus according to the present technology described above, it is conceivable that the control unit performs processing of transmitting, to the client terminal, text data obtained by converting audio information included in the associated information into text data as transmission of a predetermined transmission pattern that is one of the plurality of transmission patterns.

For example, in a case where audio information associated with an image as a still image is transferred from the imaging apparatus, the audio information is converted into text data and transmitted to the client terminal.

In the information processing apparatus according to the present technology described above, it is conceivable that the control unit performs the switching processing according to a determination result of communication status.

As the initial information transfer processing, various transmission patterns are selectively used according to communication status.

In the information processing apparatus according to the present technology described above, it is conceivable that the control unit performs the switching processing on the basis of information of an imaging target a notification of which is given from the imaging apparatus.

First processing of acquiring the additional information in the initial information transfer processing and second processing of not doing it are selectively used according to, for example, an event type, a competition type, or the like as an imaging target.

In the information processing apparatus according to the present technology described above, it is conceivable that the control unit performs processing of estimating an imaging target of the imaging apparatus and performs the switching processing on the basis of information of the estimated imaging target.

When the imaging target of the imaging apparatus can be estimated, the first processing of acquiring the additional information and the second processing of not doing it can be selectively used as the initial information transfer processing on the basis of the estimation result.

In the information processing apparatus according to the present technology described above, it is conceivable that the control unit performs processing of notifying the client terminal or the imaging apparatus of a transmission pattern of the initial information transfer processing set by the switching processing.

In a case where the information processing apparatus switches between the first processing and the second processing, a notification of the transmission pattern to be executed as a result is given the imaging apparatus or the client terminal.

In the information processing apparatus according to the present technology described above, it is conceivable that the associated information includes meta information associated with an image captured by the imaging apparatus.

That is, it is information associated with an image on the imaging apparatus side and transmitted to the information processing apparatus. For example, various types of information are assumed, such as information of the imaging apparatus, information of the camera operator, information of an image capturing place and time, image analysis information on the imaging apparatus side, various parameters regarding imaging operation and processing, sensing information of various sensors in the imaging apparatus at the time of image capturing, information regarding image data/file, a thumbnail image, a screen nail image, and text information and audio memo information associated with an image by the camera operator.

In the information processing apparatus according to the present technology described above, it is conceivable that the associated information includes an image having a smaller data amount representing an image captured by the imaging apparatus.

Examples of the image having a smaller data amount include a thumbnail image, a screen nail image, a proxy moving image, and the like.

In the information processing apparatus according to the present technology described above, it is conceivable that the associated information includes an image representing grouped images that are a plurality of images continuously captured by the imaging apparatus.

When a series of images by continuous capturing is set as grouped images, an image representing the whole of the grouped images as a single image, for example, a thumbnail image of the first image, or the like is set as associated information.

In the information processing apparatus according to the present technology described above, it is conceivable that the associated information includes audio information recorded together with a moving image by moving image capturing by the imaging apparatus.

For example, in the initial information transfer processing, the information processing apparatus receives audio information recorded simultaneously at the time of moving image recording as the associated information, and transmits the information to the client terminal.

In the information processing apparatus according to the present technology described above, it is conceivable that the associated information includes time-series data at a time of capturing of a moving image captured by the imaging apparatus.

The time-series data is information representing the progress of imaging, such as, for example, position information for each time at the time of image capturing.

In the information processing apparatus according to the present technology described above, it is conceivable that, as the initial information transfer processing, the control unit performs processing of transmitting first associated information to the client terminal with the additional information or without the additional information, processing of transferring request information generated by selection processing in the client terminal based on transmission including the first associated information to the imaging apparatus, and processing of transmitting second associated information transmitted from the imaging apparatus to the client terminal according to the request information.

That is, as the initial information transfer processing, information transmission is performed a plurality of times before the main image is transmitted to the client terminal 3.

In the information processing apparatus according to the present technology described above, it is conceivable that the first associated information includes information having a smaller data amount than the second associated information.

For example, an example is conceivable in which the first associated information is meta information indicating an imaging time, an imaging place, or the like, and the second associated information is a thumbnail image or the like.

An imaging apparatus according to the present technology includes: a control unit that performs: associated information transmission processing of transmitting, to an external information processing apparatus, associated information that is information associated with a captured image and has a smaller data amount than the image; and main image transmission processing of transmitting an image indicated by request information to the information processing apparatus according to request information received from the information processing apparatus.

Therefore, the imaging apparatus transmits the associated information prior to transmission of the captured image.

An image transfer system according to the present technology enables information communication between the imaging apparatus and the information processing apparatus, and enables information communication between the information processing apparatus and the client terminal. Then, the imaging apparatus has the configuration described above, and the information processing apparatus also has the configuration described above.

Information can be transferred between the imaging apparatus and the information processing apparatus directly or via another equipment or a transmission path, and information can be transferred between the information processing apparatus and the client terminal directly or via another equipment or a transmission path. Between such equipment, first, associated information having a smaller data amount than the captured image is transferred, and selection is performed on the client terminal side. Thereafter, the main image is transmitted from the imaging apparatus to the client terminal according to the selection.

BRIEF DESCRIPTION OF DRAWINGS

FIG. 12 is an explanatory diagram of an UI screen and the like in the second transmission pattern of the embodiment.

FIG. 26 is an explanatory diagram of an UI screen and the like in the seventh transmission pattern of the embodiment.

FIG. 31 is an explanatory diagram of switching-related UI display of the embodiment.

FIG. 46 is an explanatory diagram of an UI screen and the like in the ninth transmission pattern of the embodiment.

FIG. 52 is a flowchart of processing at the time of time-series file reception of a server apparatus applicable to the tenth transmission pattern of the embodiment.

MODE FOR CARRYING OUT THE INVENTION

Embodiments will be described below in the following order.
 <1. System configuration>
 <2. Configuration of imaging apparatus, server apparatus, and client terminal>
 <3. First transmission pattern>
 <4. Second transmission pattern>
 <5. Third and fourth transmission patterns>
 <6. Fifth transmission pattern>
 <7. Sixth transmission pattern>
 <8. Seventh transmission pattern>
 <9. Switching Processing Example I>
 <10. Switching Processing Example II>
 <11. Switching Processing Example III>
 <12. Eighth transmission pattern>
 <13. Ninth transmission pattern>
 <14. Tenth transmission pattern>
 <15. Summary and variation example>

First, definitions of various terms are described.

The "image" is a term indicating various image data including both a still image and a moving image.

Figure 1:
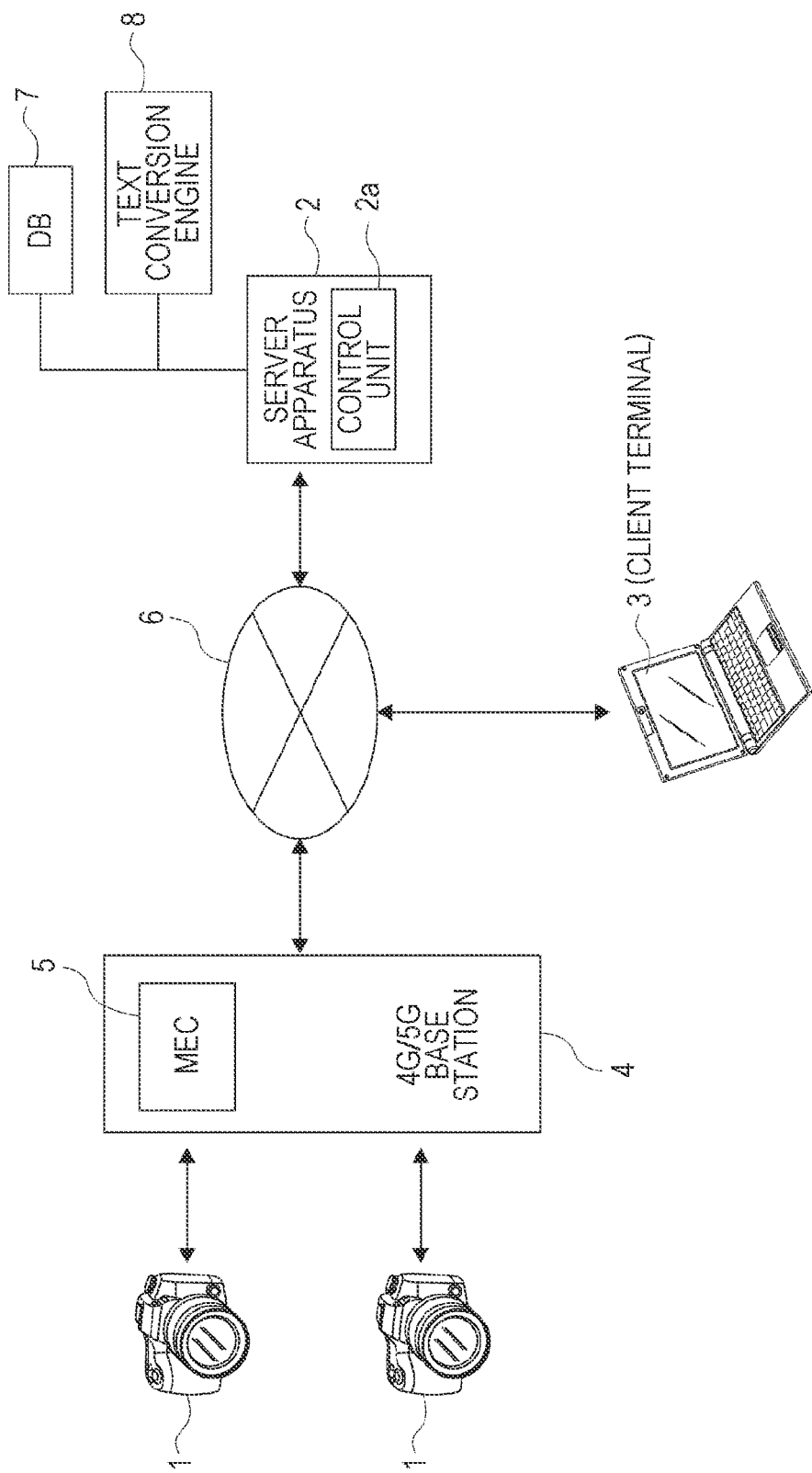
FIG. 1 is an explanatory diagram of a configuration example of an image transfer system of an embodiment of the present technology.

The "main image" indicates a target image to be delivered from an imaging apparatus 1 illustrated in FIG. 1 to a client terminal 3. The main image includes a still image and a moving image. In particular, in the case of indicating a moving image, it is described as "main moving image".

The "associated information" indicates information associated with an image imaged on the imaging apparatus 1 side regardless of the information content. Examples include so-called meta information including imaging person information about an image, a date and time, a place, various sensing data in an imaging apparatus, and the like, information of an audio memo, and an image having a data amount lower than that of the main image (thumbnail image related to a still image and a moving image, screen nail image, proxy moving image related to a moving image, or the like).

The "additional information" indicates information searched, extracted, or generated by a server apparatus 2 on the basis of the associated information regardless of the information content.

The "initial information transfer processing" indicates processing of transferring associated information and additional information before transmission of the main image. It can be performed multiple times.

The "main image transfer processing" indicates processing of transferring the main image.

The "transmission pattern" is a pattern that is a variation of a procedure leading to main image transfer between the imaging apparatus 1, the server apparatus 2, and the client terminal 3 and the information content to be transferred. In the embodiment, the first transmission pattern to the tenth transmission pattern are indicated as different transfer information contents depending on the type of information content, whether the main image is a still image, a continuously imaged image, or a moving image, or the like, and for example, various patterns such as a pattern of whether or not to perform the initial information transfer processing in each transmission pattern, a pattern of performing one-time information transfer from the imaging apparatus 1 to the client terminal 3 via the server apparatus 2, and a pattern of performing multiple-time information transfers are assumed as the initial information transfer processing.

1. System Configuration

FIG. 1 illustrates a configuration example of an image transfer system of the embodiment. The image transfer system basically includes one or a plurality of imaging apparatuses 1, a server apparatus 2, and a client terminal 3, which are communicable via a network 6.

As the imaging apparatus 1, there are various imaging apparatuses as a video camera and a still camera. The illustrated imaging apparatus 1 is assumed to be a camera used by a camera operator or a reporter in a sports or event venue, a news gathering site, or the like.

Both the server apparatus 2 and the client terminal 3 are information processing apparatuses including computer equipment, but, since the server apparatus 2 provides a service for image transfer and the client terminal 3 is an information processing apparatus of a client who uses the transfer service by the server apparatus 2, they are referred to as the "server apparatus" and the "client terminal" for distinction in the present disclosure.

The server apparatus 2 is assumed to be an apparatus that functions as a so-called cloud server. Of course, it is not limited to the aspect as a cloud server.

Although a control unit 2a is illustrated in the server apparatus 2, the control unit 2a executes the initial information transfer processing and the main image transfer processing as described later.

Furthermore, the server apparatus 2 can obtain various information with reference to a database 7 (hereinafter, the database is referred to as "DB"), and can obtain text data by executing conversion of audio data into text data using a text conversion engine 8.

The DB 7 may be a DB configured in a storage apparatus that can be locally used by the server apparatus 2, or may be a DB configured in a storage apparatus capable of searching for information via various networks. That is, the DB 7 may be any form of DB as long as it is a DB that can be accessed by the server apparatus 2 (the control unit 2a) to acquire information.

The client terminal 3 indicates an information processing apparatus to which a camera operator delivers an image, for example, a broadcasting station, a newspaper company, a communication company, or the like. The broadcasting station or the like is an example, and the delivery destination is not limited.

As the network 6, for example, the Internet, a home network, a local area network (LAN), a satellite communication network, and various other networks are assumed.

In the example of FIG. 1, the imaging apparatus 1 communicates with the server apparatus 2 via a base station 4. The base station 4 is, for example, a base station of 4G communication (fourth generation mobile communication system) and 5G communication (fifth generation mobile communication system).

There is a case where a mobile edge computing (MEC) 5 is arranged in the base station 4. There is a case where communication of each imaging apparatus 1 is performed through processing of the MEC 5, or there is also a case where some functions of the server apparatus 2 are executed by the MEC 5.

By constructing the image transfer system as illustrated in FIG. 1, for example, in a case where the user of the imaging apparatus 1 is a camera operator who performs a job of a broadcast station, a newspaper company, or the like, the image captured by the camera operator at an event venue can be transferred to the client terminal 3 installed in the broadcasting station or the like via the server apparatus 2. On the client terminal 3 side, a person in charge selects the transmitted image and uses the image for news reporting.

As described above, it is assumed that a large amount of high-definition images is transferred at a site where immediate delivery after imaging for news reporting or the like is required, and this can increase a network load and a processing load of each unit.

Furthermore, when a large amount of main images is delivered on the client terminal 3 side, the storage capacity load also increases, and it takes time for a person in charge to perform the selection work, and there is a possibility that the rapidity required for news reporting or the like is impaired.

Therefore, in the present embodiment, the server apparatus 2 divides the transfer up to the delivery of the main image into the initial information transfer processing and the main image transfer processing, thereby reducing the load of network communication, the storage capacity load, facilitating the selection work, and the like.

Moreover, by switching a transfer pattern (procedure or information content) according to a situation or the like, image transfer suitable for the point of time is performed.

2. Configuration of Imaging Apparatus, Server Apparatus, and Client Terminal

Hereinafter, configuration examples of the imaging apparatus 1, the server apparatus 2, and the client terminal 3 will be described.

Figure 2:
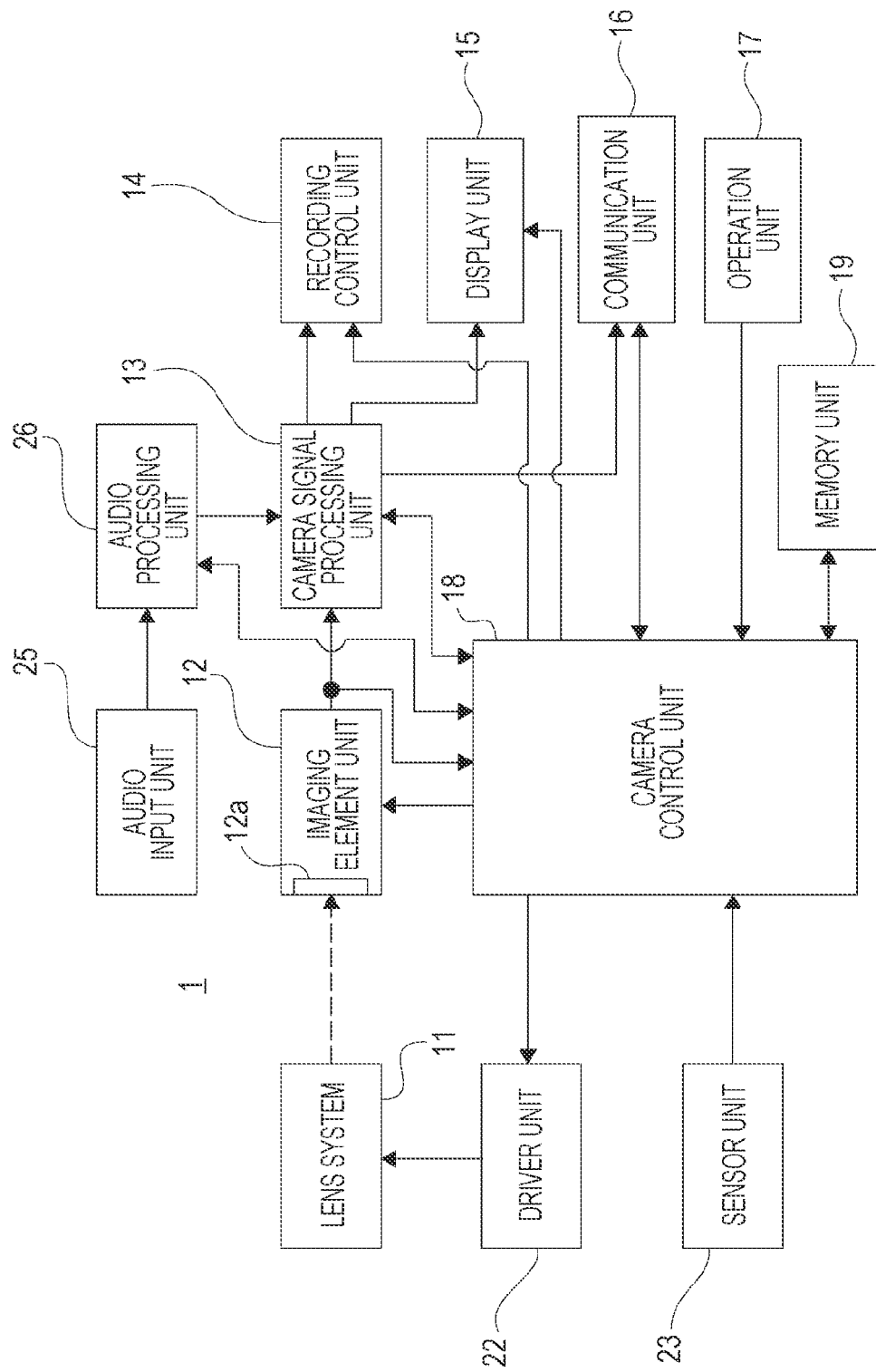
FIG. 2 is a block diagram of an imaging apparatus of the embodiment.

First, a configuration example of the imaging apparatus 1 will be described with reference to FIG. 2.

The imaging apparatus 1 includes, for example, a lens system 11, an imaging element unit 12, a camera signal processing unit 13, a recording control unit 14, a display unit 15, a communication unit 16, an operation unit 17, a camera control unit 18, a memory unit 19, a driver unit 22, a sensor unit 23, an audio input unit 25, and an audio processing unit 26.

The lens system 11 includes lenses such as a zoom lens, a focus lens, and the like, and a diaphragm mechanism. Light (incident light) from a subject is guided by the lens system 11 and condensed on the imaging element unit 12.

The imaging element unit 12 includes an image sensor 12a (imaging element) such as, for example, a complementary metal oxide semiconductor (CMOS), or a charge coupled device (CCD).

For an electrical signal obtained by performing photoelectric conversion on the light received by the image sensor 12a, the imaging element unit 12 executes, for example, correlated double sampling (CDS) processing, automatic gain control (AGC) processing, and the like, and further performs analog/digital (A/D) conversion processing. Then, a captured signal as digital data is output to the camera signal processing unit 13 or the camera control unit 18 in the subsequent stage.

The camera signal processing unit 13 is configured as an image processing processor by, for example, a digital signal processor (DSP) or the like. The camera signal processing unit 13 performs various signal processing on a digital signal (captured image signal) from the imaging element unit 12. For example, as a camera process, the camera signal processing unit 13 performs preprocessing, synchronization processing, YC generation processing, resolution conversion processing, file formation processing, and the like.

In the preprocessing, clamp processing of clamping the black level of R, G, and B to a predetermined level, correction processing between color channels of R, G, and B, and the like are performed on the captured image signal from the imaging element unit 12.

In the synchronization processing, color separation processing is performed so that the image data for each pixel has all R, G, and B color components. For example, in the case of an imaging element using a Bayer array color filter, demosaicing processing is performed as the color separation processing.

In the YC generation processing, a luminance (Y) signal and a color (C) signal are generated (separated) from R, G, and B image data.

In the resolution conversion processing, resolution conversion processing is executed on the image data on which various signal processing has been performed.

In the file formation processing, for example, the image data subjected to the above-described various processing is subjected to, for example, compression encoding for recording or communication, formatting, generation or addition of meta information, and the like to generate a file for recording or communication.

An image file in a format such as, for example, joint photographic experts group (JPEG), tagged image file format (TIFF), and graphics interchange format (GIF) is generated as a still image file. Furthermore, it is also conceivable to generate an image file as an MP4 format or the like used for recording moving images and audio conforming to MPEG-4.

Note that it is also conceivable to generate an image file as raw (RAW) image data.

The camera signal processing unit 13 generates the meta information as information including information of processing parameters in the camera signal processing unit 13, various control parameters acquired from the camera control unit 18, information indicating an operation state of the lens system 11 or the imaging element unit 12, mode setting information, imaging environment information (date and time, place, and the like), identification information of the imaging apparatus itself, information of a mounting lens, information of a previously registered camera operator (name and identification information), international press telecommunications council (IPTC) metadata, and the like.

Note that the IPTC metadata is meta information in a format designed by a media company association, and can describe various types of information such as "description/caption", "description writer", "headline", and "keyword", for example.

The recording control unit 14 performs recording and reproduction on a recording medium using, for example, nonvolatile memory. For example, the recording control unit 14 performs processing of recording image files, thumbnail images, screen nail images, and the like such as moving image data and still image data on a recording medium.

Various practical forms of the recording control unit 14 are conceivable. For example, the recording control unit 14 may be configured as flash memory built in the imaging apparatus 1 and a write/read circuit thereof. Furthermore, the recording control unit 14 may be in the form of a card recording/reproduction unit that performs recording/reproduction access to a recording medium attachable to and detachable from the imaging apparatus 1, for example, a memory card (portable flash memory or the like). Furthermore, the recording control unit 14 may be achieved as a hard disk drive (HDD) or the like as a form built in the imaging apparatus 1.

The display unit 15 is a display unit that performs various displays with respect to an image capturing person and includes, for example, a display panel or a viewfinder by a display device such as a liquid crystal display (LCD) or an organic electro-luminescence (EL) display arranged in a housing of the imaging apparatus 1.

The display unit 15 executes various displays on the display screen on the basis of an instruction from the camera control unit 18.

For example, the display unit 15 displays a reproduction image of the image data read from the recording medium in the recording control unit 14.

Furthermore, there is a case where image data of a captured image whose resolution has been converted for display by the camera signal processing unit 13 is supplied to the display unit 15, and the display unit 15 performs display on the basis of the image data of the captured image according to an instruction from the camera control unit 18. Therefore, a so-called through image (subject monitoring image), which is a captured image during composition confirmation, moving image recording, or the like is displayed.

Furthermore, the display unit 15 executes displaying various operation menus, icons, messages, and the like, i.e., display as a graphical user interface (GUI), on the screen on the basis of the instruction of the camera control unit 18.

The communication unit 16 performs data communication or network communication with external equipment by wire or wirelessly.

For example, transmission and output of captured image data (still image file or moving image file) or meta information is performed with respect to an external display apparatus, recording apparatus, reproduction apparatus, and the like.

Furthermore, the communication unit 16 as a network communication unit can perform, for example, communication via various networks 6 such as the Internet, home network, and local area network (LAN), and can perform various data transmission and reception to/from servers, terminals, and the like on the network. For example, in the case of the present embodiment, the communication unit 16 performs communication processing of transmitting captured image data (the above-described image file and the like) and meta information to the server apparatus 2.

Furthermore, the imaging apparatus 1 may be configured to be capable of mutual information communication by short-range wireless communication such as, for example, Bluetooth (registered trademark), WI-FI (registered trademark) communication, or near field communication (NFC), or infrared communication, for example, with a smartphone, a tablet terminal, or the like possessed by a camera operator or the like, by the communication unit 16. In this case, an image can be transferred via a smartphone or the like.

Furthermore, the imaging apparatus 1 and another equipment may be capable of mutual communication by wired connection communication.

The operation unit 17 collectively indicates input devices for the user to perform various operation inputs. Specifically, the operation unit 17 indicates various operators (keys, dials, touch panels, touch pads, and the like) provided in the housing of the imaging apparatus 1.

The operation of the user is sensed by the operation unit 17, and a signal corresponding to the input operation is transmitted to the camera control unit 18.

The camera control unit 18 includes a microcomputer (arithmetic processing apparatus) including a central processing unit (CPU).

The memory unit 19 stores information and the like used for processing by the camera control unit 18. As the illustrated memory unit 19, for example, read only memory (ROM), random access memory (RAM), flash memory, and the like are comprehensively illustrated.

The memory unit 19 may be a memory area built in a microcomputer chip as the camera control unit 18 or may be configured by a separate memory chip.

The camera control unit 18 executes a program stored in the ROM, the flash memory, and the like of the memory unit 19 to control the entire imaging apparatus 1.

For example, the camera control unit 18 controls the operation of each necessary unit regarding the control of the shutter speed of the imaging element unit 12, various signal processing instructions in the camera signal processing unit 13, an imaging operation or a recording operation according to a user operation, a reproduction operation of a recorded image file, an operation of the lens system 11 such as zoom, focus, and diaphragm adjustment in the lens barrel, a user interface operation, and the like.

The RAM of the memory unit 19 is used for temporarily storing data, programs, and the like as a work area when the CPU of the camera control unit 18 processes various data.

The ROM and the flash memory (nonvolatile memory) of the memory unit 19 are used to store application programs, firmware, various setting information and the like for various operations in addition to an operating system (OS) for the CPU to control each unit and content files such as image files.

The various setting information include communication setting information, exposure setting as setting information regarding imaging operation, shutter speed setting, mode setting, white balance setting and color setting as setting information regarding image processing, setting regarding image effect, custom key setting and display setting as setting information regarding operability, and the like.

The driver unit 22 is provided with, for example, a motor driver for a zoom lens drive motor, a motor driver for a focus lens drive motor, a motor driver for a motor of a diaphragm mechanism, and the like.

These motor drivers apply a drive current to a corresponding driver according to an instruction from the camera control unit 18, and execute movement of the focus lens and the zoom lens, opening and closing of the diaphragm blade of the diaphragm mechanism, and the like.

The sensor unit 23 comprehensively indicates various sensors mounted on the imaging apparatus.

For example, an inertial measurement unit (IMU) is mounted as the sensor unit 23, and, for example, an angular velocity (gyro) sensor of three axes of pitch, yaw, and roll can detect an angular velocity, and an acceleration sensor can detect an acceleration.

Furthermore, as the sensor unit 23, for example, a position information sensor, an illuminance sensor, or the like may be mounted.

The audio input unit 25 includes, for example, a microphone, a microphone amplifier, and the like, and outputs an audio signal obtained by collecting ambient audio.

The audio processing unit 26 performs processing of converting the audio signal obtained by the audio input unit 25 into a digital audio signal, AGC processing, sound quality processing, noise reduction processing, and the like. The audio data subjected to these processing is output to the camera signal processing unit 13 and the camera control unit 18.

For example, the audio data is processed as audio data accompanying a moving image in the camera control unit 18 at the time of capturing the moving image.

Furthermore, the audio data can be converted into a file as an audio file in the camera signal processing unit 13 or the camera control unit 18 as audio memo data as a so-called voice memo at the time of image capturing or the like.

The audio file can be recorded on a recording medium in association with the image file in the recording control unit 14, or can be transmitted and output together with the image file from the communication unit 16.

Figure 3:
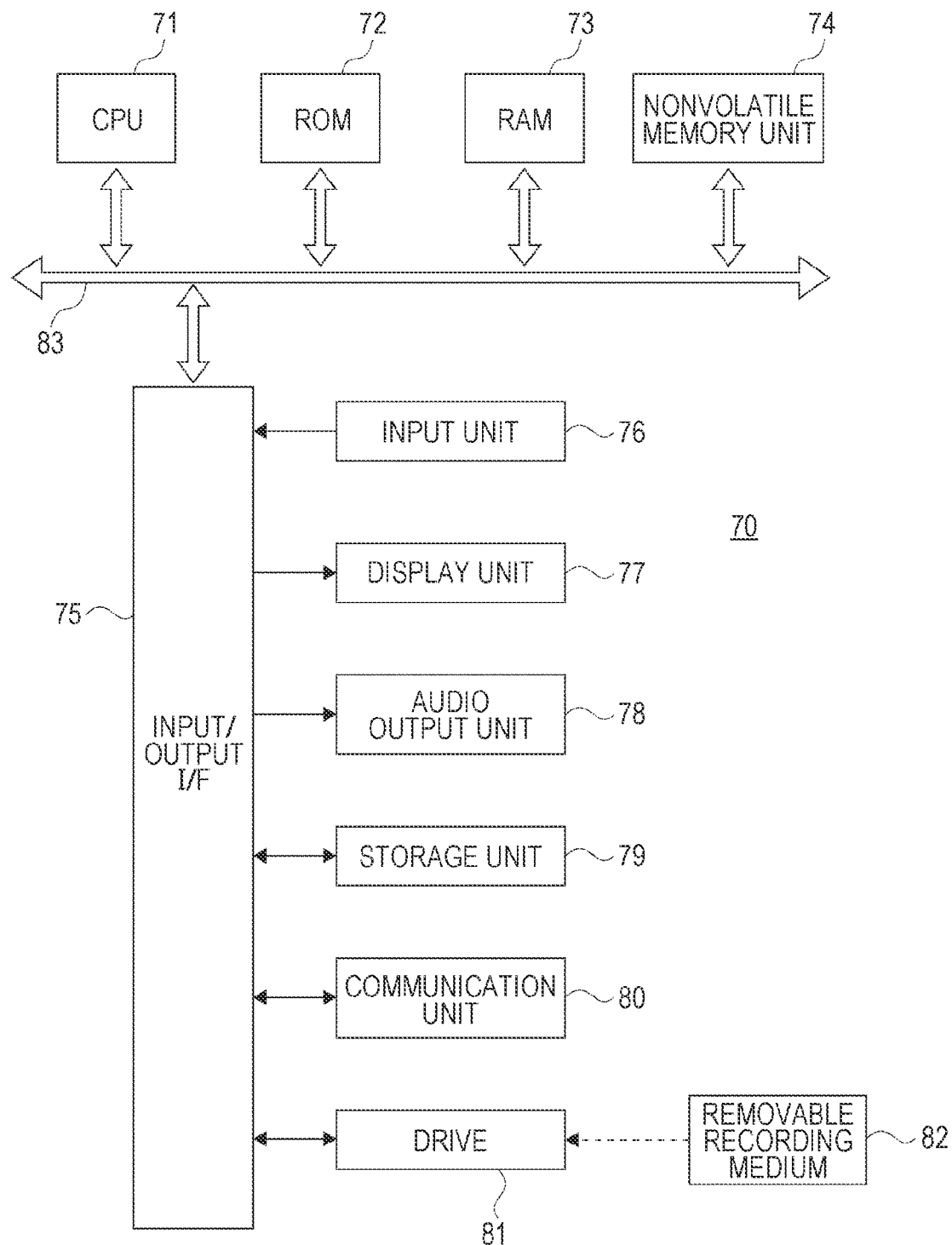
FIG. 3 is a block diagram of an information processing apparatus of the embodiment.

Next, a configuration example of an information processing apparatus 70 as the server apparatus 2 and the client terminal 3 is illustrated in FIG. 3.

A CPU 71 of the information processing apparatus 70 executes various processing according to a program stored in a nonvolatile memory unit 74 such as ROM 72 or electrically erasable programmable read-only memory (EEP-ROM), for example, or a program loaded from a storage unit 79 to RAM 73. Data or the like required for the CPU 71 to execute various processing is also stored in the RAM 73 as appropriate.

The CPU 71, the ROM 72, the RAM 73, and the nonvolatile memory unit 74 are connected to one another via a bus 83. An input/output interface 75 is also connected to the bus 83.

An input unit 76 including an operator and an operation device is connected to the input/output interface 75.

For example, as the input unit 76, various operators and operation devices such as a keyboard, a mouse, a key, a dial, a touch panel, a touch pad, and a remote controller, are assumed.

The operation of the user is sensed by the input unit 76, and a signal corresponding to the input operation is interpreted by the CPU 71.

Furthermore, a display unit 77 including an LCD, an organic EL panel, or the like, and an audio output unit 78 including a speaker or the like are connected to the input/output interface 75 integrally or separately.

The display unit 77 is a display unit that performs various displays, and includes, for example, a display device provided in a housing of the information processing apparatus 70, a separate display device connected to the information processing apparatus 70, or the like.

The display unit 77 executes display of an image for various image processing, a moving image to be processed, and the like on a display screen on the basis of an instruction from the CPU 71. Furthermore, the display unit 77 displays various operation menus, icons, messages, and the like, that is, displays as a graphical user interface (GUI) on the basis of an instruction from the CPU 71.

There may be a case where the input/output interface 75 is connected to the storage unit 79 including a hard disk, solid-state memory, or the like and a communication unit 80 including a modem or the like.

The communication unit 80 performs communication processing via a transmission path such as the Internet, or performs communication by wire/wireless communication, bus communication, or the like with various equipment.

A drive 81 is also connected to the input/output interface 75 as necessary, a removable recording medium 82 such as a magnetic disk, an optical disk, a magneto-optical disk, or semiconductor memory is appropriately mounted.

By the drive 81, a data file such as an image file, various computer programs, and the like can be read from the removable recording medium 82. The read data file is stored in the storage unit 79, and images and audio included in the data file are output by the display unit 77 and the audio output unit 78. Furthermore, the computer program and the like read from the removable recording medium 82 are installed in the storage unit 79 as necessary.

In the information processing apparatus 70, for example, software for processing of the present embodiment can be installed via network communication by the communication unit 80 or the removable recording medium 82. Alternatively, the software may be stored in advance in the ROM 72, the storage unit 79, or the like.

For example, in a case where the information processing apparatus 70 is the server apparatus 2, software for transfer processing including the initial information transfer processing and the main image transfer processing to be described below, switching processing of a transmission pattern in the transfer processing, and the like is installed. In that case, the CPU 71 functions as the control unit 2a in FIG. 1 and performs necessary processing. Furthermore, various communication described below are performed via the communication unit 80.

Furthermore, in a case where the information processing apparatus 70 is the client terminal 3, interface processing using the input unit 76, the display unit 77, and the like is executed under the control of the CPU 71 in the course of transfer processing described below. Furthermore, various communications are performed via the communication unit 80.

3. First Transmission Pattern

Various transmission patterns as image transfer processing performed from the imaging apparatus 1 to the client terminal 3 via the server apparatus 2 will be described.

Figure 4:
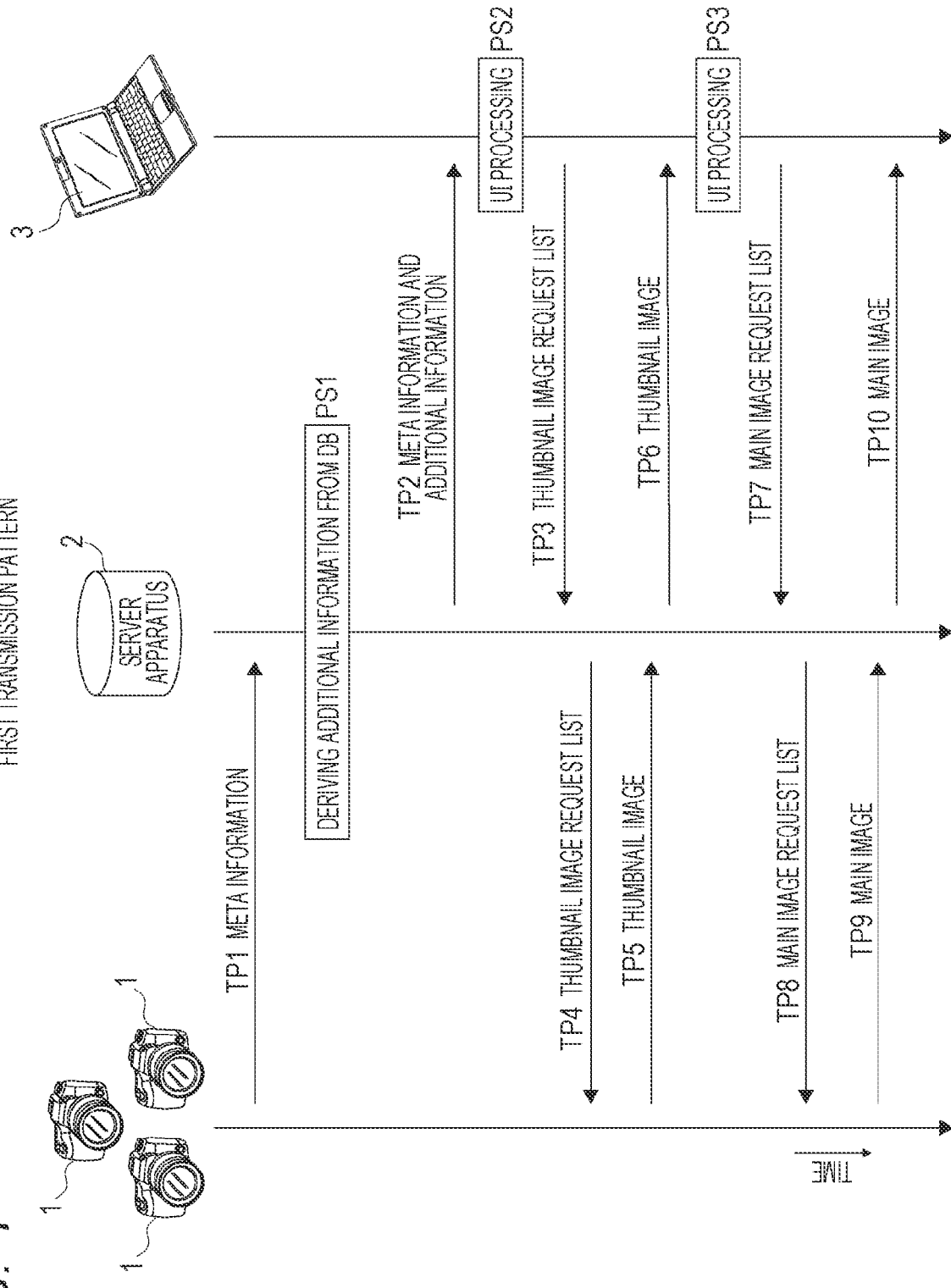
FIG. 4 is an explanatory diagram of a first transmission pattern of the embodiment.

FIG. 4 illustrates a communication procedure and information contents as the first transmission pattern of image transfer.

Note that, in the diagrams of the first transmission pattern to the tenth transmission pattern to be described below, transmission and reception between the imaging apparatus 1, the server apparatus 2, and the client terminal 3 are indicated by arrows with reference signs TP ("" is a numerical value), and processing of each apparatus is indicated by reference sign PS as in FIG. 4**. The vertical direction (from top to bottom) in the diagram corresponds to the progression of time.

The first transmission pattern illustrated in FIG. 4 is performed in the procedure described below.

Communication TP10

The imaging apparatus 1 transmits the meta information to the server apparatus 2 as the associated information regarding the captured image. At this point of time, the main image is not transmitted.

The imaging apparatus 1 transmits meta information regarding one or a plurality of images, for example, according to an operation of a camera operator.

Processing PS1

The server apparatus 2 searches the DB 7 on the basis of the received meta information of each image and derives additional information. For example, in a case where the imaging place and time are obtained as the meta information, there is a case where a competition content and a player name can be specified by searching the DB 7 using the imaging place and time. The competition name, the player name, and the like thus obtained are examples of the additional information.

In this way, on the basis of the meta information of some content transmitted from the imaging apparatus 1, the server apparatus 2 sets various information obtained by the DB search as the additional information.

Furthermore, in the processing PS1, it is assumed that the DB search is performed for each piece of the meta information regarding the plurality of images transmitted from the imaging apparatus 1 to obtain the additional information.

Communication TP2

The server apparatus 2 transmits a pair of the meta information and the additional information regarding each image to the client terminal 3.

Processing PS2

The client terminal 3 performs user interface (UI) processing using the received meta information and additional information.

Figure 5:
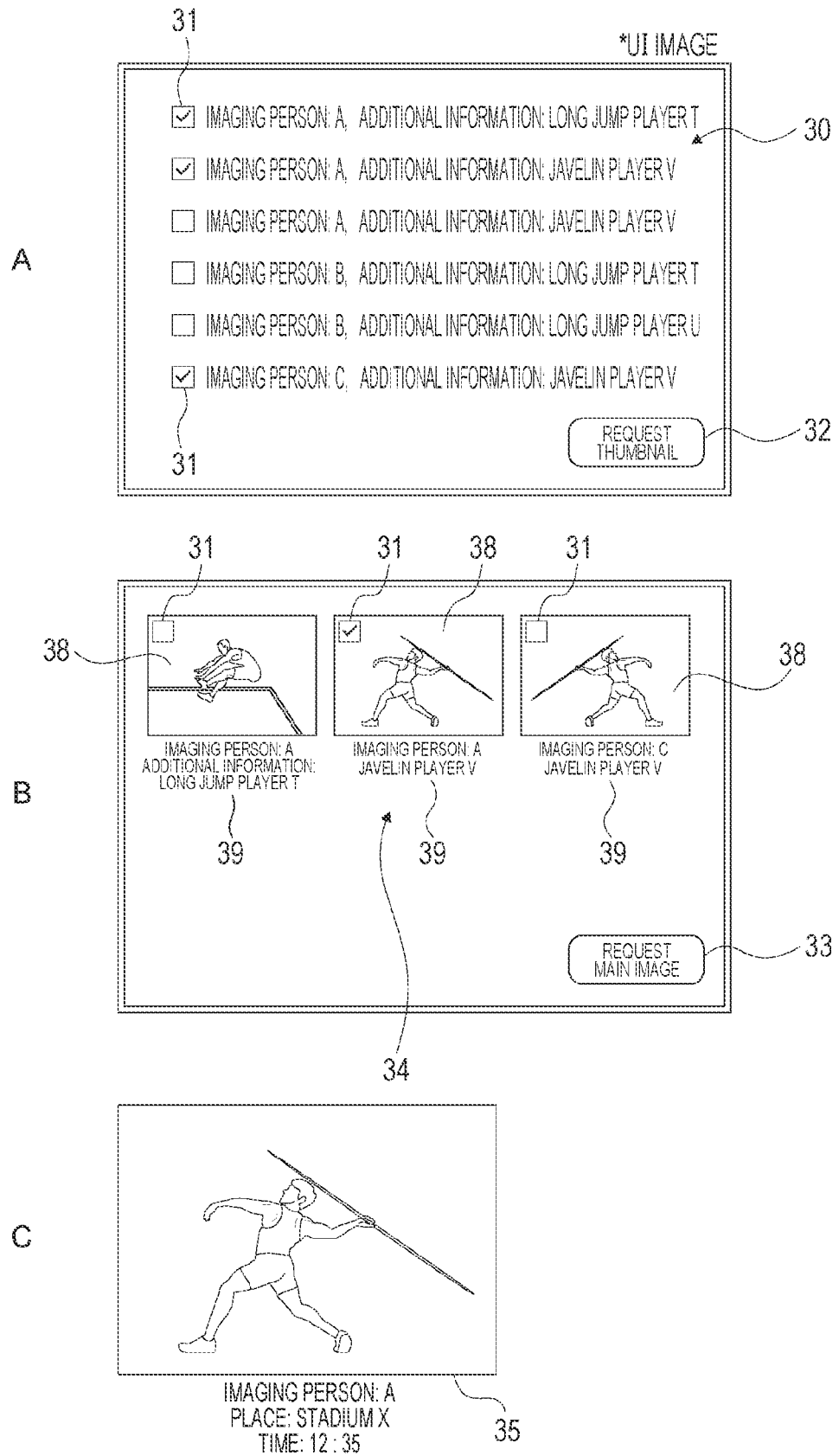
FIG. 5 is an explanatory diagram of an UI screen and the like in the first transmission pattern of the embodiment.

For example, the client terminal 3 executes display as illustrated in FIG. 5A on the display unit 77. In this example, it is assumed that information of a camera operator (imaging person), an imaging time, and an imaging place are included in the meta information, and a competition name and a player name are extracted as the additional information on the basis of the imaging time and the imaging place. An information content list 30 corresponding to each image is displayed on the basis of such meta information and additional information. FIG. 5A illustrates an example in which, for example, information of the imaging person included in the meta information and the competition name and the player name obtained as the additional information are displayed in a list as the information corresponding to six images.

Furthermore, a check box 31 is arranged corresponding to each piece of information so that a person in charge on the client terminal 3 side can perform a selection operation.

Moreover, a thumbnail request button 32 is displayed so that the person in charge can operate it.

Such a UI screen is performed for the person in charge of the client terminal 3 to first check only the information content corresponding to the image and roughly select a necessary image.

FIG. 5A illustrates a state in which the person in charge checks the check boxes 31 for the first, second, and sixth pieces of information in the information content list 30.

Furthermore, when the thumbnail request button 32 is operated in this state, it is assumed that the person in charge requests the thumbnail images of the images corresponding to the first, second, and sixth pieces of information.

Such an operation is an operation in a case where the person in charge confirms the meta information and the additional information and tries to confirm what kind of image content these actually are with the thumbnails.

In the processing PS2, the CPU 71 of the client terminal 3 controls the display of such UI screen and senses the input by the person in charge corresponding to it.

Note that, for example, a thumbnail/screen nail is known to indicate the image content with a small amount of data with low resolution, but the term "thumbnail" in the present disclosure broadly refers to an image indicating a main image (a still image or a moving image) with a still image with low resolution, such as an image generally called a thumbnail/screen nail.

Communication TP3

The client terminal 3 transmits a thumbnail image request list to the server apparatus 2. That is, in response to the check of the check box 31 and the operation of the thumbnail request button 32 by the person in charge in the UI processing of the processing PS2, the client terminal 3 generates the thumbnail image request list including the list information of the images corresponding to the checked information and the information requesting the thumbnails, and transmits the thumbnail image request list.

Communication TP4

The server apparatus 2 transfers the thumbnail image request list received from the client terminal 3 to the imaging apparatus 1.

Communication TP5

In response to receiving the thumbnail image request list, the imaging apparatus 1 transmits thumbnail images of one or a plurality of images listed in the thumbnail image request list to the server apparatus 2.

Communication TP6

The server apparatus 2 transfers the thumbnail image received from the imaging apparatus 1 to the client terminal 3.

Processing PS3

The client terminal 3 performs UI processing using the received thumbnail image.

For example, the client terminal 3 executes display of a thumbnail list 34 as illustrated in FIG. 5B on the display unit 77. That is, a list of received thumbnail images 38 is displayed.

Furthermore, as in the example of the diagram, it is favorable that all or a part of the meta information and the additional information regarding each thumbnail image 38 be displayed as associated/additional information 39.

Furthermore, a check box 31 is arranged corresponding to each thumbnail image 38 so that the person in charge on the client terminal 3 side can perform a selection operation.

Moreover, a main image request button 33 is displayed so that the person in charge can operate it.

Such a UI screen is displayed in order for the person in charge of the client terminal 3 to finally select a necessary image while confirming the image content of the image roughly selected on the screen of FIG. 5A described above by the thumbnail image 38.

FIG. 5B illustrates a state in which the person in charge checks the check box 31 for the thumbnail image 38 at the center.

When the main image request button 33 is operated in this state, it is assumed that the person in charge requests the main image corresponding to the thumbnail image.

In the processing PS3, the CPU 71 of the client terminal 3 controls the display of such UI screen and senses the input by the person in charge corresponding to it.

Communication TP7

The client terminal 3 transmits a main image request list to the server apparatus 2. That is, in response to the check of the check box 31 and the operation of the main image request button 33 by the person in charge in the UI processing of the processing PS3, the client terminal 3 generates the main image request list including the list information of the images corresponding to the checked thumbnails and the information requesting the main image, and transmits the main image request list.

Communication TP8

The server apparatus 2 transfers the main image request list received from the client terminal 3 to the imaging apparatus 1.

Communication TP9

In response to receiving the main image request list, the imaging apparatus 1 transmits main images of one or a plurality of images listed in the main image request list to the server apparatus 2.

Communication TP10

The server apparatus 2 transfers the main image received from the imaging apparatus 1 to the client terminal 3.

Therefore, a main image 35 in FIG. 5C is delivered to the client terminal 3.

As described above, instead of transferring the main image 35 from the beginning, first, rough image selection based on the meta information and the additional information is performed as the first round trip, and subsequently, image selection using the thumbnail image 38 is performed as the second round trip. The server apparatus 2 executes the relaying processing so far as the initial information transfer processing.

Then, the server apparatus 2 finally transfers the main image listed in the main image request list by the selection in the initial information transfer processing from the imaging apparatus 1 to the client terminal 3 by the main image transfer processing.

In this way, it is possible to select and transfer the main image required by the person in charge of the client terminal 3 instead of transferring all of the large number of main images captured by the imaging apparatus 1 to the client terminal 3, and a series of transfers is extremely efficient.

Processing examples of the imaging apparatus 1 and the server apparatus 2 for realizing each communication TP and processing PS illustrated in FIG. 4 will be described.

Figure 6:
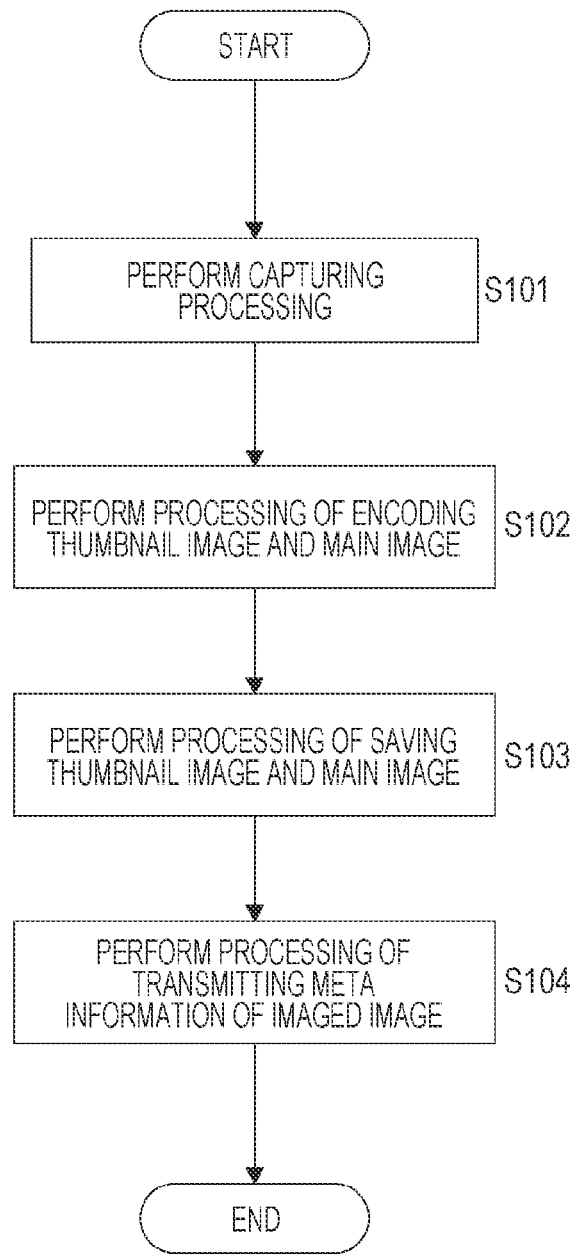
FIG. 6 is a flowchart of processing at the time of imaging by an imaging apparatus applicable to first, second, third, and fourth transmission patterns of the embodiment.

As processing for the communication TP1, processing at the time of imaging of the imaging apparatus 1 is illustrated in FIG. 6. The processing of the imaging apparatus 1 mainly indicates control processing of the camera control unit 18.

The camera control unit 18 of the imaging apparatus 1 controls the capturing processing in step S101 of FIG. 6. That is, the camera control unit 18 controls the necessary units of FIG. 2 so that image capturing/recording is performed according to the operation of the camera operator. For example, the camera control unit 18 causes the imaging element unit 12 and the camera signal processing unit 13 to execute image signal processing of a still image, associated meta information generation, and the like.

In step S102, the camera control unit 18 causes the camera signal processing unit 13 to execute encoding processing of the thumbnail image and the main image.

In step S103, the camera control unit 18 causes the recording control unit 14 to record the thumbnail image and the main image (including the meta information) on the recording medium.

In step S104, the camera control unit 18 causes the communication unit 16 to execute processing of transmitting the meta information of the imaged image.

The processing of step S104 is executed, for example, in accordance with the transmission operation of the camera operator. For example, the camera control unit 18 executes the processing in response to the camera operator selecting an individual image or an image folder for transmission (delivery to the client terminal 3) from among the images imaged and recorded on the recording medium and performing the transmission operation. The camera control unit 18 causes the communication unit 16 to transmit corresponding meta information for one or a plurality of images selected as to be transmitted by the camera operator.

Through the above processing, the communication TP1 of FIG. 4 is performed.

Figure 7:
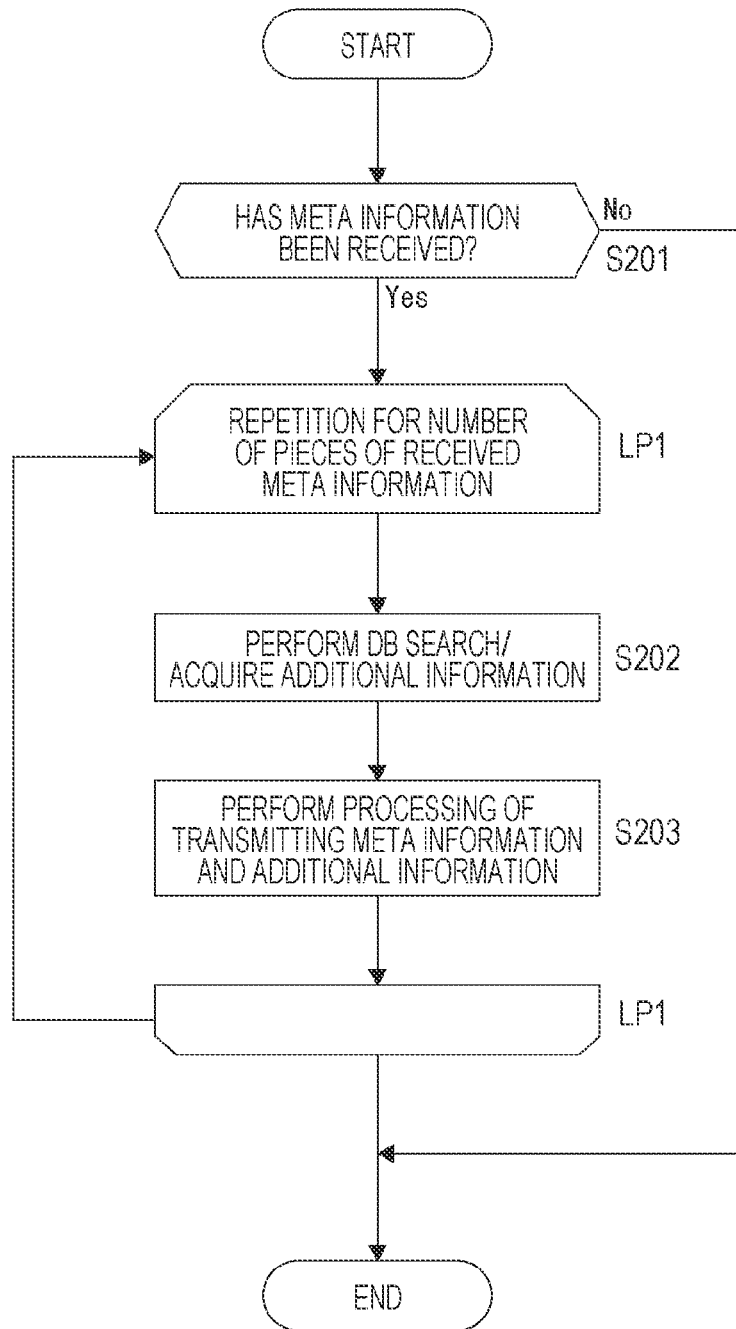
FIG. 7 is a flowchart of processing at the time of meta information reception of a server apparatus applicable to the first transmission pattern of the embodiment.

The processing of the server apparatus 2 for the processing PS1 and the communication TP2 of FIG. 4 is illustrated in FIG. 7. Note that control processing of the control unit 2a is illustrated as the processing of the server apparatus 2.

In step S201, the control unit 2a checks the reception of the meta information from the imaging apparatus 1.

Then, when the meta information is received, the control unit 2a executes loop processing LP1.

In the loop processing LP1, steps S202 and S203 are performed for the meta information of each image transmitted from the imaging apparatus 1. For example, in a case where the meta information is received for ten images, the pieces of processing are performed on each image.

In step S202, the control unit 2a performs DB search processing on the basis of the meta information and acquires the additional information. For example, in a case where the information of the imaging position and the imaging time is transmitted as the meta information for one image as described above, the control unit 2a performs DB search on the basis of the information of the imaging position and the imaging time and acquires the additional information such as, for example, a competition name and a player name.

In step S203, the control unit 2a performs processing of transmitting the meta information and the additional information regarding the image to the client terminal 3.

The control unit 2a performs the processing of steps S202 and S203 for each image in the loop processing LP1, so that the meta information transmitted by the imaging apparatus 1 for each image and the corresponding additional information are transmitted to the client terminal 3.

In response to this, the client terminal 3 side performs the UI processing as the processing PS2 as described above, and transmits the thumbnail image request list as the communication TP3.

Figure 8:
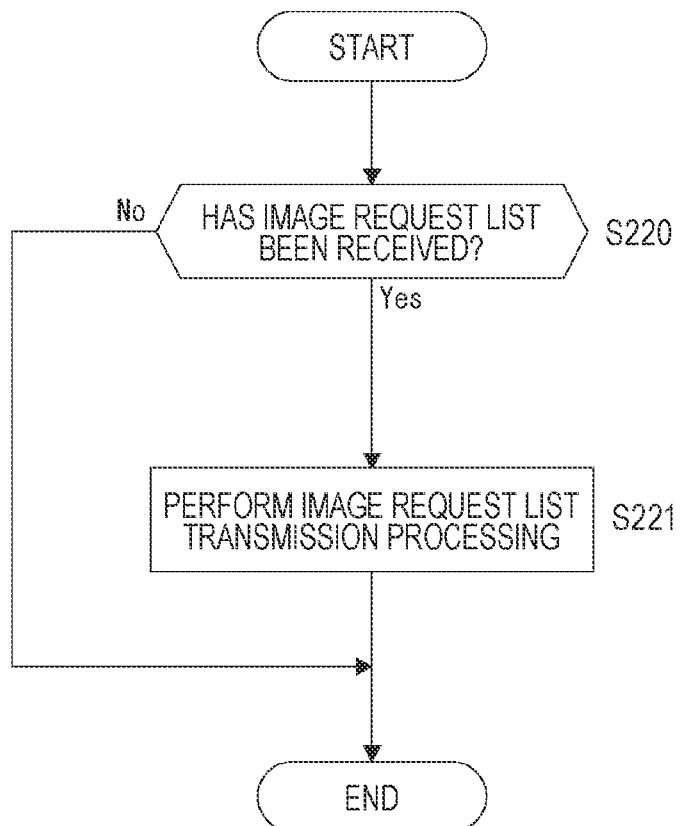
FIG. 8 is a flowchart of processing at the time of image request reception of a server apparatus applicable to first to seventh transmission patterns of the embodiment.

FIG. 8 illustrates processing of the server apparatus 2 for the communication TP4 according to the thumbnail image request list.

In step S220, the control unit 2a of the server apparatus 2 checks the reception of an image request list. The image request list mentioned herein is, for example, the thumbnail image request list or the main image request list. In the transmission patterns to be described later, there may be a case where it is information such as grouped image request information, a request of a partial clip of a main moving image, and a request of a partial clip of a proxy moving image.

In the case of the first transmission pattern of FIG. 4, when the thumbnail image request list or the main image request list is received, the control unit 2a executes the processing of step S221.

In step S221, the control unit 2a performs processing of transferring the received image request list to the imaging apparatus 1. Therefore, the thumbnail image request list is transferred as the communication TP4.

Figure 9:
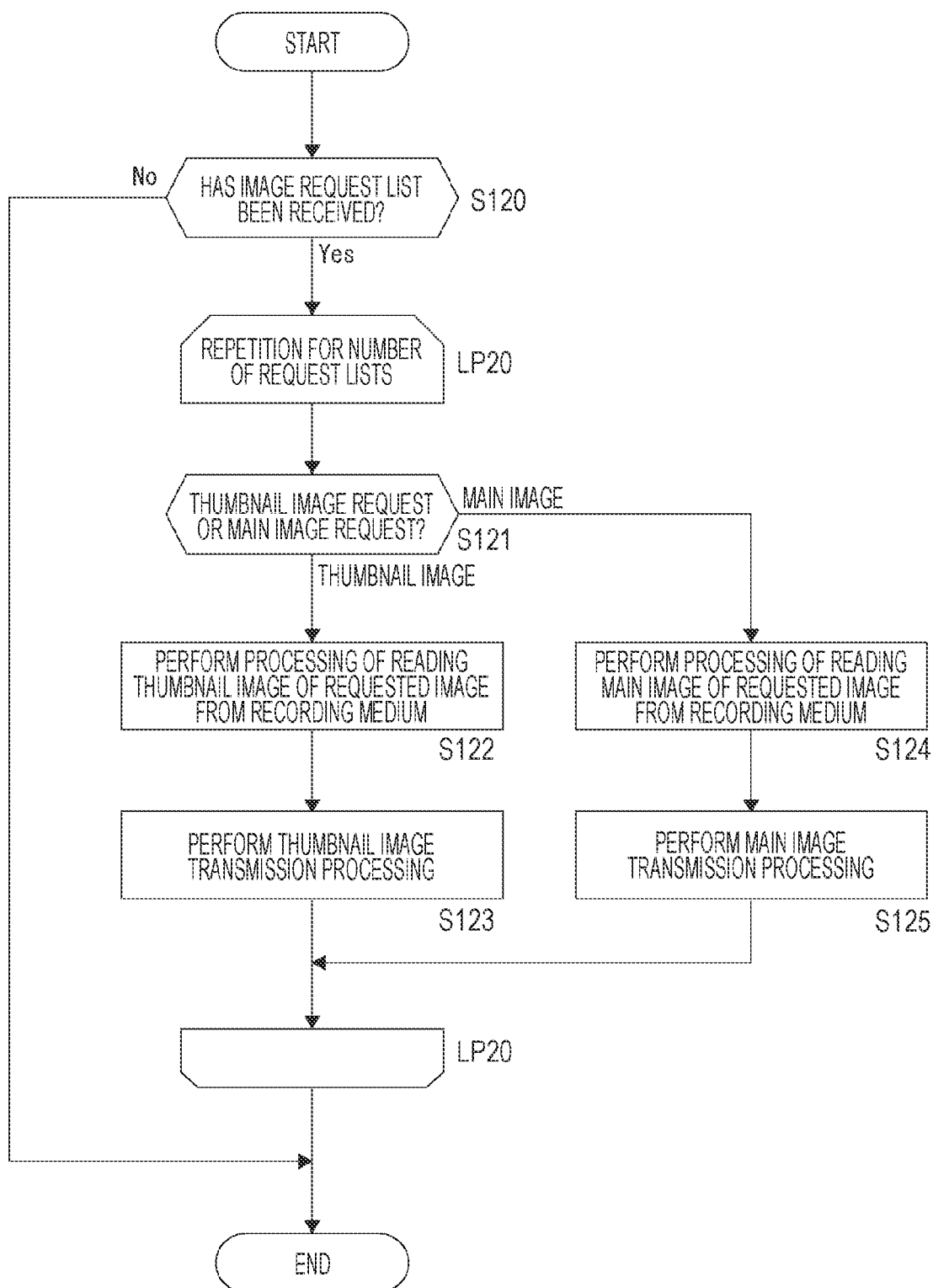
FIG. 9 is a flowchart of processing at the time of image request reception of an imaging apparatus applicable to the first to sixth transmission patterns of the embodiment.

The processing of the imaging apparatus 1 for the communication TP5 is illustrated in FIG. 9.

In step S120, the camera control unit 18 checks the reception of the image request list from the server apparatus 2.

Then, when the image request list is received, the camera control unit 18 executes loop processing LP20.

In the loop processing LP20, the camera control unit 18 repeats the processing of steps S121 to 3125 for the number of images related to the request listed in the image request list.

First, in step S121, the camera control unit 18 determines whether the image request list is a thumbnail image request list or a main image request list, and branches the processing.

In a case where the image request list is the thumbnail image request list, the camera control unit 18 causes the recording control unit 14 to execute reading of the thumbnail image for one image included in the request from the recording medium in step S122.

Then, in step S123, the camera control unit 18 performs processing of transmitting the thumbnail image read from the recording medium to the server apparatus via the communication unit 16.

In a case where the image request list is the main image request list, the camera control unit 18 causes the recording control unit 14 to execute reading of the main image for one image included in the request from the recording medium in step 3124.

Then, in step S125, the camera control unit 18 performs processing of transmitting the main image read from the recording medium to the server apparatus 2 via the communication unit 16.

The above processing is performed for each image related to the request listed in the image request list, and transmission of the thumbnail image or the main image related to the image request list is executed.

Regarding the communication TP5, the thumbnail image is transmitted according to the thumbnail image request list.

Figure 10:
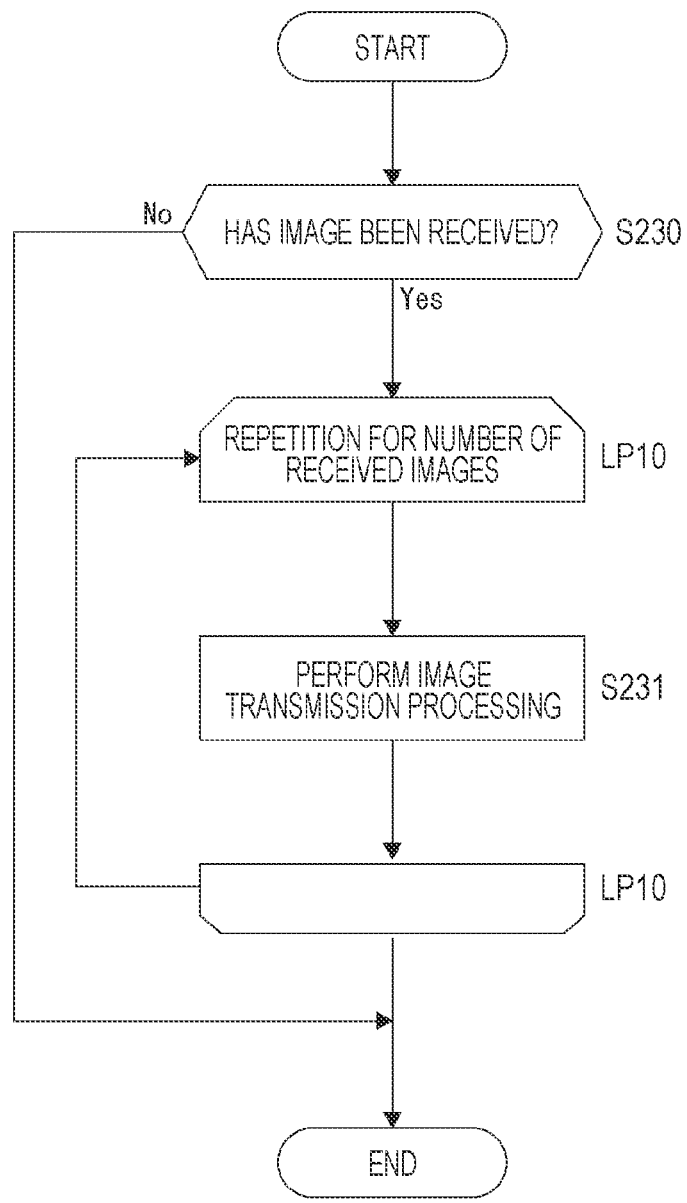
FIG. 10 is a flowchart of processing at the time of image reception of a server apparatus applicable to the first and third to seventh transmission patterns of the embodiment.

The processing of the server apparatus 2 for the communication TP6 is illustrated in FIG. 10.

In step S230, the control unit 2a of the server apparatus 2 checks the reception of an image from the imaging apparatus 1. The image referred to herein is, for example, a thumbnail image or a main image.

Then, when the image is received, the control unit 2a executes loop processing LP10.

In the loop processing LP10, the control unit 2a repeats the processing of step S231 for the number of received images.

In step S231, the control unit 2a performs processing of transmitting the received image to the client terminal 3.

Therefore, as the communication TP6, in a case where one or a plurality of thumbnail images from the imaging apparatus 1 is received, the server apparatus 2 transfers them to the client terminal 3.

In response to this, the client terminal 3 side performs the UI processing as the processing PS3 as described above, and transmits the main image request list as the communication TP7.

The processing of the server apparatus 2 for the communication TP8 according to the main image request list is as illustrated in FIG. 8 described above.

Furthermore, the processing of the imaging apparatus 1 that has received the main image request list by the communication TP8 is as illustrated in FIG. 9. That is, steps S124 and S125 in FIG. 9 are performed on the image related to the request listed in the main image request list, so that transmission of the main image related to the main image request list is executed as the communication TP9.

Furthermore, the processing of the server apparatus 2 for the communication TP10 is illustrated in FIG. 10. In a case where one or a plurality of main images from the imaging apparatus 1 is received, the server apparatus 2 transfers them to the client terminal 3 in the processing of step S231.

Note that the image request list transmitted to the imaging apparatus 1 in the communication TP5 or the communication TP7 may include information of transmission priority. For example, when requesting a plurality of images, the person in charge can set the level of priority level. Then, the order is set in the image request list, and the imaging apparatus 1 performs image transmission in the order according to the priority level. Therefore, it is possible to deliver an image with high necessity as soon as possible. This is also applicable to the case of each transmission pattern described below.

4. Second Transmission Pattern

The second communication pattern will be described. Note that, in the following, points different from the above-described communication patterns will be mainly described for each communication pattern, and details of similar portions will be omitted.

Figure 11:
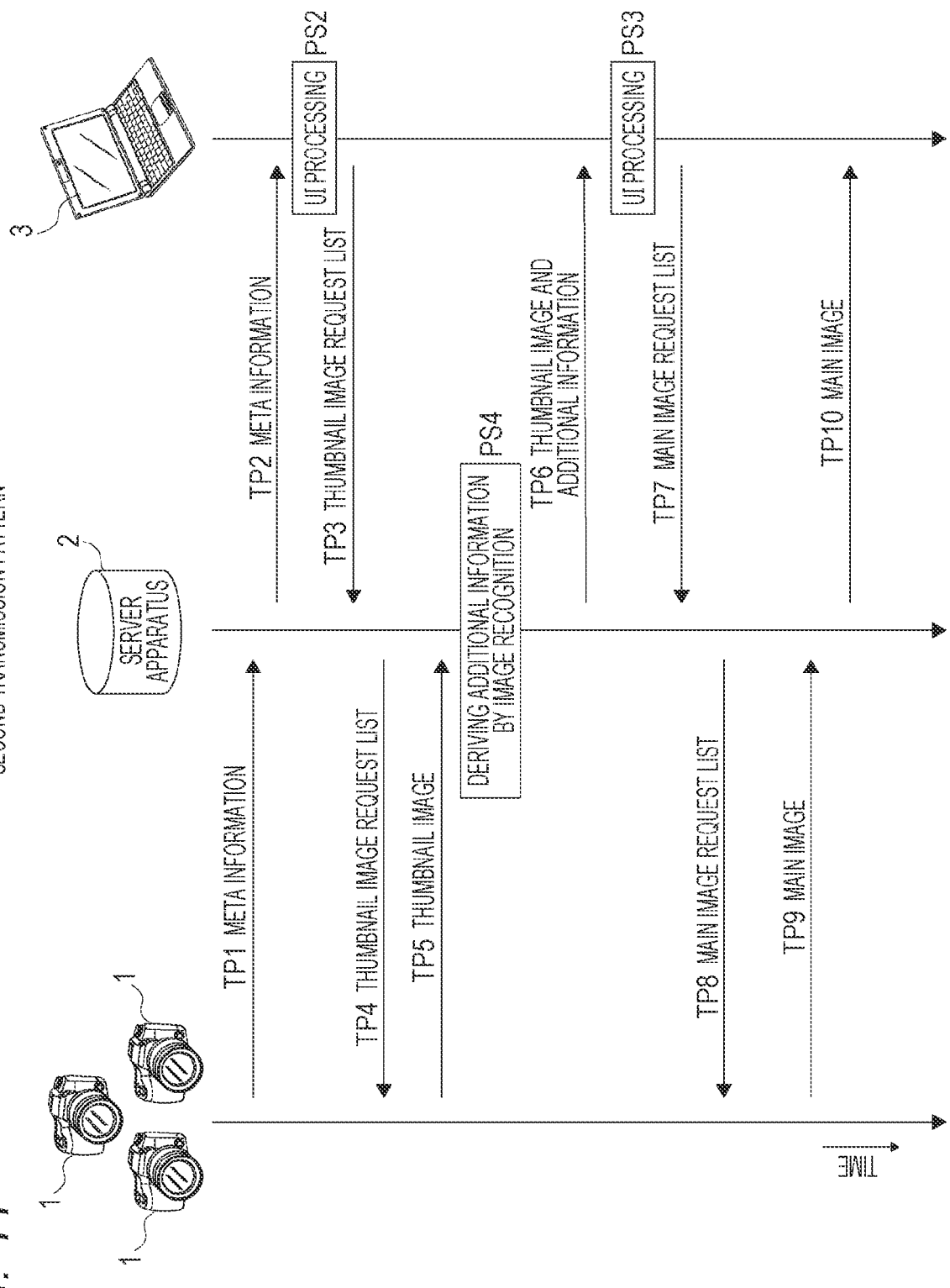
FIG. 11 is an explanatory diagram of the second transmission pattern of the embodiment.

FIG. 11 illustrates the second transmission pattern.

The communication TP1 is similar to that in FIG. 4, and the meta information is transmitted from the imaging apparatus 1 to the server apparatus 2.

However, in the second transmission pattern, the server apparatus 2 transmits the received meta information to the client terminal 3 as it is in the communication TP2 without deriving the additional information as the processing PS1 at this point of time.

The client terminal 3 performs the UI processing as the processing PS2, but in this case, since the additional information is not received, the display content is based only on the meta information as illustrated in FIG. 12A.

For example, in a case where the imaging person and the imaging place and time are transmitted as the meta information, the information of the camera operator (imaging person), the imaging place, and the imaging time corresponding to each image are displayed as the information content list 30.

Furthermore, the check box 31 and the thumbnail request button 32 corresponding to each piece of information are displayed so that the person in charge can operate.

In the communication TP3, the thumbnail image request list is transmitted from the client terminal 3 according to the operation on the screen of FIG. 12A.

In the communication TP4, the server apparatus 2 transfers the thumbnail image request list to the imaging apparatus 1.

In the communication TP5, the imaging apparatus 1 transmits the thumbnail image requested in the thumbnail image request list.

In the second transmission pattern, the server apparatus 2 that has received the thumbnail image as the associated information of the captured main image by the communication TP5 performs processing of obtaining the additional information as the processing PS4 at this time. In this case, image analysis and object recognition processing are performed on the thumbnail image, and the additional information is generated from the result. For example, the player name can be obtained by performing face recognition, individual identification, identification of a uniform number, and the like. Furthermore, it is also possible to determine a competition type by object recognition for a subject and generate a competition name as additional information. According to these examples, some information is acquired by recognition processing using thumbnail images, and the acquired information is set as additional information.

In the communication TP6, the server apparatus 2 transmits the thumbnail image and the additional information determined from the thumbnail image to the client terminal 3.

The client terminal 3 performs the UI processing using the received thumbnail image as the processing PS3. In this case, since the additional information is also received, the client terminal 3 can also perform display based on the additional information together with the thumbnail image.

For example, the client terminal 3 executes display of the received thumbnail image 38 on the display unit 77 as the display of the thumbnail list 34 illustrated in FIG. 12B. Furthermore, the associated/additional information 39 is also displayed as all or a part of the meta information and the additional information regarding each thumbnail image 38. In this example, the competition name and the player name obtained as the additional information are displayed together with the information of the imaging person obtained as the meta information.

Furthermore, the check box 31 and the main image request button 33 corresponding to each thumbnail image 38 are displayed so that the person in charge can operate.

In the communication TP7, the main image request list is transmitted from the client terminal 3 according to the operation on the screen of FIG. 12B.

In the communication TP8, the server apparatus 2 transfers the main image request list to the imaging apparatus 1.

In the communication TP9, the imaging apparatus 1 transmits the main image requested in the main image request list.

In the communication TP10, the server apparatus 2 transfers the main image as illustrated in FIG. 12C to the client terminal 3.

As described above, the second transmission pattern in FIG. 11 is different from the first transmission pattern in FIG. 4 in that the processing of obtaining the additional information by the server apparatus 2 is based on the thumbnail image as the processing PS4.

The processing of the imaging apparatus 1 and the server apparatus 2 for the second transmission pattern is as described below.

The processing of the imaging apparatus 1 for the communication TP1 is as in FIG. 6 described above.

Figure 13:
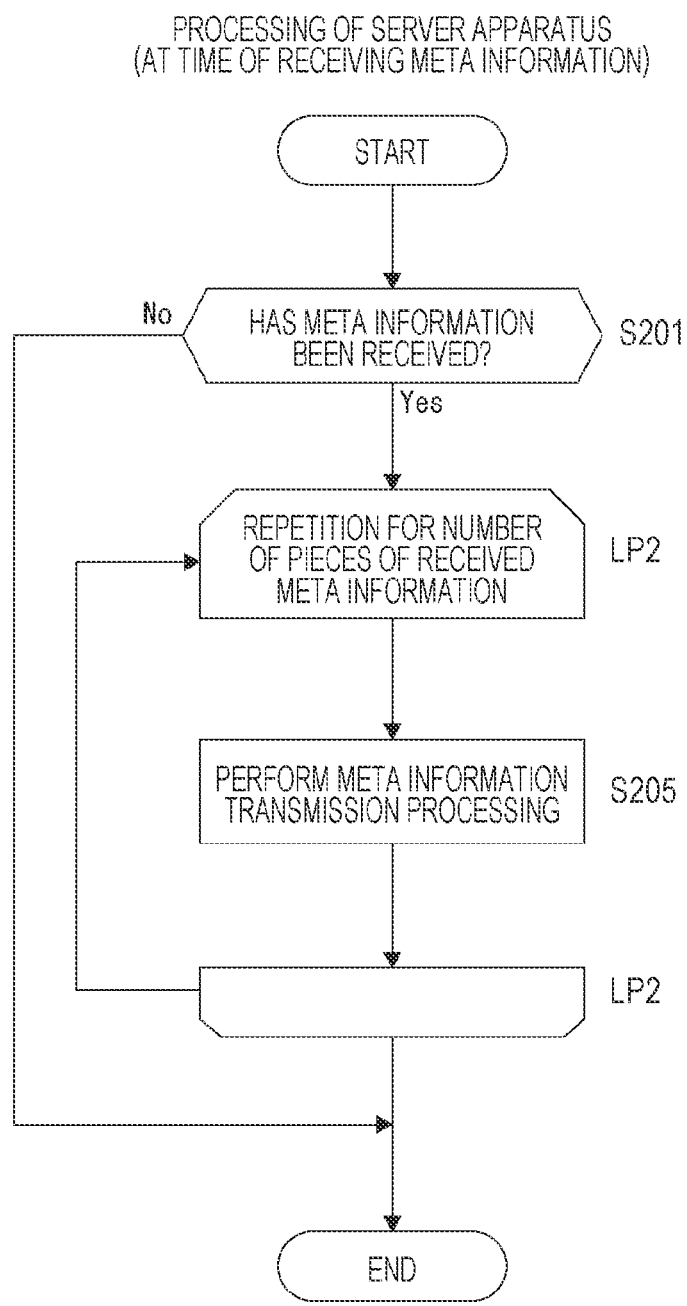
FIG. 13 is a flowchart of processing at the time of meta information reception of a server apparatus applicable to the second, third, and fourth transmission patterns of the embodiment.

The processing of the server apparatus 2 for the communication TP2 is illustrated in FIG. 13.

In step S201, the control unit 2a checks the reception of the meta information from the imaging apparatus 1.

Then, when the meta information is received, the control unit 2a executes loop processing LP2.

In the loop processing LP2, the control unit 2a performs processing of transmitting the meta information transmitted from the imaging apparatus 1 to the client terminal 3 in step S205.

The control unit 2a performs the processing of step S205 for each image in the loop processing LP2, so that the meta information transmitted by the imaging apparatus 1 for each image is transmitted to the client terminal 3.

In response to this, the client terminal 3 side performs the UI processing as the processing PS2 as described above, and transmits the thumbnail image request list as the communication TP3.

The processing of the server apparatus 2 for the communication TP4 according to the thumbnail image request list is as illustrated in FIG. 8 described above.

Furthermore, the processing of the imaging apparatus 1 for the communication TP5 is as in FIG. 9 described above.

Figure 14:
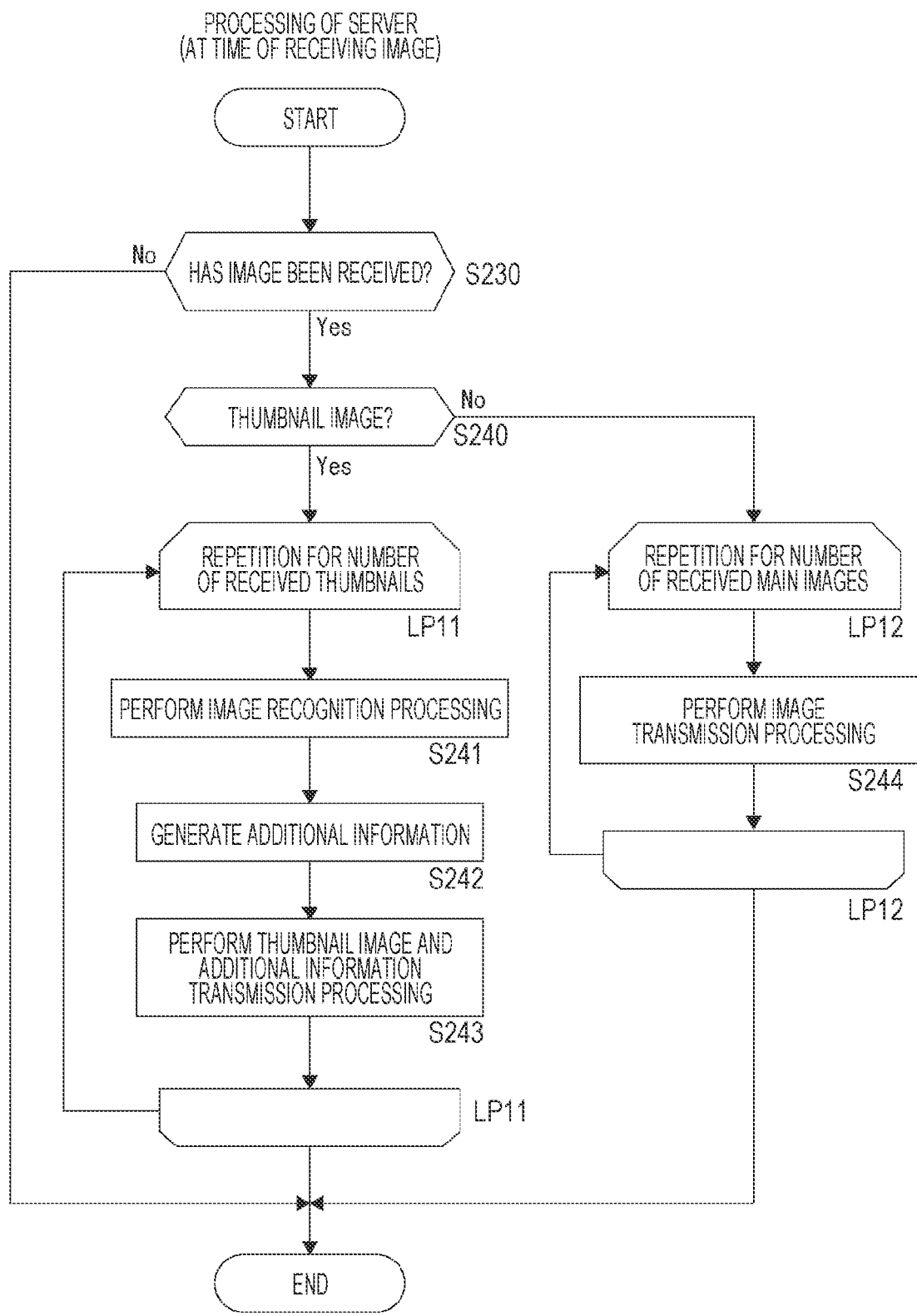
FIG. 14 is a flowchart of processing at the time of image reception of a server apparatus applicable to the second transmission pattern of the embodiment.

The processing of the server apparatus 2 for the communication TP6 in a case where the thumbnail image 38 is received in the communication TP5 is as illustrated in FIG. 14.

In step S230, the control unit 2a of the server apparatus 2 checks the reception of an image from the imaging apparatus 1. The image referred to herein is, for example, a thumbnail image or a main image.

In step S240, the control unit 2a branches the processing depending on whether the received image is a thumbnail image or a main image.

Then, the control unit 2a executes loop processing LP11 when the thumbnail image is received, and executes loop processing LP11 when the main image is received.

In the loop processing LP11, the control unit 2a repeats the processing of steps S241, S242, and S243 for the number of received thumbnail images.

In step S241, the control unit 2a performs image recognition processing. Then, in step S242, the additional information is generated on the basis of the result of the image recognition processing.

Note that, in this case, the DB search may be performed on the basis of the image recognition result to generate the additional information. Moreover, both the additional information based on the image recognition result and the additional information obtained as the DB search result based on the meta information may be derived.

In step S243, the control unit 2a performs processing of transmitting the received image to the client terminal 3.

Therefore, as the communication TP6, in a case where one or a plurality of thumbnail images from the imaging apparatus 1 is received, the server apparatus 2 transfers them and the additional information to the client terminal 3.

In response to this, the client terminal 3 side performs the UI processing as the processing PS3 as described above, and transmits the main image request list as the communication TP7.

The processing of the server apparatus 2 for the communication TP8 according to the main image request list is as illustrated in FIG. 8 described above.

Furthermore, the processing of the imaging apparatus 1 that has received the main image request list by the communication TP8 is as illustrated in FIG. 9. That is, steps S124 and S125 in FIG. 9 are performed on the image related to the request listed in the main image request list, so that transmission of the main image related to the image request list is executed as the communication TP9.

Furthermore, the processing of the server apparatus 2 for the communication TP10 is illustrated in FIG. 14. In a case where the server apparatus 2 receives one or a plurality of main images from the imaging apparatus 1, the processing proceeds from step S240 of FIG. 14 to loop processing LP12.

In the loop processing LP12, the control unit 2a repeats the processing of step S244 for the number of received main images.

In step S244, the control unit 2a performs processing of transmitting the received main image to the client terminal 3.

Therefore, as the communication TP10, in a case where one or a plurality of main images from the imaging apparatus 1 is received, the server apparatus 2 transfers them to the client terminal 3.

5. Third and Fourth Transmission Patterns

An example in which acquisition/transfer of additional information is not performed as the third and fourth transmission patterns will be described.

Figure 15:
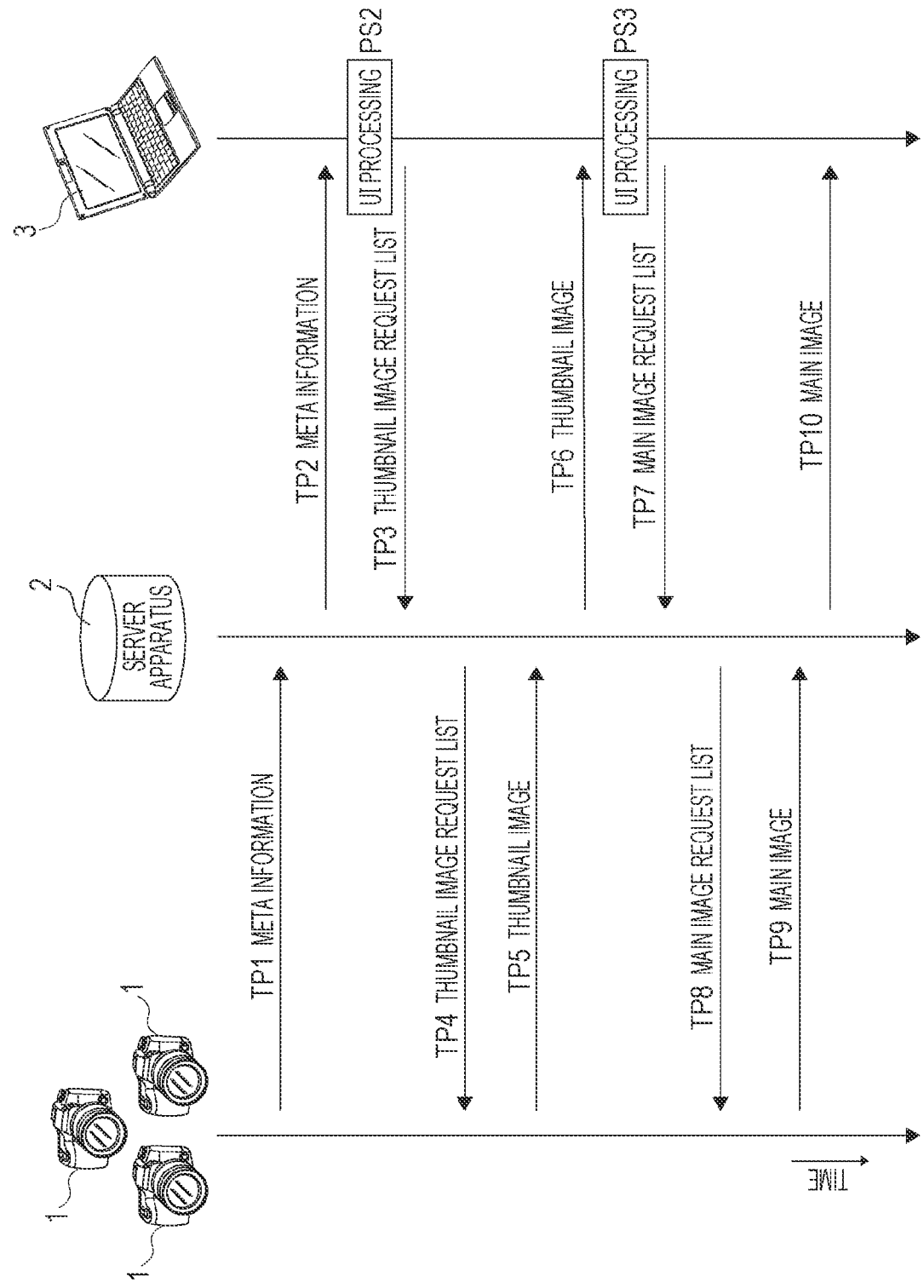
FIG. 15 is an explanatory diagram of the third transmission pattern of the embodiment.

FIG. 15 illustrates the third transmission pattern.

As the communication TP1, the meta information is transmitted from the imaging apparatus 1 to the server apparatus 2.

As the communication TP2, the server apparatus 2 transmits the received meta information as it is to the client terminal 3.

Figure 16:
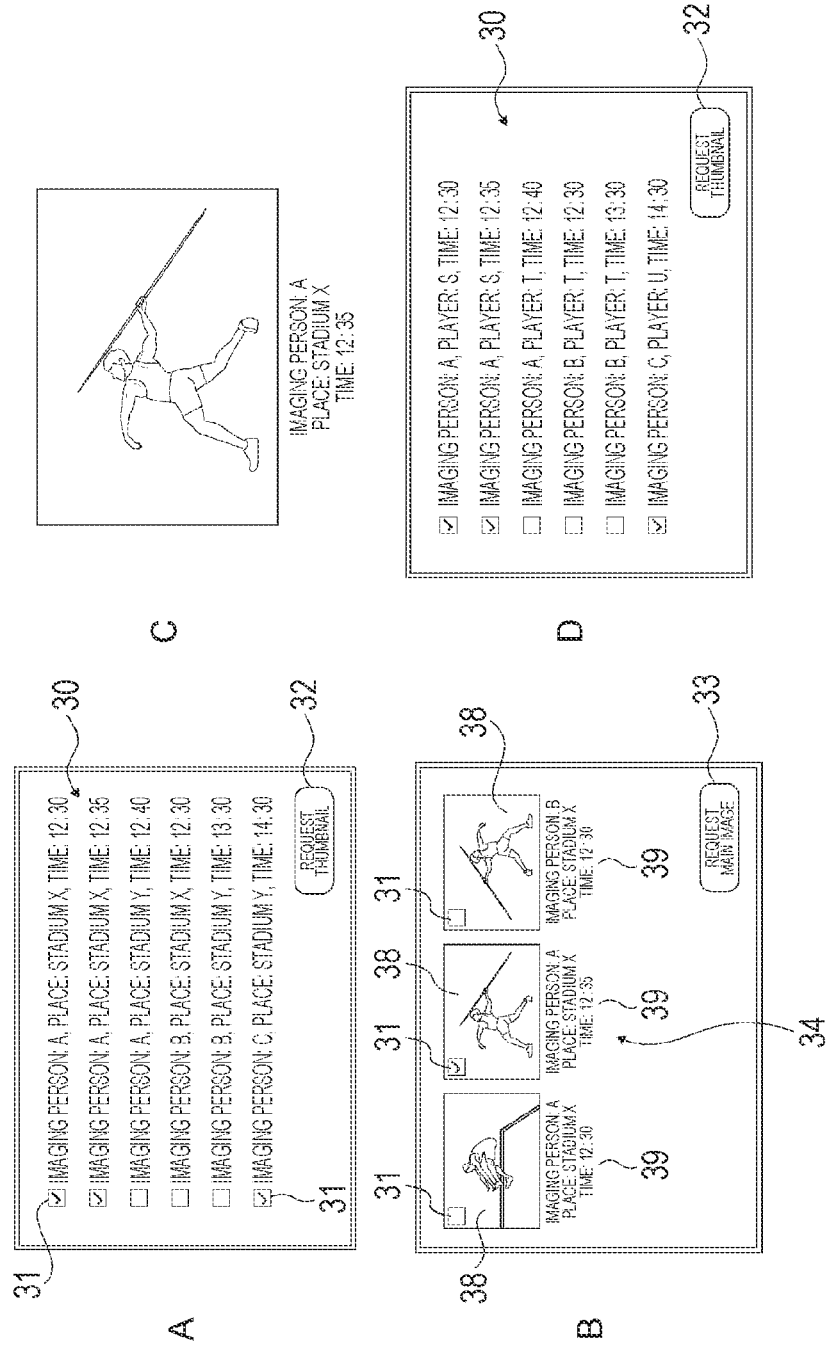
FIG. 16 is an explanatory diagram of an UI screen and the like in the third and fourth transmission patterns of the embodiment.

The client terminal 3 performs the UI processing as the processing PS2, but in this case, since the additional information is not received, the display content is based only on the meta information as illustrated in FIG. 16A. For example, the contents are similar to those in FIG. 12A.

In the communication TP3, the thumbnail image request list is transmitted from the client terminal 3 according to the operation on the screen of FIG. 16A.

In the communication TP4, the server apparatus 2 transfers the thumbnail image request list to the imaging apparatus 1.

In the communication TP5, the imaging apparatus 1 transmits the thumbnail image requested in the thumbnail image request list.

In the communication TP6, the server apparatus 2 transmits the thumbnail image to the client terminal 3.

The client terminal 3 performs the UI processing using the received thumbnail image as the processing PS3. For example, the client terminal 3 executes display of the received thumbnail image 38 on the display unit 77 as the display of the thumbnail list 34 illustrated in FIG. 16B. In this case, since the additional information is not transmitted, only the information based on the meta information, for example, the imaging place, the imaging time, and the like are displayed as the associated/additional information 39.

Furthermore, the check box 31 and the main image request button 33 corresponding to each thumbnail image 38 are displayed so that the person in charge can operate.

In the communication TP7, the main image request list is transmitted from the client terminal 3 according to the operation on the screen of FIG. 16B.

In the communication TP8, the server apparatus 2 transfers the main image request list to the imaging apparatus 1.

In the communication TP9, the imaging apparatus 1 transmits the main image requested in the main image request list.

In the communication TP10, the server apparatus 2 transfers the main image as illustrated in FIG. 16C to the client terminal 3.

As described above, the third transmission pattern in FIG. 15 is different from the first and second transmission patterns described above in that the server apparatus 2 does not perform the processing of obtaining the additional information.

The processing of the imaging apparatus 1 and the server apparatus 2 for the third transmission pattern is as described below.

The processing of the imaging apparatus 1 at the time of imaging is as illustrated in FIG. 6, and the processing at the time of receiving the image request is as illustrated in FIG. 9.

The processing at the time of receiving the meta information by the server apparatus 2 is as illustrated in FIG. 13, the processing at the time of receiving the image request is as illustrated in FIG. 8, and the processing at the time of receiving the image is as illustrated in FIG. 10.

Next, the fourth transmission pattern will be described.

The overall procedure is similar to that of the third transmission pattern in FIG. 15, but is an example in a case where the imaging apparatus 1 has a personal face registration function.

When the imaging apparatus 1 registers, for example, an individual face, an affiliation team, a name, and the like of a player of a competition, a player determined as a subject by image recognition can be identified, and the information can be included in the meta information.

Figure 17:
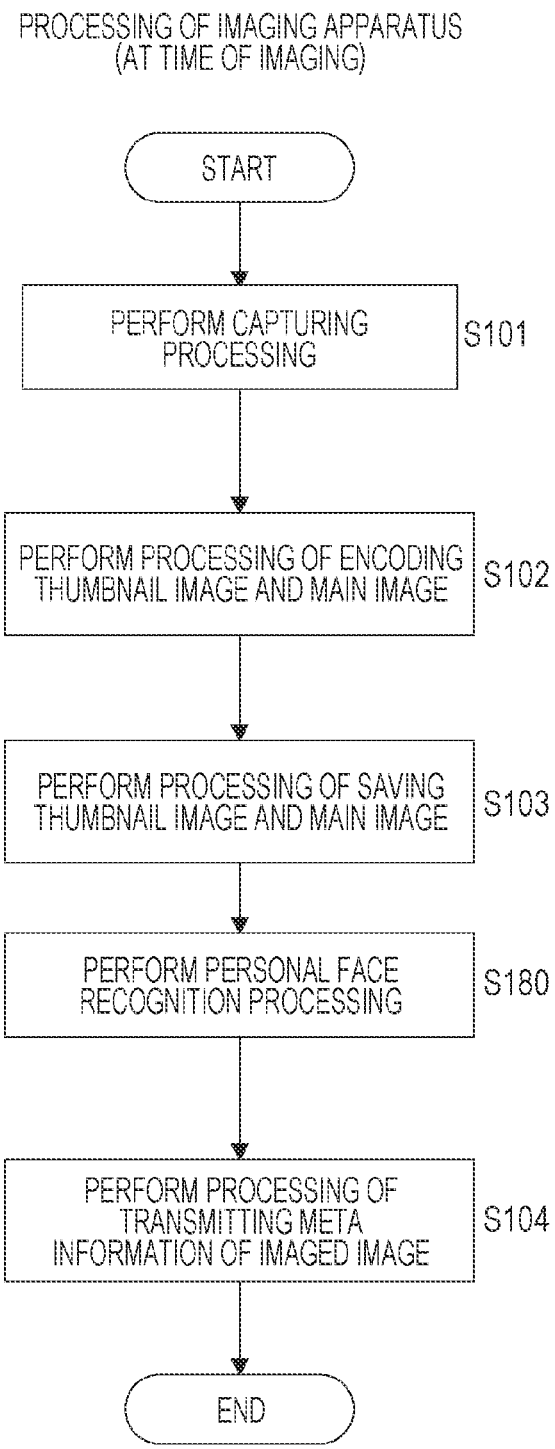
FIG. 17 is a flowchart of processing at the time of imaging by an imaging apparatus applicable to the fourth transmission pattern of the embodiment.

Therefore, the imaging apparatus 1 performs, for example, the processing of FIG. 17.

As processing of the camera control unit 18, processing of steps S101, S102, S103, and S104 in FIG. 17 is similar to that in FIG. 6.

As step S180 in FIG. 17, the camera control unit 18 performs personal face recognition processing. For example, the personal face recognition processing is performed on each image recorded in step S103, the player who is the subject is specified, and the information is added to the meta information.

Therefore, when the meta information is transmitted in step S104, the player information is also included in the meta information.

Therefore, in a case where the meta information is transmitted to the client terminal 3 by the communication TP1 and the communication TP2 of FIG. 15, the client terminal 3 can display the information content list 30 as illustrated in FIG. 16D on the basis of the meta information. That is, the information of the player can be displayed.

Therefore, this is very useful, for example, in a case where the person in charge wants to select an image of a specific player, or the like.

6. Fifth Transmission Pattern

Figure 18:
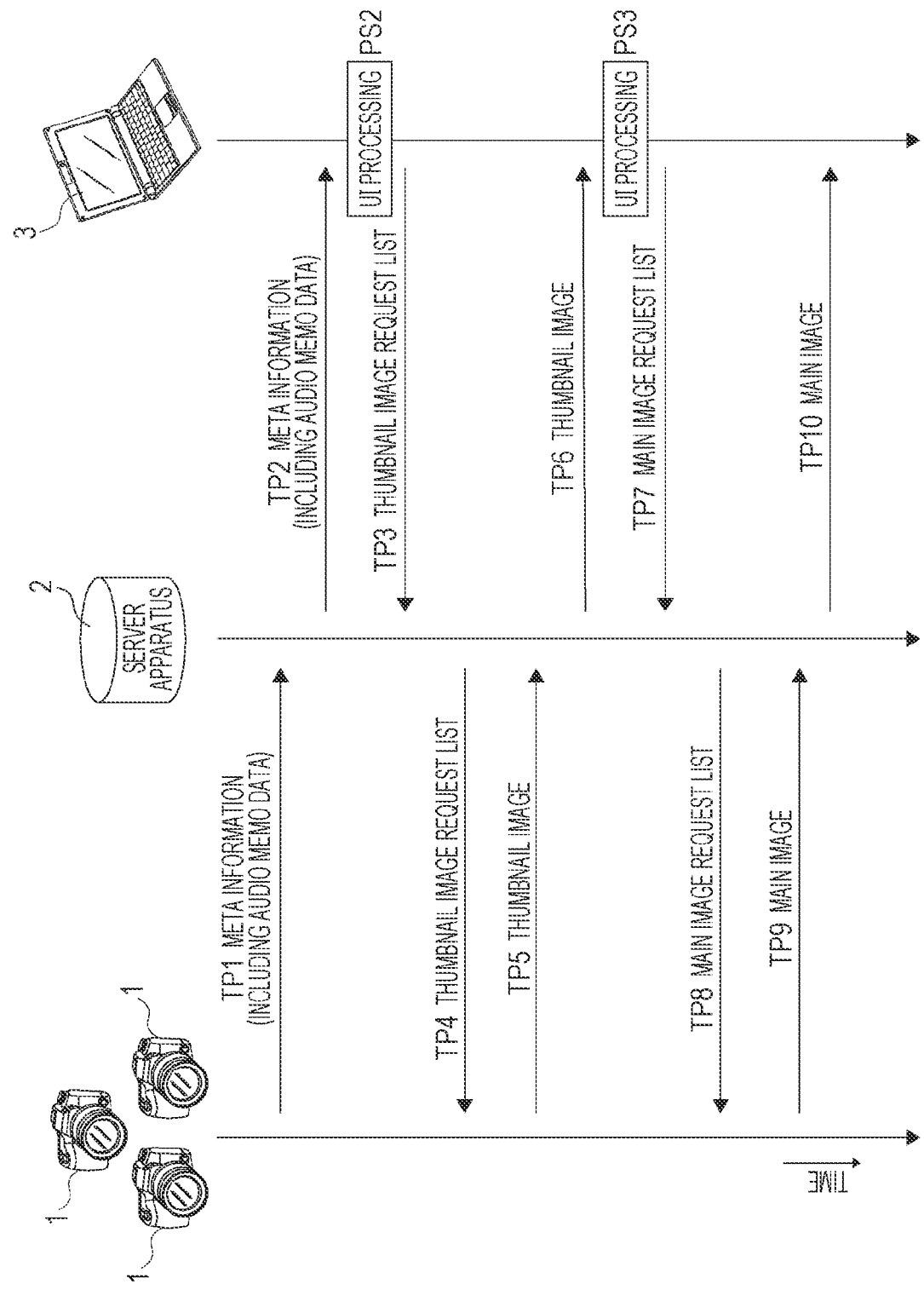
FIG. 18 is an explanatory diagram of the fifth transmission pattern of the embodiment.

The fifth communication pattern will be described with reference to FIG. 18.

In the communication TP1, the meta information including audio memo data is transmitted from the imaging apparatus 1 to the server apparatus 2.

The audio memo data is data in which when an image is captured (for example, immediately after release operation) or an image is recorded on a recording medium and then a word serving as a memo is uttered to associate the audio with the image as a memo and the audio is saved as one piece of meta information. This fifth communication pattern can be applied in a case where the imaging apparatus 1 has an audio memo function.

When receiving the meta information including the audio memo data, the server apparatus 2 transmits it to the client terminal 3 as the communication TP2.

Figure 19:
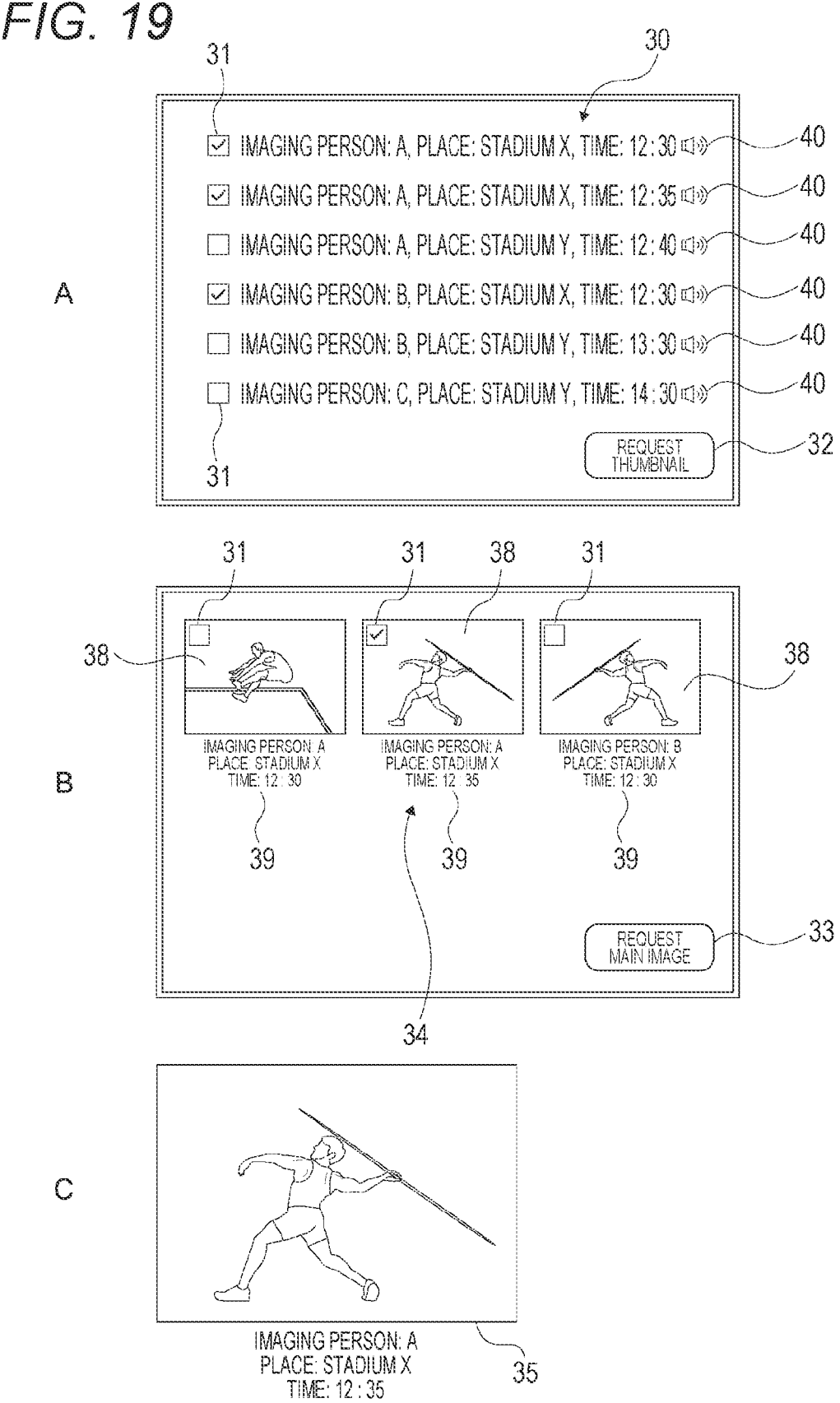
FIG. 19 is an explanatory diagram of an UI screen and the like in the fifth transmission pattern of the embodiment.

The client terminal 3 performs the UI processing as the processing PS2, but in this case, the display content is the information content list 30 based only on the meta information as illustrated in FIG. 19A. However, since the meta information including the audio memo data is received, an audio reproduction icon 40 is displayed with respect to the information content including the audio memo data. In the example of the drawing, as a case where the audio memo data exists for all the images, the audio reproduction icon 40 is displayed corresponding to each information content.

In the client terminal 3, for example, the audio output unit 78 reproduces the audio memo by operating the audio reproduction icon 40. When the camera operator appropriately records the audio memo, the person in charge of the client terminal 3 can perform image selection with reference to the audio memo.

Since the subsequent communication TP3 to the communication TP10 and the processing PS3 are similar to those of the third communication pattern, redundant description is omitted.

Figure 20:
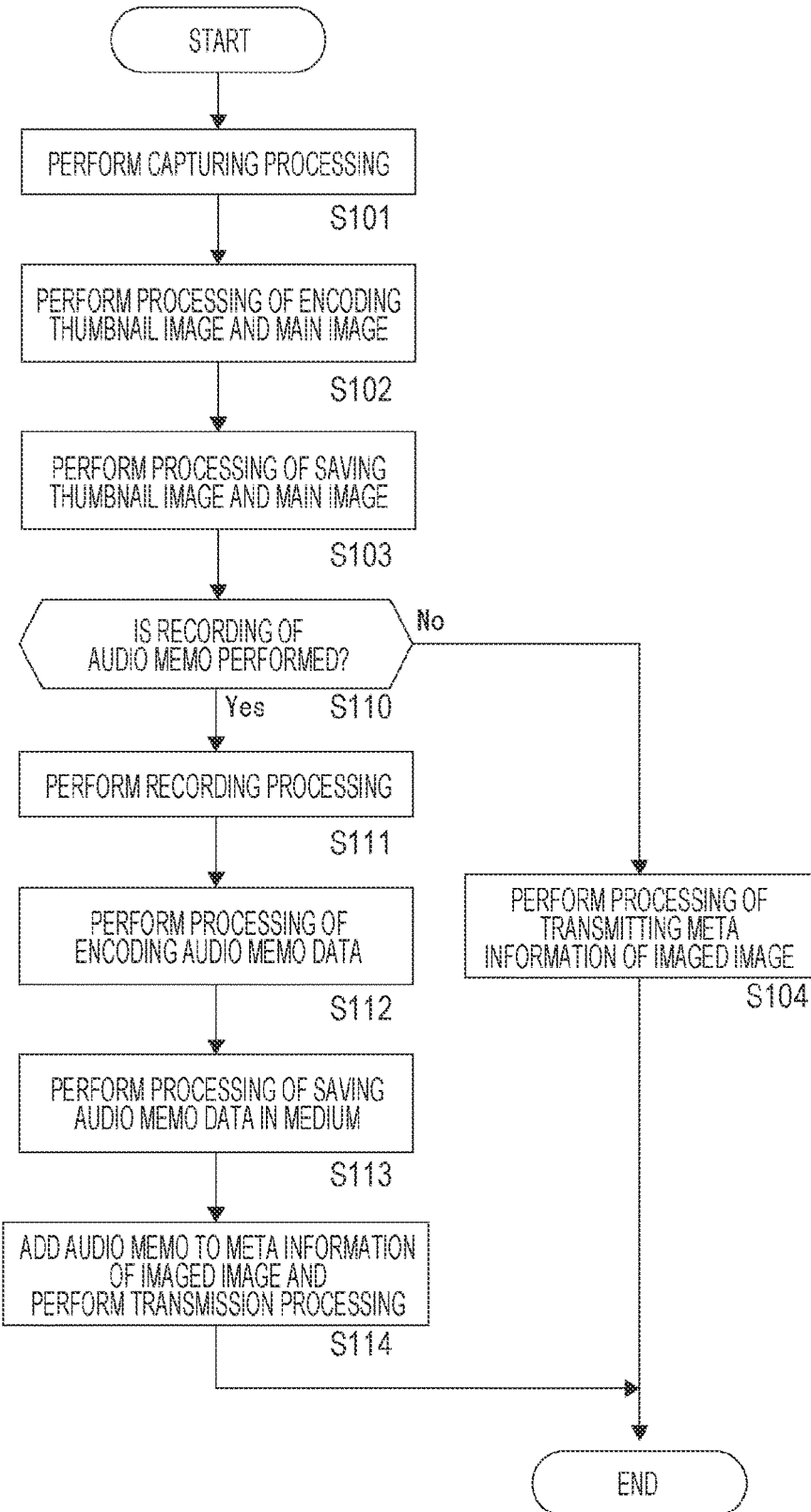
FIG. 20 is a flowchart of processing at the time of imaging by an imaging apparatus applicable to the fifth and sixth transmission patterns of the embodiment.

The processing at the time of imaging by the imaging apparatus capable of recording the audio memo data is as illustrated in FIG. 20.

Note that steps S101, S102, S103, and S104 in FIG. 20 are similar to those in FIG. 6.

The camera operator can arbitrarily add an audio memo to the captured image.

In a case where the camera operator does not perform the operation of recording the audio memo on the captured image, the processing proceeds from step S110 to step S104, and it is similar to FIG. 6.

In a case where the operation of recording the audio memo is performed, the processing in FIG. 20 proceeds from step S110 to step S111, and the camera control unit 18 performs recording processing. That is, it is processing of recording the audio input from the audio input unit 25 for a period of about 10 seconds to 20 seconds, for example, according to a predetermined operation.

In step S112, the camera control unit 18 causes the camera signal processing unit 13 to execute encoding processing of the input audio memo data.

In step S113, the camera control unit 18 causes the recording control unit 14 to execute processing of recording the encoded audio memo data on the recording medium.

Then, in step S114, the camera control unit 18 causes the communication unit 16 to execute transmission processing to the server apparatus 2 in a state where the audio memo data is added to the meta information of the image.

Figure 21:
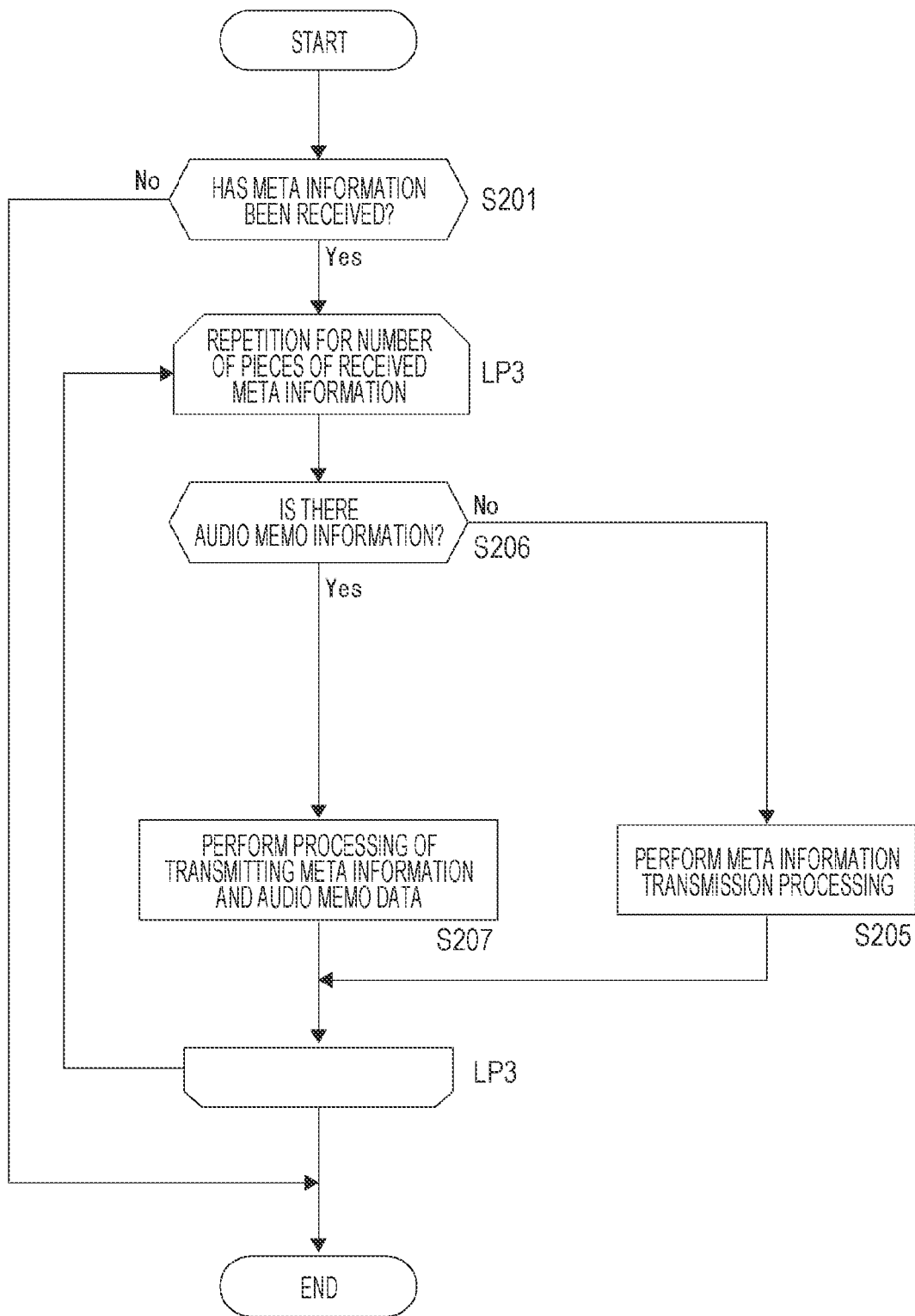
FIG. 21 is a flowchart of processing at the time of meta information reception of a server apparatus applicable to the fifth transmission pattern of the embodiment.

The processing of the server apparatus 2 for the communication TP2 when the meta information including the audio memo data is received is as illustrated in FIG. 21.

In step S201, the control unit 2a checks the reception of the meta information from the imaging apparatus 1.

Then, when the meta information is received, the control unit 2a executes loop processing LP3.

As the loop processing LP3, in step S206, the control unit 2a determines whether or not the audio memo data is included in the meta information and branches the processing.

When the meta information does not include the audio memo data, the control unit 2a performs processing of transmitting the meta information transmitted from the imaging apparatus 1 to the client terminal 3 in step S205.

When the meta information includes the audio memo data, the control unit 2a performs processing of transmitting the meta information including the audio memo data transmitted from the imaging apparatus 1 to the client terminal 3 in step S207.

The control unit 2a performs the processing of steps S206 and S205 or steps S206 and S207 on each image in the loop processing LP3, so that the meta information transmitted by the imaging apparatus 1 for each image is transmitted to the client terminal 3, and when the audio memo data is added, the audio memo data is also transmitted.

Another processing for the fifth transmission pattern is as described below.

The processing at the time of receiving the image request of the imaging apparatus 1 is as illustrated in FIG. 9.

The processing at the time of receiving the image request by the server apparatus 2 is as illustrated in FIG. 8, and the processing at the time of receiving the image is as illustrated in FIG. 10.

7. Sixth Transmission Pattern

Figure 22:
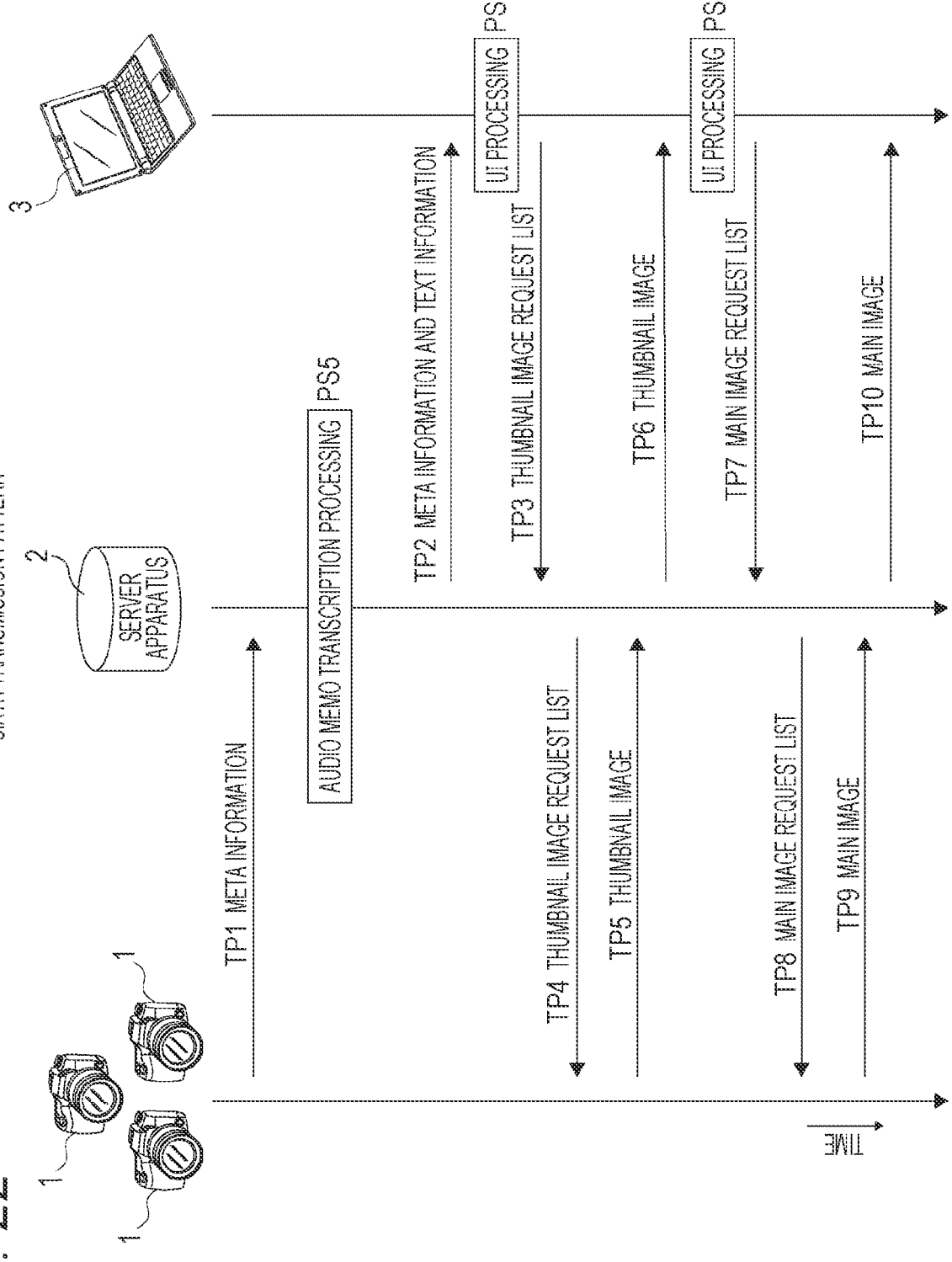
FIG. 22 is an explanatory diagram of the sixth transmission pattern of the embodiment.

The sixth communication pattern will be described with reference to FIG. 22.

In the communication TP1, the meta information including audio memo data is transmitted from the imaging apparatus 1 to the server apparatus 2.

When receiving the meta information including the audio memo data, the server apparatus 2 performs transcription processing of the audio memo as processing PS5. That is, information in which the audio memo data is transcribed into text data is generated. Then, as the communication TP2, the meta information and the text information based on the audio memo data are transmitted to the client terminal 3.

Figure 23:
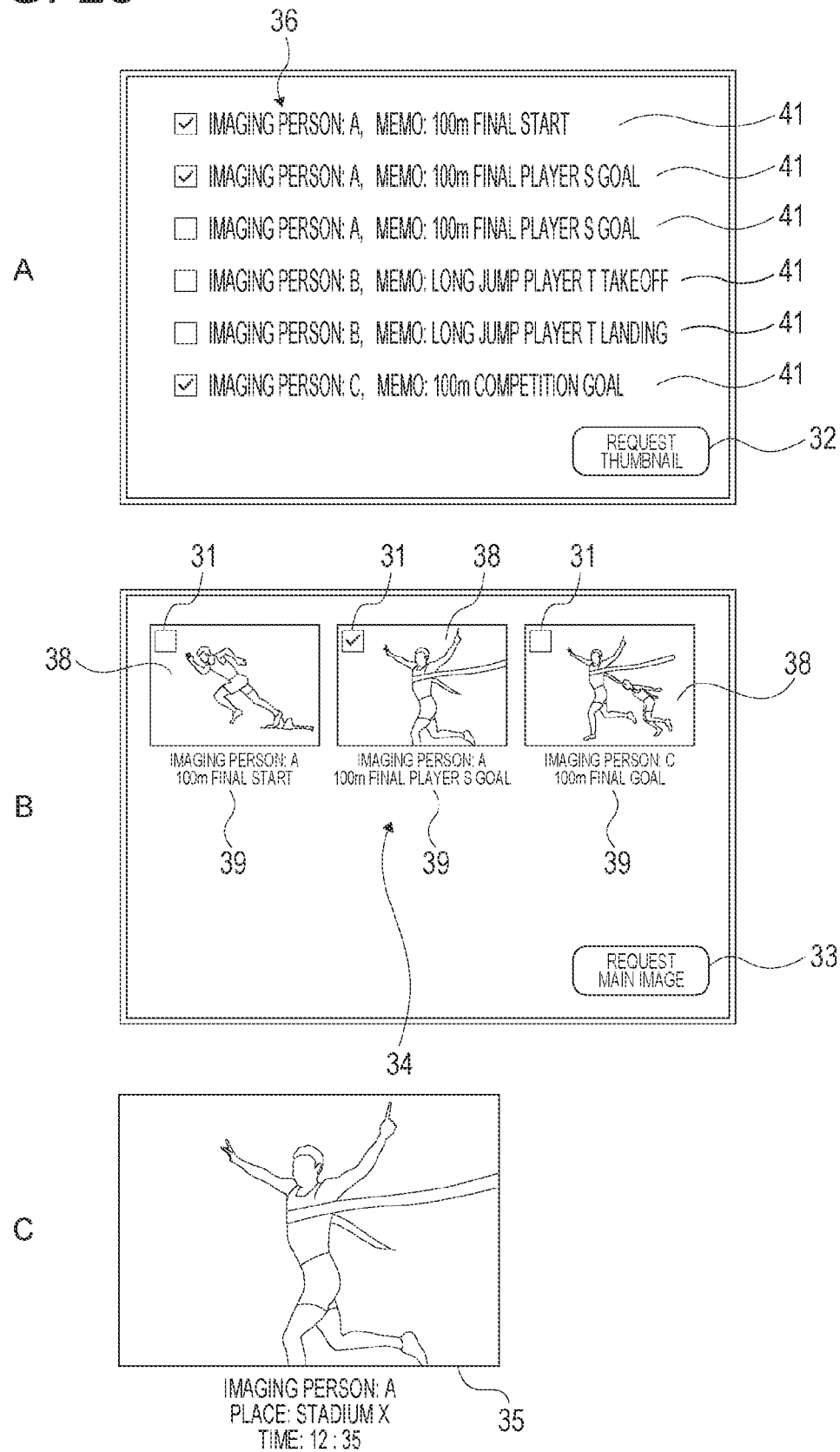
FIG. 23 is an explanatory diagram of an UI screen and the like in the sixth transmission pattern of the embodiment.

The client terminal 3 performs the UI processing as the processing PS2, and in this case, as the display content, as illustrated in FIG. 23A, audio memo text 41 obtained by converting the audio memo data into text can be displayed as the information content list 30 together with the content of the meta information.

Note that the text information may be regarded as one of the additional information referred to in the present disclosure in the sense that the text information is generated in the server apparatus 2, but may be regarded as the associated information referred to in the present disclosure since the text information is the same as the audio memo data in terms of the content.

By displaying the audio memo text 41. The person in charge of the client terminal 3 can perform image selection with reference to the content of the audio memo. Since it is not necessary to reproduce the audio memo at this time, the selection operation can be performed more efficiently.

The subsequent communication TP3 to the communication TP10 and the processing PS3 are similar to those of the third communication pattern.

The processing at the time of imaging by the imaging apparatus capable of recording the audio memo data is as illustrated in FIG. 20 described above.

Figure 24:
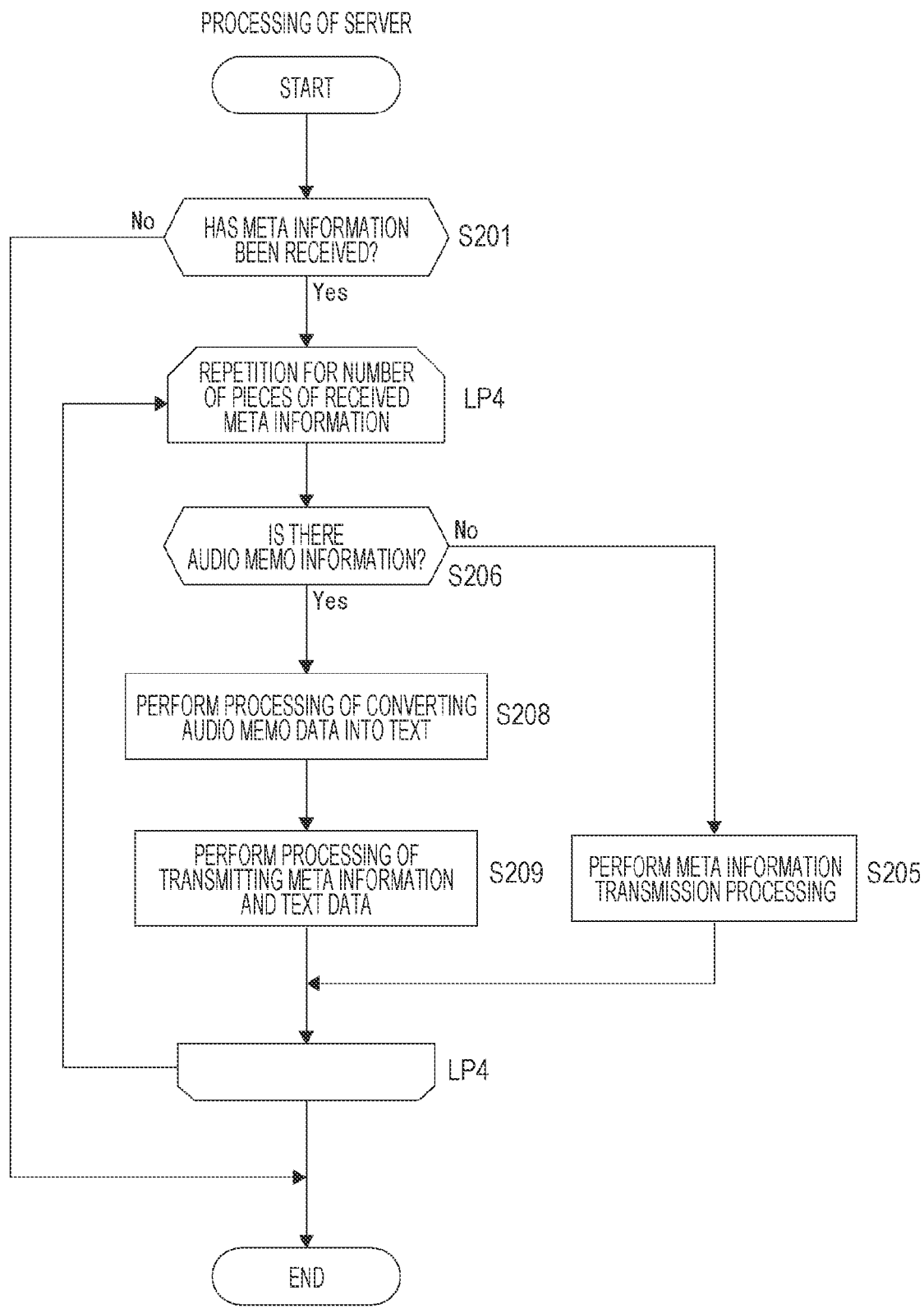
FIG. 24 is a flowchart of processing at the time of meta information reception of a server apparatus applicable to the sixth transmission pattern of the embodiment.

The processing of the server apparatus 2 for the communication TP2 when the meta information including the audio memo data is received is as illustrated in FIG. 24.

In step S201, the control unit 2a checks the reception of the meta information from the imaging apparatus 1.

Then, when the meta information is received, the control unit 2a executes loop processing LP4.

As the loop processing LP4, in step S206, the control unit 2a determines whether or not the audio memo data is included in the meta information and branches the processing.

When the meta information does not include the audio memo data, the control unit 2a performs processing of transmitting the meta information transmitted from the imaging apparatus 1 to the client terminal 3 in step S205.

When the meta information includes the audio memo data, the control unit 2a performs text conversion processing on the audio memo data in step S208. Then, in step S209, the control unit 2a performs processing of transmitting the text data of the audio memo data transmitted from the imaging apparatus 1 and the other meta information to the client terminal 3.

Note that, at this time, by not transmitting the audio memo data itself, the amount of transmission data can be reduced.

However, the original audio memo data may be transmitted to the client terminal 3 together with the text data of the audio memo data so that the audio reproduction can be performed on the client terminal 3 side.

The control unit 2a performs the processing of steps S206 and S205 or steps S206, S208, and S209 on each image in the loop processing LP4, so that the meta information transmitted by the imaging apparatus 1 for each image is transmitted to the client terminal 3, and when the audio memo data is added, the audio memo data is converted into a text and transmitted.

Another processing for the sixth transmission pattern is as described below.

The processing at the time of receiving the image request of the imaging apparatus 1 is as illustrated in FIG. 9.

The processing at the time of receiving the image request by the server apparatus 2 is as illustrated in FIG. 8, and the processing at the time of receiving the image is as illustrated in FIG. 10.

8. Seventh Transmission Pattern

An example of a case where continuous imaging is performed by the imaging apparatus and a series of images is managed as grouped images as the seventh transmission pattern in FIG. 25 will be described.

Communication TP21

The imaging apparatus 1 transmits, to the server apparatus 2, meta information including a thumbnail image of a first image of continuously imaged grouped images as the associated information regarding the captured image.

In this case, the imaging apparatus 1 transmits the thumbnail image of the first image for each of one or a plurality of continuously imaged grouped images, but it is not limited to the first, and it is sufficient if a certain image included in the continuously imaged grouped images is selected and the thumbnail image of the image is transmitted.

Communication TP22

The server apparatus 2 transmits, to the client terminal 3, meta information including a thumbnail image of each continuously imaged grouped image.

Processing PS6

The client terminal 3 performs UI processing using the received thumbnail image of each continuously imaged grouped image.

For example, the client terminal 3 displays the thumbnail list 34 as illustrated in FIG. 26A. In this case, for continuously imaged grouped images, a thumbnail image (continuously imaged thumbnail image 42) of the continuously imaged grouped image is displayed.

Furthermore, in a case where the transmitted content includes a thumbnail image of an image obtained by normal one-image capturing that is not continuous imaging, the thumbnail image 38 is displayed.

Furthermore, the information of the camera operator (imaging person), the imaging time, the imaging place, and the like are displayed as the associated/additional information 39 based on the meta information corresponding to the continuously imaged thumbnail image 42 or the thumbnail image 38.

Furthermore, the check box 31 is arranged corresponding to the continuously imaged thumbnail image 42 or the thumbnail image 38 so that the person in charge on the client terminal 3 side can perform a selection operation.

Moreover, the main image request button 33 and an expand button 36 are displayed so that the person in charge can operate.

Such a UI screen is a screen for the person in charge of the client terminal 3 to select an image for which the main image is requested from the thumbnail image, and individual images can be selected for the continuously imaged grouped images.

For example, by selecting the continuously imaged thumbnail image 42 using the check box 31 and operating the expand button 36, the thumbnail images of the respective images constituting the continuous imaging can be viewed as illustrated in FIG. 26B.

Communication TP23

The client terminal 3 transmits a request for the entire grouped images to the server apparatus 2. That is, the person in charge checks the check box 31 for a certain continuously imaged thumbnail image 42 in the UI processing of the processing PS2 operates the expand button 36, and in response to this, the client terminal 3 generates the list information of all the checked images of the continuously imaged grouped images and the information of the request for the entire grouped images including the information of requesting the thumbnails, and transmits the generated information.

Communication TP24

The server apparatus 2 transfers the request for the entire grouped images received from the client terminal 3 to the imaging apparatus 1.

Communication TP25

In response to receiving the request for the entire grouped images, the imaging apparatus 1 transmits thumbnail images of individual images included in the requested continuously imaged grouped images to the server apparatus 2.

Communication TP26

The server apparatus 2 transfers the thumbnail image received from the imaging apparatus 1 to the client terminal 3.

Processing PS7

The client terminal 3 performs UI processing using all the received thumbnail images of the grouped images.

For example, the client terminal 3 executes display of each thumbnail image 43 of the continuously imaged grouped images on the display unit 77 as an expansion list 37 as illustrated in FIG. 26B.

Furthermore, the associated/additional information 39 may also be displayed corresponding to the entire continuously imaged grouped images.

Furthermore, the check box 31 is arranged corresponding to each thumbnail image 43 so that the person in charge on the client terminal 3 side can perform a selection operation.

Moreover, a main image request button 33 is displayed so that the person in charge can operate it.

With such a UI screen, it is also possible for the person in charge of the client terminal 3 to select some images of the continuously imaged images.

Communication TP27

The client terminal 3 transmits a main image request list to the server apparatus 2. That is, in response to the check of the check box 31 and the operation of the main image request button 33 by the person in charge in the UI processing of the processing PS6 or PS7, the client terminal 3 generates the main image request list including the list information of the images corresponding to the checked thumbnails and the information requesting the main image, and transmits the main image request list.

Communication TP28

The server apparatus 2 transfers the main image request list received from the client terminal 3 to the imaging apparatus 1.

Communication TP29

In response to receiving the main image request list, the imaging apparatus 1 transmits main images of one or a plurality of images listed in the main image request list to the server apparatus 2.

Communication TP30

The server apparatus 2 transfers the main image received from the imaging apparatus 1 to the client terminal 3.

Therefore, a main image 35 in FIG. 26C is delivered to the client terminal 3.

As described above, in a case where continuously imaged grouped images are assumed, a thumbnail image representing the continuously imaged grouped images is transmitted so that the continuously imaged grouped images can be selected. Further, individual images of the continuously imaged grouped images can be selected.

In this way, it is possible to select and transfer the main image for individual images of the continuously imaged grouped images required by the person in charge of the client terminal 3 instead of transferring all of the large number of main images captured continuously by the imaging apparatus 1 to the client terminal 3, and a series of transfers is extremely efficient.

Figure 25:
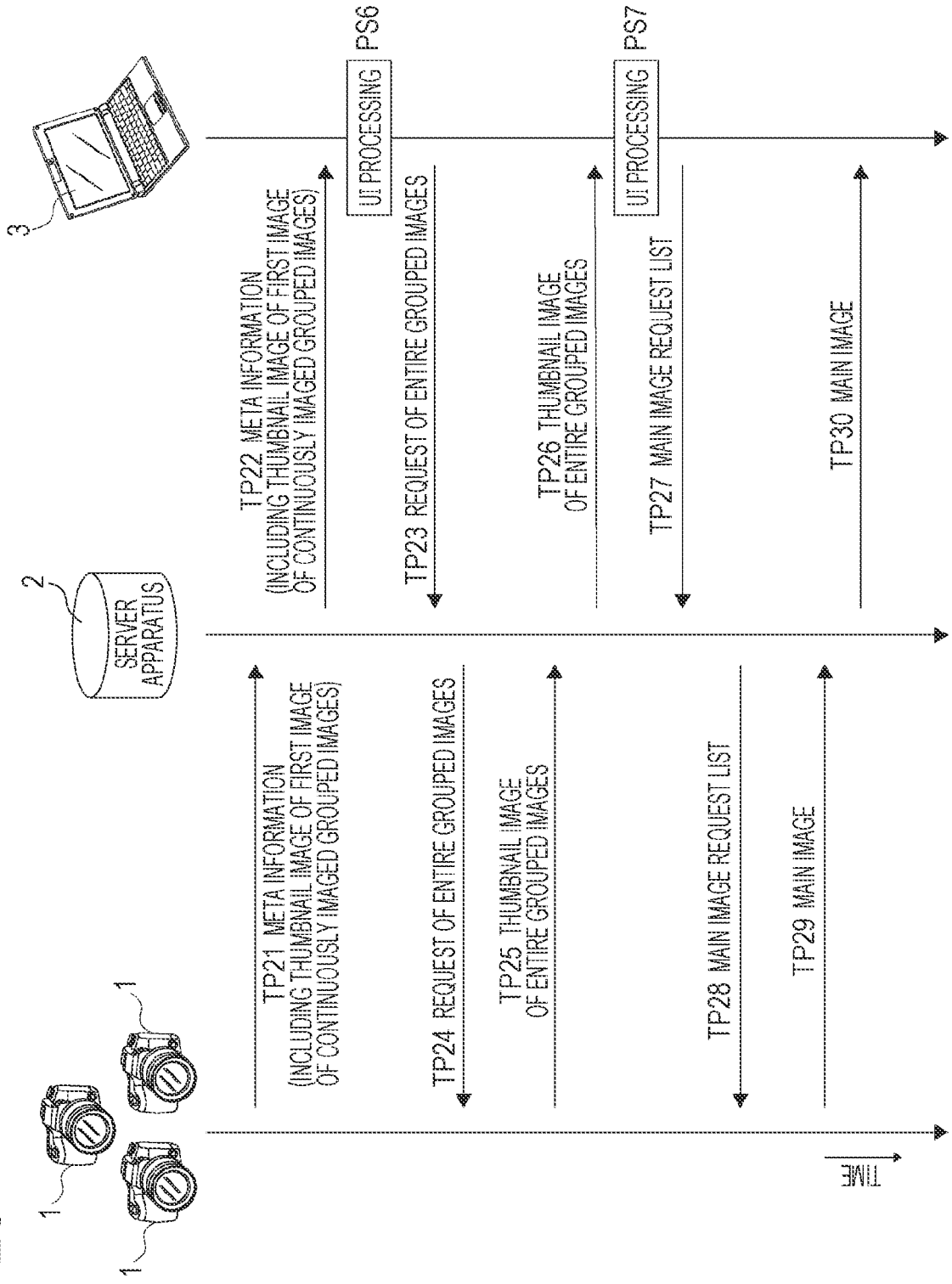
FIG. 25 is an explanatory diagram of the seventh transmission pattern of the embodiment.

Note that FIG. 25 illustrates the communication TP21 to the communication TP30 assuming a case where continuous imaging is performed by the imaging apparatus 1, but when the continuous imaging and capturing is not performed by the imaging apparatus 1, for example, the communication TP1 to the communication TP10 are performed by any of the first transmission pattern to the sixth transmission pattern described above.

Furthermore, even in a case where continuous imaging is performed, it is also conceivable that, for example, the communication TP1, the processing PS1, the communication TP2, the processing PS2, the communication TP3, and the communication TP4 illustrated in FIG. 4 are performed at a point of time before the communication TP21 of FIG. 25, and the processing after the communication TP21 of FIG. 25 is performed for the image requested by the thumbnail image request list of the communication TP4.

Figure 27:
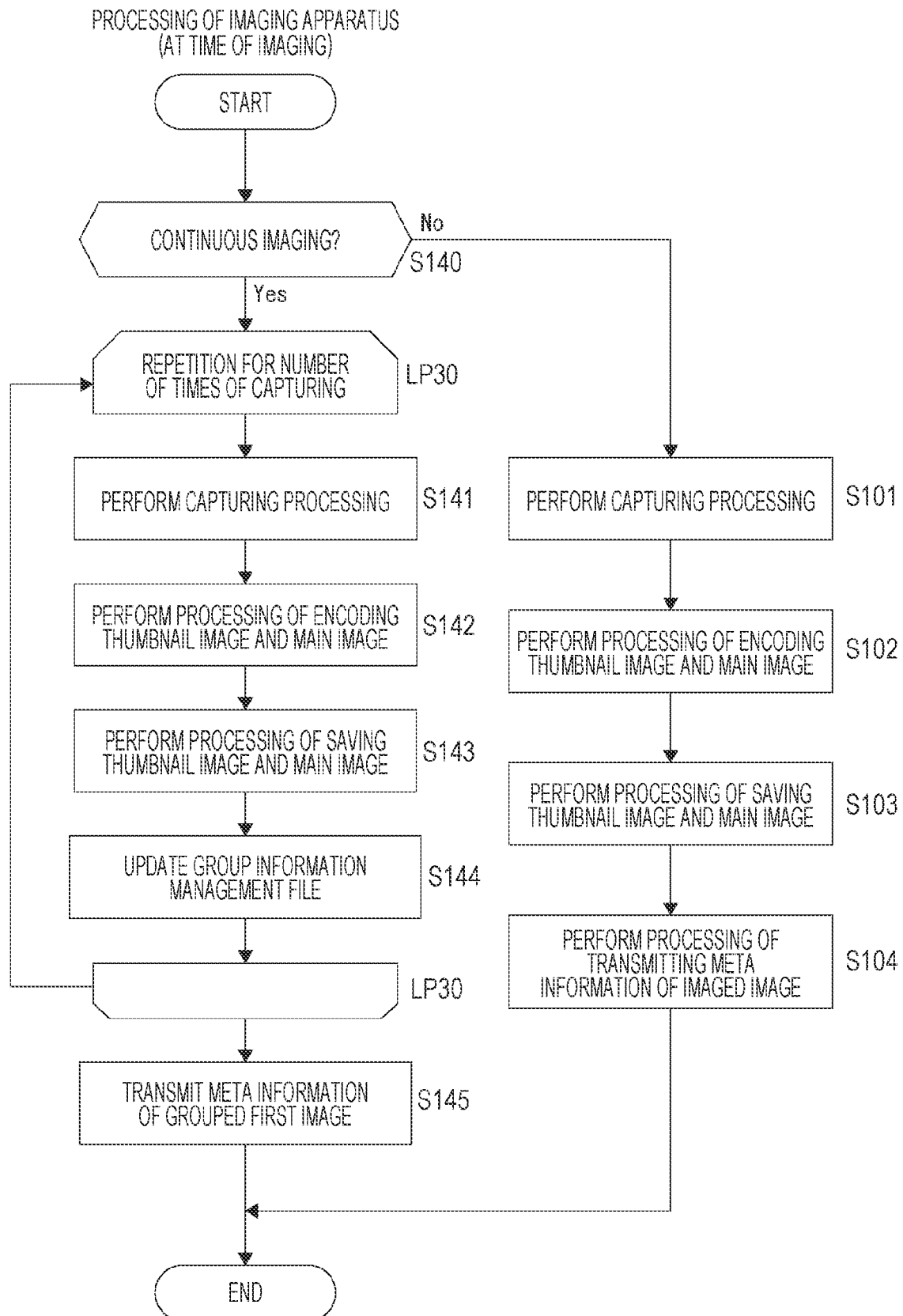
FIG. 27 is a flowchart of processing at the time of imaging by an imaging apparatus applicable to the seventh transmission pattern of the embodiment.

The example of FIG. 27 is conceivable as the processing at the time of imaging by the imaging apparatus 1 regarding the seventh transmission pattern.

In step S140, the camera control unit 18 branches the processing depending on whether or not continuous imaging is performed (whether or not a continuous imaging mode is set).

When it is not continuous imaging, the camera control unit 18 performs the processing from steps S101 to S104. This is similar to the processing in FIG. 6.

At the time of continuous imaging, the camera control unit 18 repeats the processing from steps S141 to S144 as many times as the number of times of image capturing by continuous imaging as loop processing LP30.

In step S141, the camera control unit 18 controls one-image capturing processing in the continuous imaging. For example, the camera control unit 18 causes the imaging element unit 12 and the camera signal processing unit 13 to execute image signal processing of a still image, and the like.

In step S142, the camera control unit 18 causes the camera signal processing unit 13 to execute encoding processing of the thumbnail image and the main image.

In step S143, the camera control unit 18 causes the recording control unit 14 to record the thumbnail image and the main image on the recording medium.

In step S144, the camera control unit 18 updates a group information management file. This is processing of updating the meta information associated with the continuously imaged grouped images for the file managed for the continuously imaged grouped images.

After performing the above processing for the number of continuously imaged images, the camera control unit 18 proceeds to step S145 and causes the communication unit 16 to execute processing of transmitting the meta information including a thumbnail image of the one first image of the continuously imaged grouped images.

Through the above processing, the communication TP1 of FIG. 4 is performed.

Figure 28:
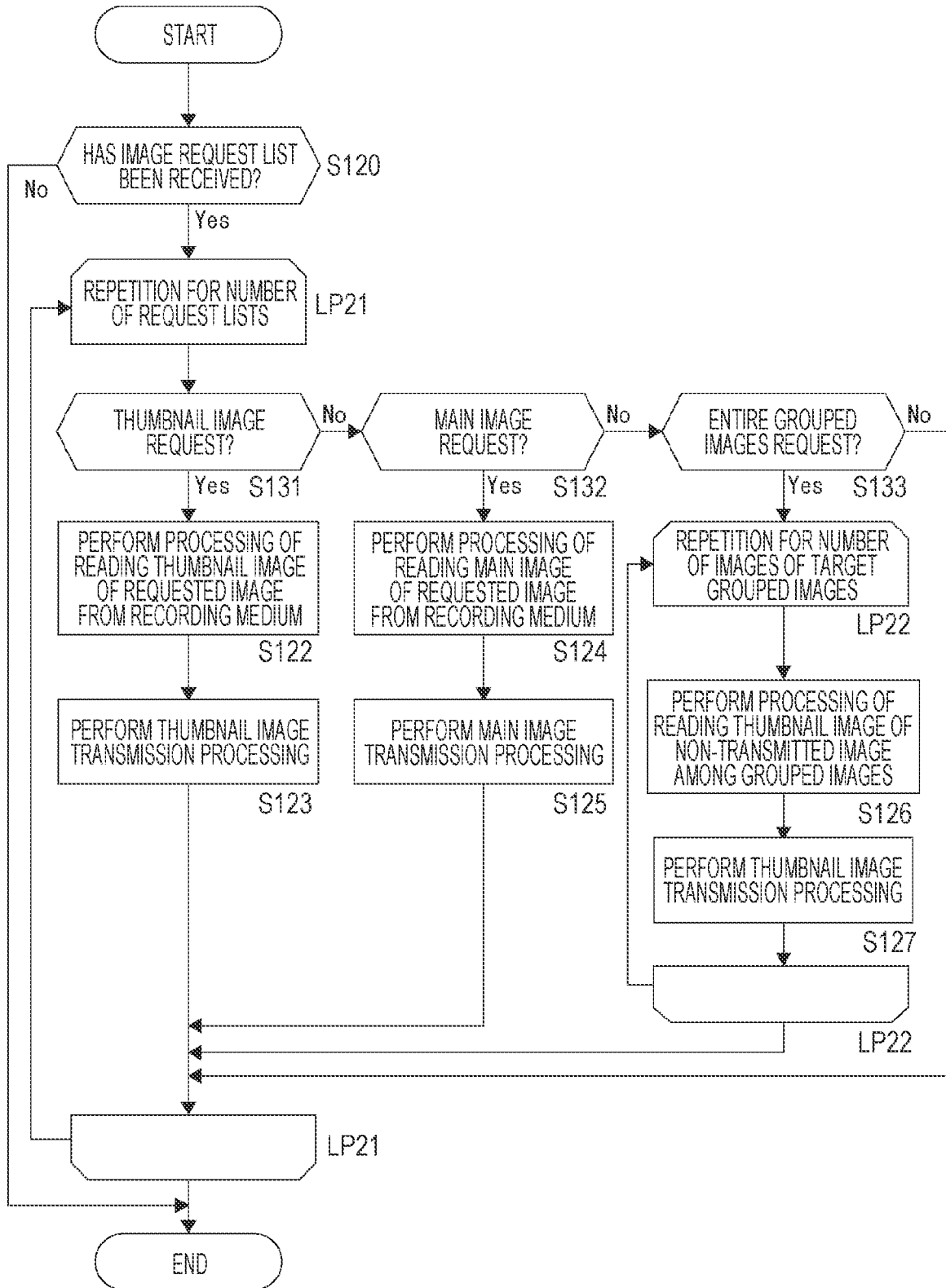
FIG. 28 is a flowchart of processing at the time of image request reception of an imaging apparatus applicable to the seventh transmission pattern of the embodiment.

The processing at the time of receiving the image request of the imaging apparatus 1 is as illustrated in FIG. 28.

It is processing at the time of receiving the request of thumbnail images of entire grouped images in the communication TP25, at the time of receiving the main image request list in the communication TP28, and at the time of receiving the thumbnail image request list in the communication TP5 of FIG. 4.

In step S120, the camera control unit 18 checks the reception of the image request list from the server apparatus 2.

Then, when the image request list is received, the camera control unit 18 executes loop processing LP21.

In the loop processing LP21, the camera control unit 18 repeats processing described below for the number of images related to the request listed in the image request list.

First, in step S131, the camera control unit 18 determines whether or not the image request list is a thumbnail image request list.

In a case where the image request list is the thumbnail image request list, the camera control unit 18 causes the recording control unit 14 to execute reading of the thumbnail image for one image included in the request from the recording medium in step S122.

Then, in step S123, the camera control unit 18 performs processing of transmitting the thumbnail image read from the recording medium to the server apparatus 2 via the communication unit 16.

This is repeated for the number of requested images.

In a case where the received request information is not the thumbnail image request list, the camera control unit 18 determines in step S132 whether or not the image request list is the main image request list. In the case of the main image request list, the camera control unit 18 causes the recording control unit 14 to execute reading of the main image for one image included in the request from the recording medium in step S124.

Then, in step S125, the camera control unit 18 performs processing of transmitting the main image read from the recording medium to the server apparatus 2 via the communication unit 16.

This is repeated for the number of requested images.

In a case where the received request information is neither the thumbnail image request list nor the main image request list, the camera control unit 18 determines in step S133 whether or not it is an entire grouped image request. In this case, the camera control unit 18 performs loop processing LP22.

In the loop processing LP22, steps S126 and S127 are repeated according to the number of images constituting the corresponding continuously imaged grouped images. To be precise, since the thumbnail image of the first image has already been transmitted, it is sufficient if the processing is repeated for the second and subsequent images.

In step S126, the recording control unit 14 executes reading of thumbnail images of non-transmitted images among the continuously imaged grouped images from the recording medium.

Then, in step S127, the camera control unit 18 performs processing of transmitting the thumbnail image read from the recording medium to the server apparatus 2 via the communication unit 16.

When the above processing is performed, and transmission of the thumbnail image or the main image related to the image request list is executed.

Image transmission is performed as the communication TP25, the communication TP29 (or the communication TP9), and the communication TP5.

Note that the processing at the time of receiving the meta information by the server apparatus 2 is as illustrated in FIG. 13, the processing at the time of receiving the image request is as illustrated in FIG. 8, and the processing at the time of receiving the image is as illustrated in FIG. 10.

9. Switching Processing Example I

Although the first transmission pattern to the seventh transmission pattern have been described above mainly assuming a still image as an image, these transmission patterns can be appropriately switched by the server apparatus 2 to realize appropriate communication according to situations or an imaging target.

Examples of switching described below include, but are not limited to, switching the transmission pattern itself such as switching between the first transmission pattern and the fourth transmission pattern, switching between the fifth transmission pattern and the sixth transmission pattern according to situations, and automatically switching from the first transmission pattern to the seventh transmission pattern, for example, in a case where continuous imaging is performed by the imaging apparatus.

For example, in the first transmission pattern, the initial information transfer processing is performed two round trips such that the meta information and the additional information are transmitted in the first round trip to execute the selection in the client terminal 3, and the thumbnail image is transmitted in the second round trip to execute the selection in the client terminal 3, but there are an example in which the main image transfer processing is performed after only one round trip, and an example in which the main image transfer processing is performed from the beginning without performing the initial information transfer processing, and as these examples, switching of reducing or adding the procedure of the transmission pattern is also included.

In the following description, description will be made mainly focusing on switching of the transmission pattern, but it should be understood that it is also applicable to switching of a procedure within the transmission pattern.

Figure 29:
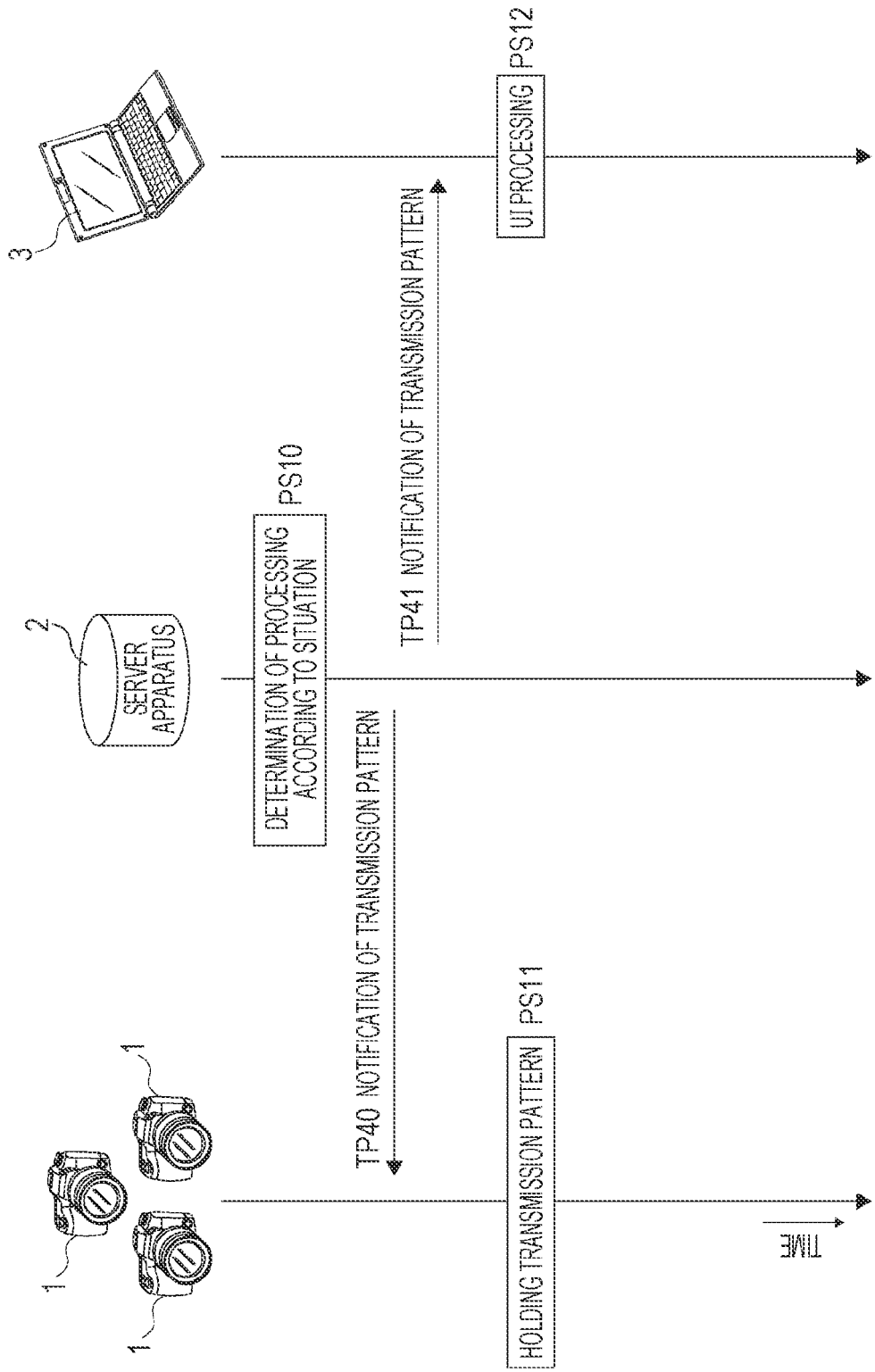
FIG. 29 is an explanatory diagram of Switching Processing Example I of the embodiment.

FIG. 29 illustrates Switching Processing Example I.
Processing PS10

The server apparatus 2 performs situation determination, and determines a transmission pattern to be executed according to the situation. Note that, as described above, it is also possible to make a determination to change the procedure in a certain transmission pattern (for example, the initial information transfer processing is omitted, the initial information transfer processing is performed only one round trip, or the like).

Communication TP40

The server apparatus 2 notifies the imaging apparatus 1 of the determined transmission pattern.
Processing PS11

The imaging apparatus 1 performs setting processing for image delivery according to the notified transmission pattern.

For example, the camera control unit 18 performs the following setting. In the case of the first transmission pattern to the fourth transmission pattern, only the meta information is set to be transmitted at the time of image transfer. In the case of the fifth and sixth transmission patterns, the meta information including the audio memo data is set to be transmitted at the time of image transfer. In the case of the seventh transmission pattern, setting is made to transmit the thumbnail image of the first image of continuously imaged grouped images.

Alternatively, there may be a case where setting is made to omit the initial information transfer processing in a certain transmission pattern.

Communication TP41

The server apparatus 2 notifies the client terminal 3 of the determined transmission pattern.
Processing PS12

The client terminal 3 performs UI processing indicating the notified transmission pattern according to the notified transmission pattern.

Note that the order of the communication TP40 and the communication TP41 described above may be reversed. Furthermore, it is also conceivable that one or both of the communication TP40 and the communication TP41 and the processing PS11 and the processing PS12 corresponding thereto are not performed.

Figure 30:
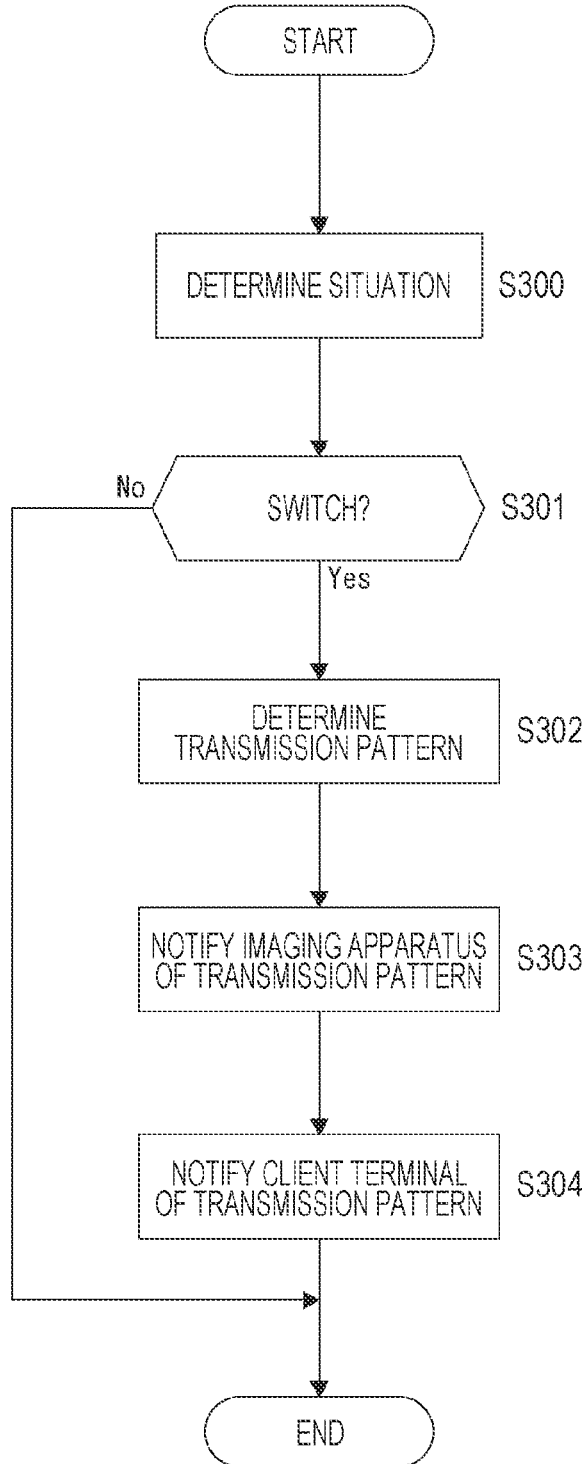
FIG. 30 is a flowchart of switching processing of a server apparatus of the embodiment.

FIG. 30 illustrates a processing example of the server apparatus 2 for performing such switching processing.

In step S300, the control unit 2a performs situation determination. For example, situations such as a communication status such as a current transfer rate and a packet error rate, the number of connected imaging apparatuses 1, and a processing load of the server apparatus 2 itself, are determined.

In step S301, the control unit 2a branches the processing depending on whether or not switching is to be performed as a result of the situation determination. In a case where the switching is not performed, the control unit 2a ends the processing of FIG. 30, but in a case where the switching is performed, the processing proceeds to step S302.

In step S302, the control unit 2a determines a transmission pattern according to the determined situation. For example, an example in which when the communication status with the imaging apparatus 1 side is good, the first transmission pattern is set and, in a case where the communication status is bad, the third transmission pattern is set, when the processing load of the server apparatus 2 itself is light, the first or second transmission pattern is set, and when the processing load is heavy, the third transmission pattern is set, and the like are conceivable.

In step S303, the control unit 2a performs processing of notifying the imaging apparatus 1 of the transmission pattern, and in step S304, performs processing of notifying the client terminal 3 of the transmission pattern.

When switching of the transmission pattern is executed in such processing, an appropriate transmission pattern is selected according to the communication status, the status of the processing load, and the like.

Specific examples of switching according to various situation determinations will be described.

First, there is a situation determination regarding timing.

The server apparatus 2 needs to generate additional information for the first and second transmission patterns. Furthermore, in the sixth transmission pattern, the text conversion processing is required. Therefore, the third, fourth, and fifth transmission patterns are set when the information for generating the additional information is not created, in a case where DB access is not possible, or in a case where text conversion processing is not possible, and the first, second, and sixth transmission patterns are set when the generation of additional information or the like is possible.

A situation determination regarding the processing load of the server apparatus 2 is also conceivable.

In a case where an image list is requested from a large number of client terminal 3 sides, it is desired to reduce the amount of data to be transmitted in order to lower the network load on the server apparatus 2 side. For example, it is desired to send text data rather than audio data. Therefore, it is conceivable to switch to the third transmission pattern in a case where the network load of the server apparatus 2 is high and switch to the fifth transmission pattern in a case where the network load of the server apparatus 2 is low.

Furthermore, in a case where an image is received from a large number of camera sides, it is desired to reduce the amount of data to be transmitted in order to lower the network load on the server apparatus 2 side. For example, in the case of continuously imaged images, it is desired to reduce the data amount by sending the first image. Therefore, it is conceivable to switch to the seventh transmission pattern in a case where the network load on the server apparatus 2 side is high, and switch to the third transmission pattern in a case where the network load on the server apparatus 2 side is low.

Furthermore, in a case where a large number of pieces of meta information are received from a large number of imaging apparatus 1 sides, a data creation processing load on the server apparatus 2 side increases. Therefore, it is conceivable to switch the processing to the third and fourth transmission patterns in a case where the interface processing on the server apparatus 2 side or the processing load of the CPU 71 is high, and switch the processing to the first, second, and fifth transmission patterns in a case where the interface processing on the server apparatus 2 side or the processing load of the CPU 71 is low.

A situation determination from the viewpoint of a use case is also conceivable.

There is a difference in the environment of image capturing place between an outdoor sport in which there is a possibility that the network environment is poor and an indoor/stadium sport in which the network environment is rich. For example, an example is conceivable in which the processing is switched to the third transmission pattern in a case where the network environment is poor and to the fifth transmission pattern in a case where the network environment is rich.

Furthermore, in a case where the network environment is poor, the transmission described in the first to sixth transmission patterns is performed such as meta information transmission, thumbnail image transmission, and main image transmission, but in a situation where the network environment is rich, it is conceivable to reduce the transmission stage by performing thumbnail image transmission and main image transmission (that is, the initial information transfer processing is performed one round trip), main image transmission from the beginning (the initial information transfer processing is not performed), or the like.

There are sports such as track and field or swimming, in which a DB of time, place, and athlete can be created from a competition program, and sports such as marathon and triathlon, in which a DB of time, place, and athlete cannot be created from a competition program. It is conceivable to use the first transmission pattern in a case where a subject event is a DB-creatable sport, and switch to the third, fourth, fifth, and sixth transmission patterns in a case where a subject event is not a DB-creatable sport.

Note that the processing of switching the transmission pattern according to the type of sport to be imaged will be described later as Switching Processing Examples II and III.

A situation determination from the viewpoint of the 5G environment or the 4G environment is also considered.

It is desired to reduce the amount of data to be transmitted depending on the network environment. Therefore, an example is conceivable in which, in the case of the 4G environment, switching to the third and fourth transmission patterns is performed, and in the case of the 5G environment, switching to the first, second, fifth, and sixth transmission patterns is performed.

Meanwhile, in the examples of FIGS. 29 and 30, the server apparatus 2 notifies the client terminal 3 of the transmission pattern, and this enables the client terminal 3 side to display pattern information 44 as illustrated, for example, in FIGS. 31A and 31B and can present to a person in charge in what transmission pattern the image transfer is to be performed. FIG. 31A is an example of the display state before the transfer of the processing PS12 is started, and FIG. 31B is, for example, an example of the display state in the processing PS2 of FIG. 16 or the like.

As the pattern information 44, for example, as illustrated in each example in FIG. 31C, it is conceivable to indicate the content and order of information transmitted to the client terminal 3.

Furthermore, in the examples of FIGS. 29 and 30, the server apparatus 2 automatically performs the switching by the situation determination processing, but the person in charge of the client terminal 3 may be requested for whether or not the switching is possible.

Figure 32:
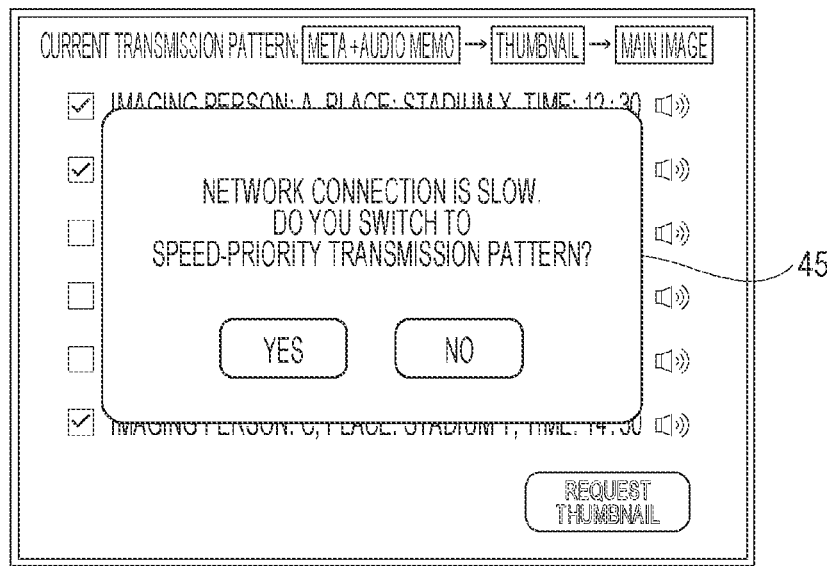
FIG. 32 is an explanatory diagram of UI display requesting a switching instruction of the embodiment.

For example, as illustrated in FIG. 32, a confirmation dialog 45 is displayed on the client terminal 3, and the transmission pattern is switched when the person in charge accepts the switching. The drawing is an example in which, in a case where switching is performed according to the network environment, the person in charge is requested to give approval.

Figure 33:
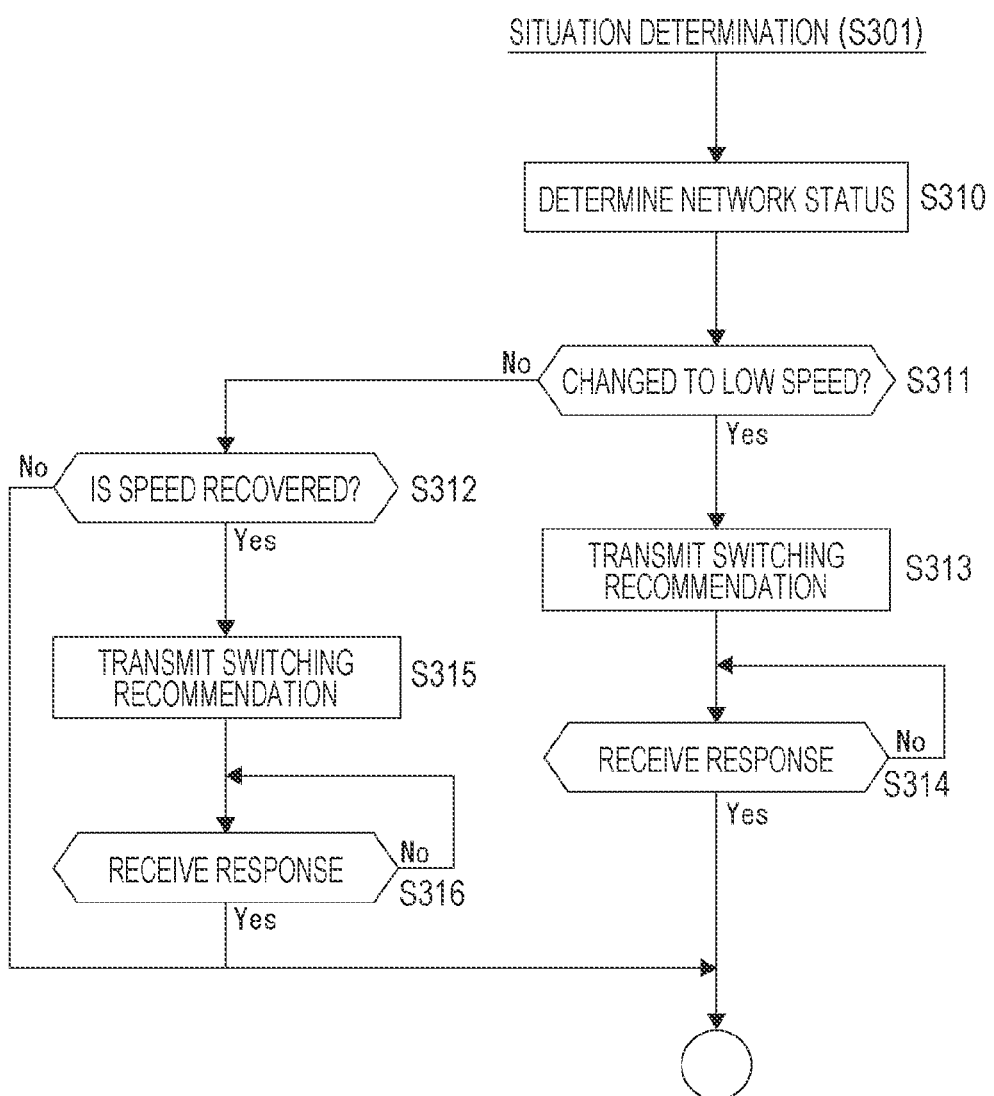
FIG. 33 is a flowchart of situation determination processing of the embodiment.

For this purpose, the server apparatus 2 performs processing as illustrated in FIG. 33, for example, in step S301 of FIG. 30.

In step S310, the control unit 2a performs network status determination processing.

For example, when it is determined that the transfer rate has decreased and the information transfer has been reduced, the control unit 2a proceeds from step S311 to step S313 and transmits a switching recommendation notification to the client terminal 3. In response to this, the client terminal 3 displays the confirmation dialog 45 as illustrated in FIG. 32. Then, in step S314, a response notification from the client terminal 3 side is waited.

When the person in charge performs an operation for accepting the switching and a notification to that effect is given from the client terminal 3, the processing proceeds from step S314 to steps S301 and S302 in FIG. 30, and the transmission pattern is switched.

When the person in charge performs an operation not accepting the switching and a notification to that effect is given from the client terminal 3, the processing proceeds from step S314 to steps S301 in FIG. 30, the transmission pattern is not switched, and the processing of FIG. 30 ends.

When it is determined in the network status determination processing of step S310 that, for example, the transfer rate increases and the state in which information transfer is performed at a high speed is recovered, the control unit 2a proceeds from step S312 to step S315 and transmits a switching recommendation notification to the client terminal 3. In response to this, the client terminal 3 displays the confirmation dialog 45 prompting switching to the transmission pattern under a situation where communication is good. Then, in step S316, the control unit 2a waits for a response notification from the client terminal 3 side.

When the person in charge performs an operation for accepting the switching and a notification to that effect is given from the client terminal 3, the processing proceeds from step S316 to steps S301 and S302 in FIG. 30, and the transmission pattern is switched.

When the person in charge performs an operation not accepting the switching and a notification to that effect is given from the client terminal 3, the processing proceeds from step S316 to steps S301 in FIG. 30, the transmission pattern is not switched, and the processing of FIG. 30 ends.

In this manner, the transmission pattern switching processing may be performed on the basis of both the result of the situation determination and the intention of the person in charge of the client terminal 3.

As a result, it is possible to prevent inappropriate switching from being performed according to the circumstance on the client terminal 3 side.

10. Switching Processing Example II

Figure 34:
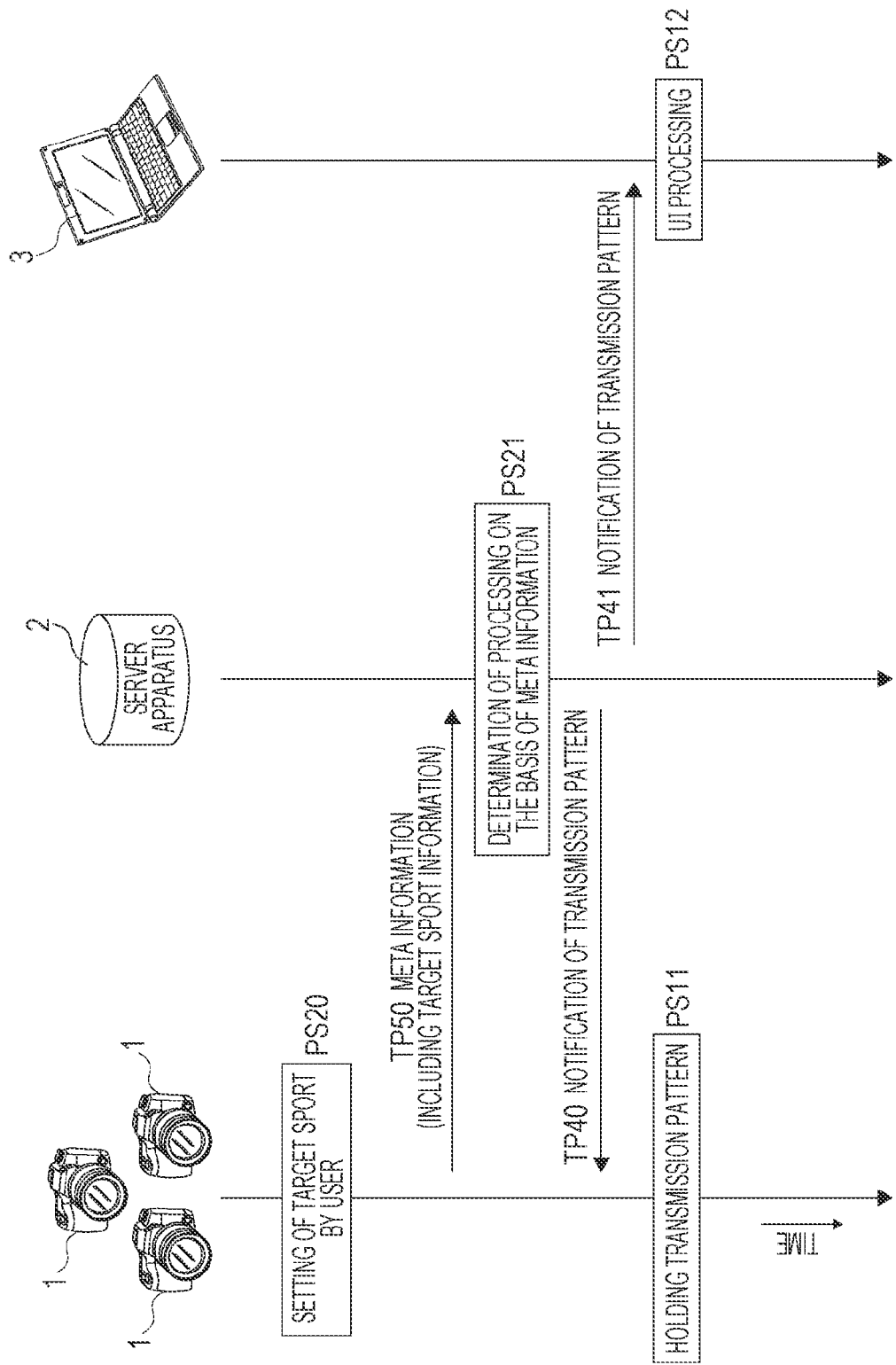
FIG. 34 is an explanatory diagram of Switching Processing Example II of the embodiment.

Switching Processing Example II will be described with reference to FIG. 34.

First, as processing PS20, for example, sport information (information of competition type) of an imaging target is input by the operation of the camera operator, and the competition type is included as the meta information in the imaging apparatus 1.

As communication TP50, the imaging apparatus 1 transmits the meta information including the sport information of the imaging target to the server apparatus 2 at some timing. The transmission timing may be immediately after the processing PS20, or may be when the meta information is first transmitted in the first transmission pattern or the like, for example.

As processing PS21, the server apparatus 2 determines the transmission pattern on the basis of the sport information included in the received meta information.

Thereafter, a notification of the transmission pattern set as the communication TP40 and the communication TP41 is performed similarly to Switching Processing Example I described above. The processing PS11 in the imaging apparatus 1 and the processing PS12 in the client terminal 3 are also similarly performed.

Figure 35:
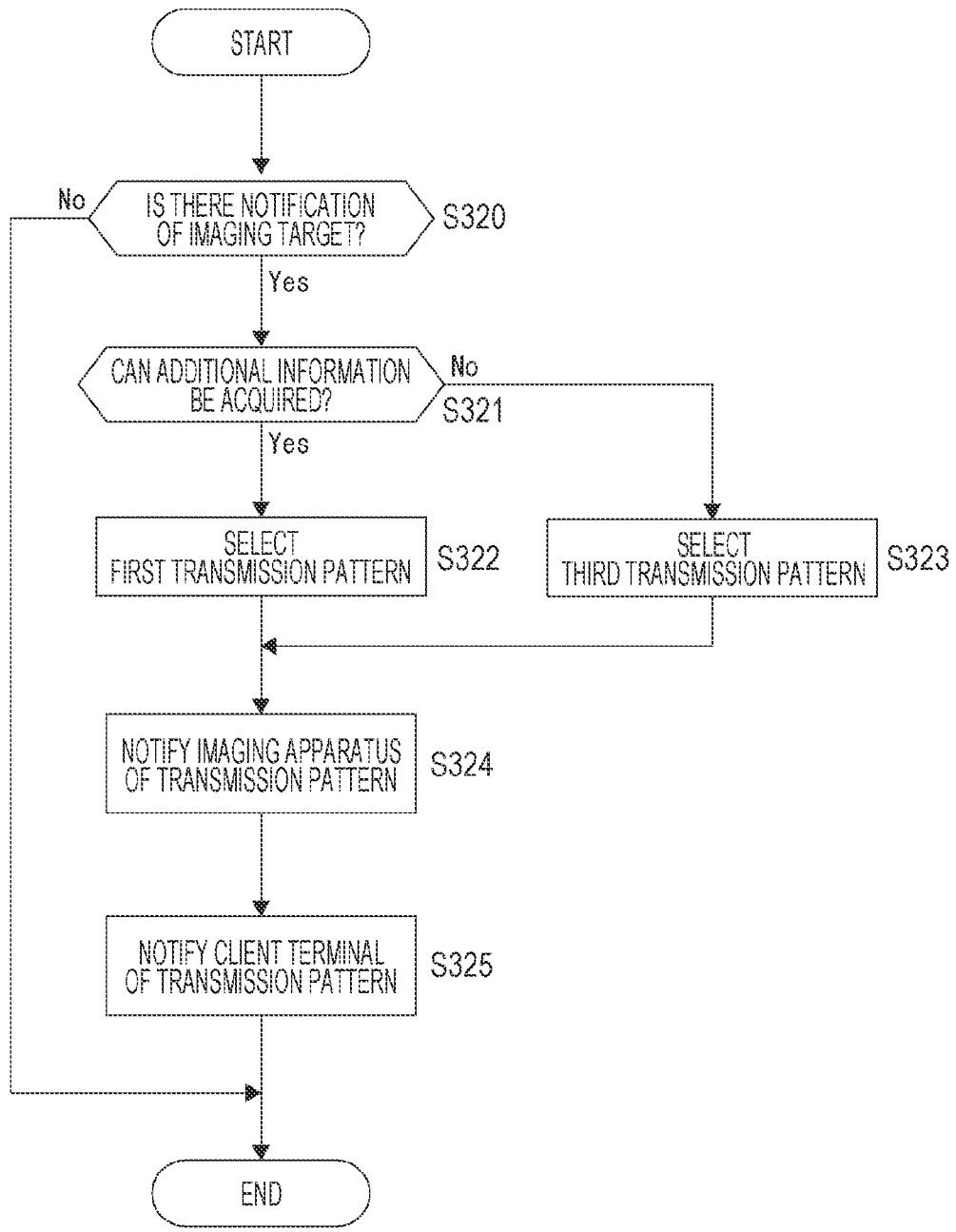
FIG. 35 is a flowchart of switching processing of a server apparatus of the embodiment.

The processing of the server apparatus 2 for such Switching Processing Example II is as illustrated in FIG. 35.

In step S320, the control unit 2a checks whether or not there has been a notification of the imaging target, that is, reception of the sport information from the imaging apparatus 1.

In a case where the sport information has been received, the control unit 2a proceeds to step S321 and determines whether or not an imaging target competition is a competition regarding which additional information can be acquired. For example, in a track and field competition or the like in which a schedule (timetable) is determined, it is possible to obtain information or the like of a player who is a subject of an image as additional information by DB search, but, in a marathon, a soccer, or the like, it is difficult to specify a player appearing in an image from meta information (for example, time or place) of the image by DB search.

Therefore, in the case of a competition regarding which additional information can be acquired by DB search, the control unit 2a proceeds to step S322 and selects the first transmission pattern.

On the other hand, in the case of a competition regarding which additional information is difficult to acquire by DB search, the control unit 2a proceeds to step S323 and selects the third transmission pattern.

Then, the control unit 2a proceeds from step S322 or S323 to step S324, notifies the imaging apparatus 1 of the transmission pattern, and notifies the client terminal 3 of the transmission pattern in step S325.

11. Switching Processing Example III

Figure 36:
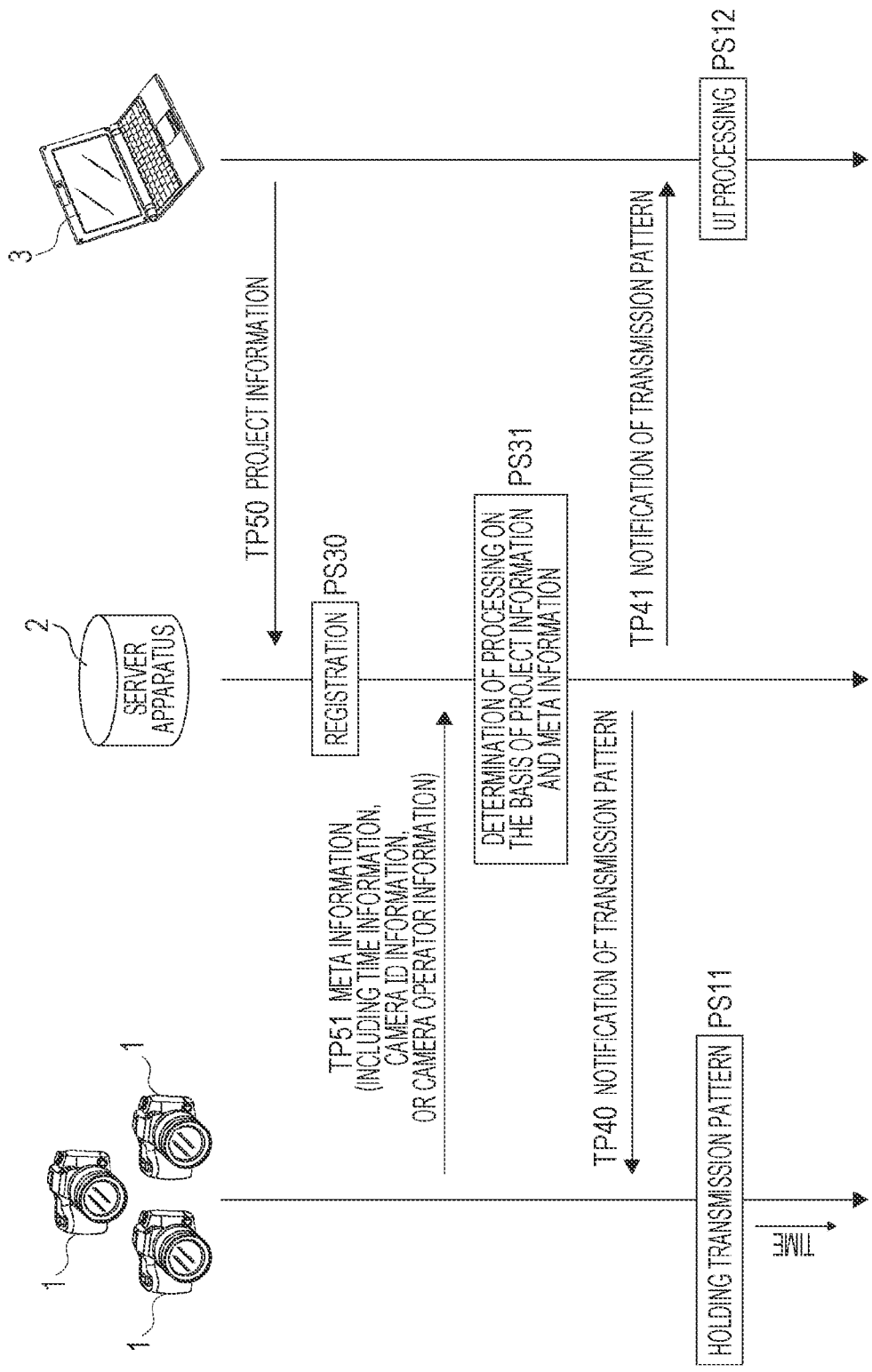
FIG. 36 is an explanatory diagram of Switching Processing Example III of the embodiment.

Switching Processing Example III will be described with reference to FIG. 36.

As the communication TP50, a notification of project information is given from the client terminal 3. The project information is, for example, information in which a camera ID for identifying the imaging apparatus 1 is associated with when and what competition the imaging apparatus 1 performs imaging. Alternatively, it may be information in which camera operator information is associated with when and what competition the camera operator performs imaging.

The server apparatus 2 performs processing of registering the received project information as processing PS30.

The imaging apparatus 1 transmits meta information including time information, a camera ID, or camera operator information to the server apparatus 2 as communication TP51 at some timing. It is sufficient if the transmission timing is when the meta information is first transmitted, for example, in the first transmission pattern or the like, for example.

As processing PS31, the server apparatus 2 refers to the registered project information from the time information, the camera ID, or the camera operator information included in the received meta information, and estimates the competition type to be imaged by the imaging apparatus 1. Then, the transmission pattern is determined depending on whether or not the competition type is a competition for which additional information can be given.

Thereafter, a notification of the transmission pattern set as the communication TP40 and the communication TP41 is performed similarly to Switching Processing Example I. The processing PS11 in the imaging apparatus 1 and the processing PS12 in the client terminal 3 are also similarly performed.

Figure 37:
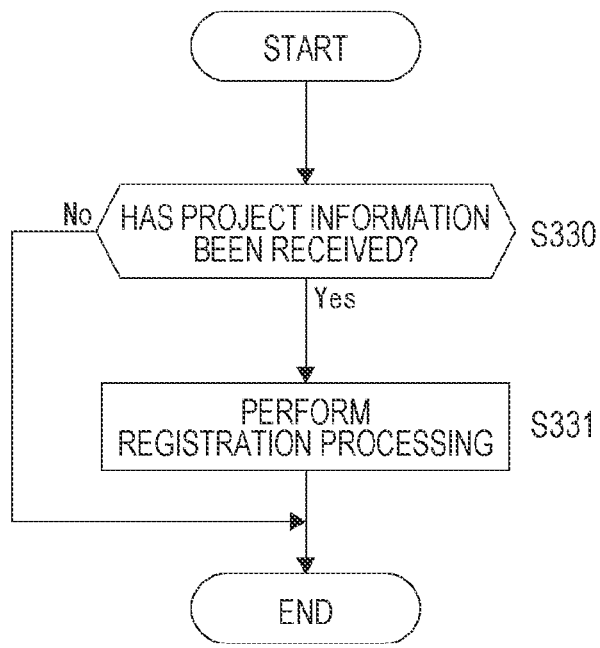
FIG. 37 is a flowchart of processing at the time of project information reception of a server apparatus of the embodiment.
Figure 38:
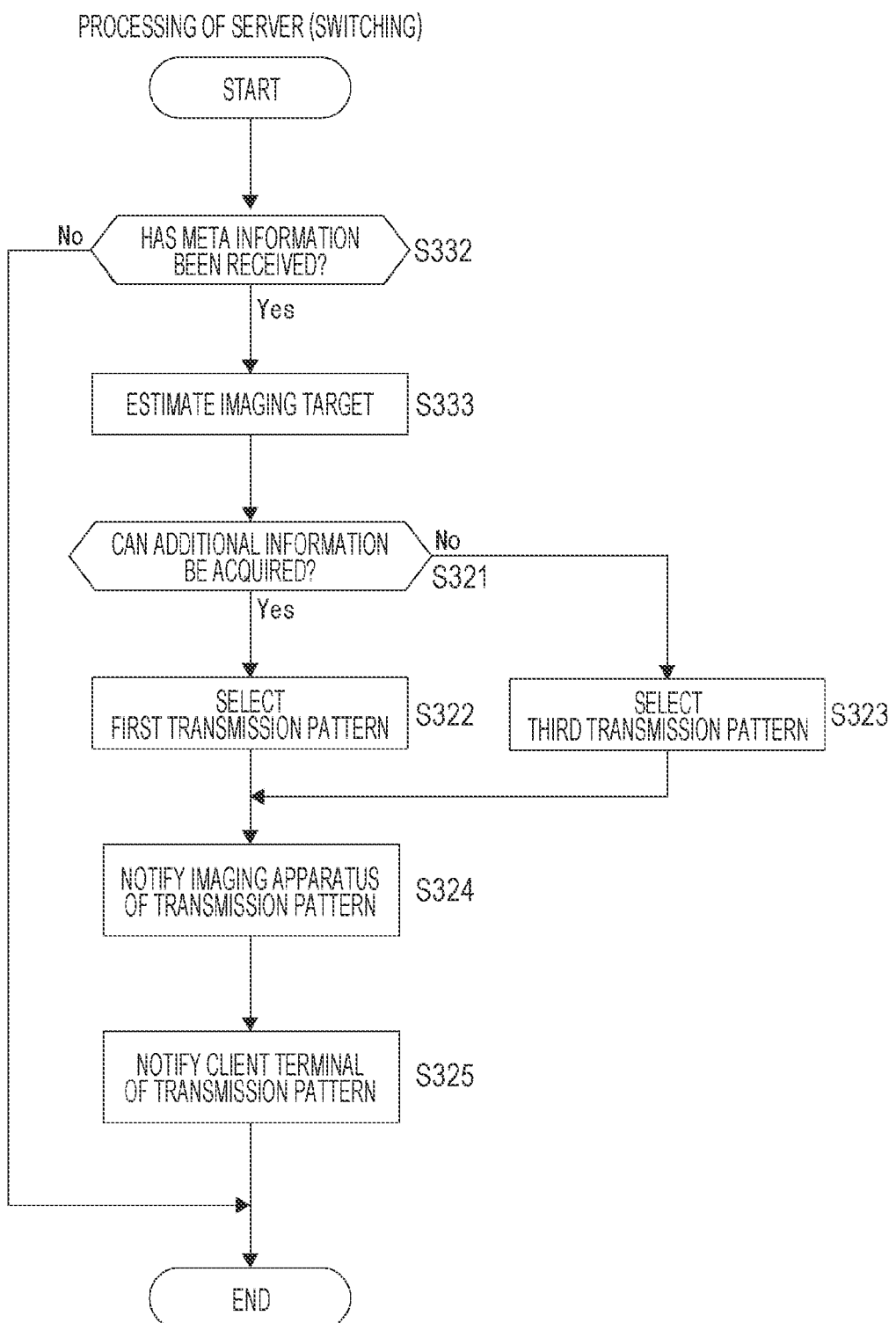
FIG. 38 is a flowchart of switching processing of a server apparatus of the embodiment.

The processing of the server apparatus 2 for such Switching Processing Example III is as illustrated in FIGS. 37 and 38.

In step S330 of FIG. 37, the control unit 2a checks reception of the project information from the client terminal 3. In a case where there is the reception, the processing proceeds to step S331, and project information registration processing is performed. That is, thereafter, the project information is stored in a predetermined storage unit (for example, the storage unit 79) so that the project information can be referred to.

In step S332 of FIG. 38, the control unit 2a checks whether or not there has been reception of the meta information from the imaging apparatus 1. In this case, the reception of the meta information including the time information, the camera ID, or the camera operator information is confirmed.

In a case where the corresponding meta information has been received, the control unit 2a proceeds to step S333 and estimates the competition type to be imaged. That is, the competition type is estimated by collating the meta information with the project information.

In step S321, the control unit 2a determines whether or not the estimated imaging target competition is a competition regarding which additional information can be acquired. Then, in the case of a competition regarding which additional information can be acquired by DB search, the control unit 2a proceeds to step S322 and selects the first transmission pattern. On the other hand, in the case of a competition regarding which additional information is difficult to acquire by DB search, the control unit 2a proceeds to step S323 and selects the third transmission pattern. Then, the control unit 2a proceeds from step S322 or S323 to step S324, notifies the imaging apparatus 1 of the transmission pattern, and notifies the client terminal 3 of the transmission pattern in step S325.

12. Eighth Transmission Pattern

Although the first to seventh transmission patterns and switching thereof have been mainly described above, there is also a corresponding suitable transmission pattern particularly in a case where a transfer image is a moving image. Furthermore, in the switching processing described above, switching to a transmission pattern suitable for a moving image is also assumed.

Transmission patterns suitable for a moving image will be described below as the eighth, ninth, and tenth transmission patterns.

Figure 39:
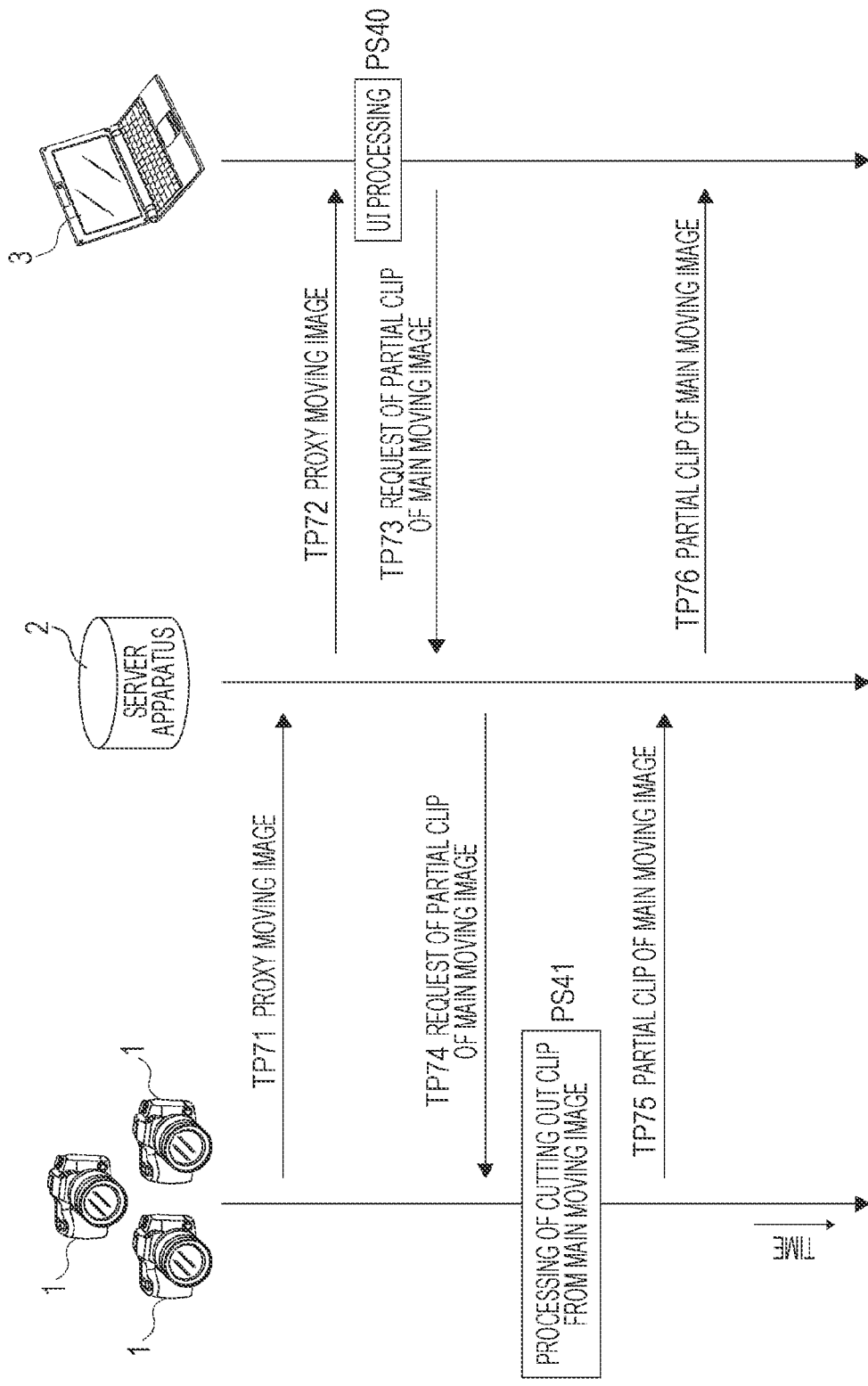
FIG. 39 is an explanatory diagram of an eighth transmission pattern of the embodiment.

FIG. 39 illustrates the eighth transmission pattern.
Communication TP71

The imaging apparatus 1 transmits a proxy moving image to the server apparatus 2. The proxy moving image is a moving image having, for example, a lower resolution and a smaller data amount than a main moving image to be delivered.
Communication TP72

The server apparatus 2 transmits the received proxy moving image to the client terminal 3.

Processing PS40

The client terminal 3 performs UI processing using the received proxy moving image.

Figure 40:
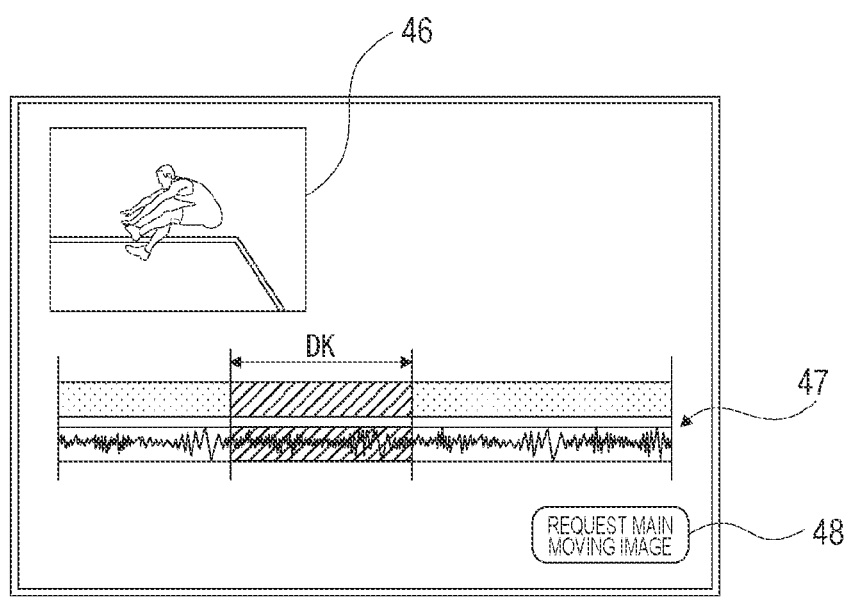
FIG. 40 is an explanatory diagram of an UI screen and the like in the eighth transmission pattern of the embodiment.

For example, the client terminal 3 executes display as illustrated in FIG. 40 on the display unit 77. That is, a proxy moving image reproduction image 46 and a timeline 47 of a moving image are displayed. In the timeline 47, a representative image and a speech waveform at each point of time extracted from the proxy moving image are displayed. Furthermore, on the timeline 47, the person in charge can designate a necessary section DK.

Moreover, a main moving image request button 48 is displayed so that the person in charge can operate.

Such a UI screen is performed for the person in charge of the client terminal 3 to first check the reproduction image of the proxy moving image and designates a section necessary as the main moving image.

The person in charge operates the main moving image request button 48 after designating the section DK.

In the processing PS40, the CPU 71 of the client terminal 3 controls the display of such UI screen and senses the input by the person in charge corresponding to it.
Communication TP73

The client terminal 3 transmits a request of a partial clip of the main moving image to the server apparatus 2. That is, the client terminal 3 generates information requesting the moving image of the section DK designated by the person in charge in the UI processing of the processing PS40, and transmits the information.
Communication TP74

The server apparatus 2 transfers the request of a partial clip of a main moving image received from the client terminal 3 to the imaging apparatus 1.
Processing PS41

In response to receiving the request of a partial clip of a main moving image, the imaging apparatus 1 performs processing of creating a clip obtained by cutting out a designated section from the main moving image.
Communication TP75

The imaging apparatus 1 transmits a partial clip of the main moving image generated in the processing PS41 to the server apparatus 2.
Communication TP76

The server apparatus 2 transfers the partial clip of the main moving image received from the imaging apparatus 1 to the client terminal 3.

Therefore, the main moving image of the scene necessitated by the person in charge is delivered to the client terminal 3.

As described above, the proxy moving image is transferred as the initial information transfer processing instead of transferring the entire main moving image from the beginning, and a necessary section is designated on the client terminal 3 side. Accordingly, as the main image transfer processing, a partial clip of the main moving image in a necessary section is transferred.

Figure 41:
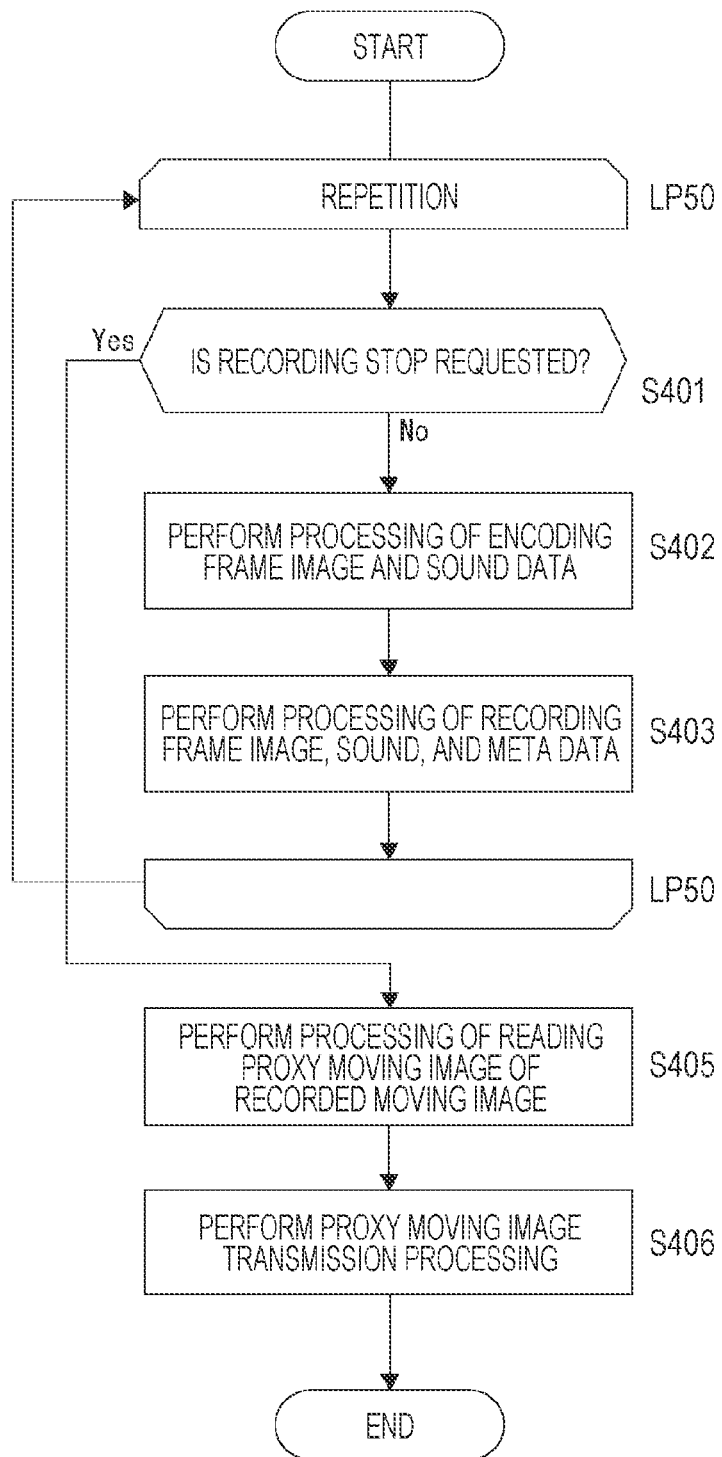
FIG. 41 is a flowchart of processing at the time of moving image recording by an imaging apparatus applicable to the eighth transmission pattern of the embodiment.

FIG. 41 illustrates a processing example at the time of moving image recording by the imaging apparatus 1 for the eighth transmission pattern.

The camera control unit 18 of the imaging apparatus 1 performs moving image recording processing as loop processing LP50 in FIG. 41. That is, until a recording stop request is sensed in step S401, the control of steps S402 and S403 is performed for each frame.

In step S402, the camera control unit 18 causes the camera signal processing unit 13 to execute encoding processing of frame image data and audio data.

In step S403, the camera control unit 18 causes the recording control unit 14 to record the frame image data, the audio data, and the meta information on the recording medium.

For example, when recording stop is requested by an operation of the camera operator or the like, the camera control unit 18 proceeds to step S405 and performs control of reading the proxy moving image for the recorded moving image. For example, the recording control unit 14 executes moving image reading, and the camera signal processing unit 13 performs low resolution conversion or the like to generate a proxy moving image.

Then, in step S406, the camera control unit 18 controls the communication unit 16 to transmit the proxy moving image.

Through the above processing, the communication TP71 of FIG. 39 is performed.

Figure 42:
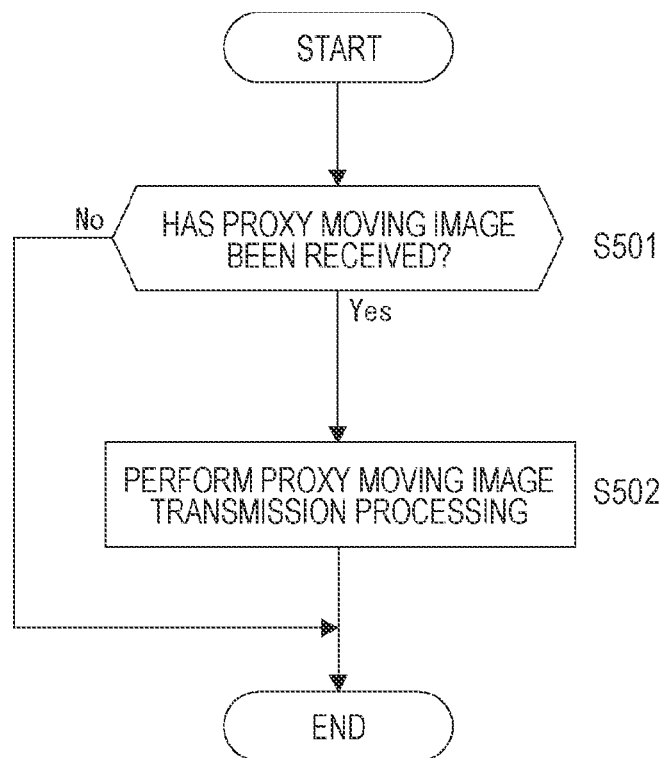
FIG. 42 is a flowchart of processing at the time of proxy moving image reception of a server apparatus applicable to the eighth transmission pattern of the embodiment.

The processing of the server apparatus 2 for the communication TP72 of FIG. 39 is illustrated in FIG. 42.

In step S501, the control unit 2a of the server apparatus 2 checks the reception of a proxy moving image from the imaging apparatus 1.

Then, when the proxy moving image is being received, the control unit 2a executes processing of transmitting the proxy moving image to the client terminal 3 in step S502.

In response to this, the client terminal 3 side performs the UI processing as the processing PS40 as described above, and transmits the request of a partial clip of the main moving image as the communication TP73.

The processing of the server apparatus 2 for the communication TP74 in response to the request of a partial clip of the main moving image is similar to that in FIG. 8 described above.

Figure 43:
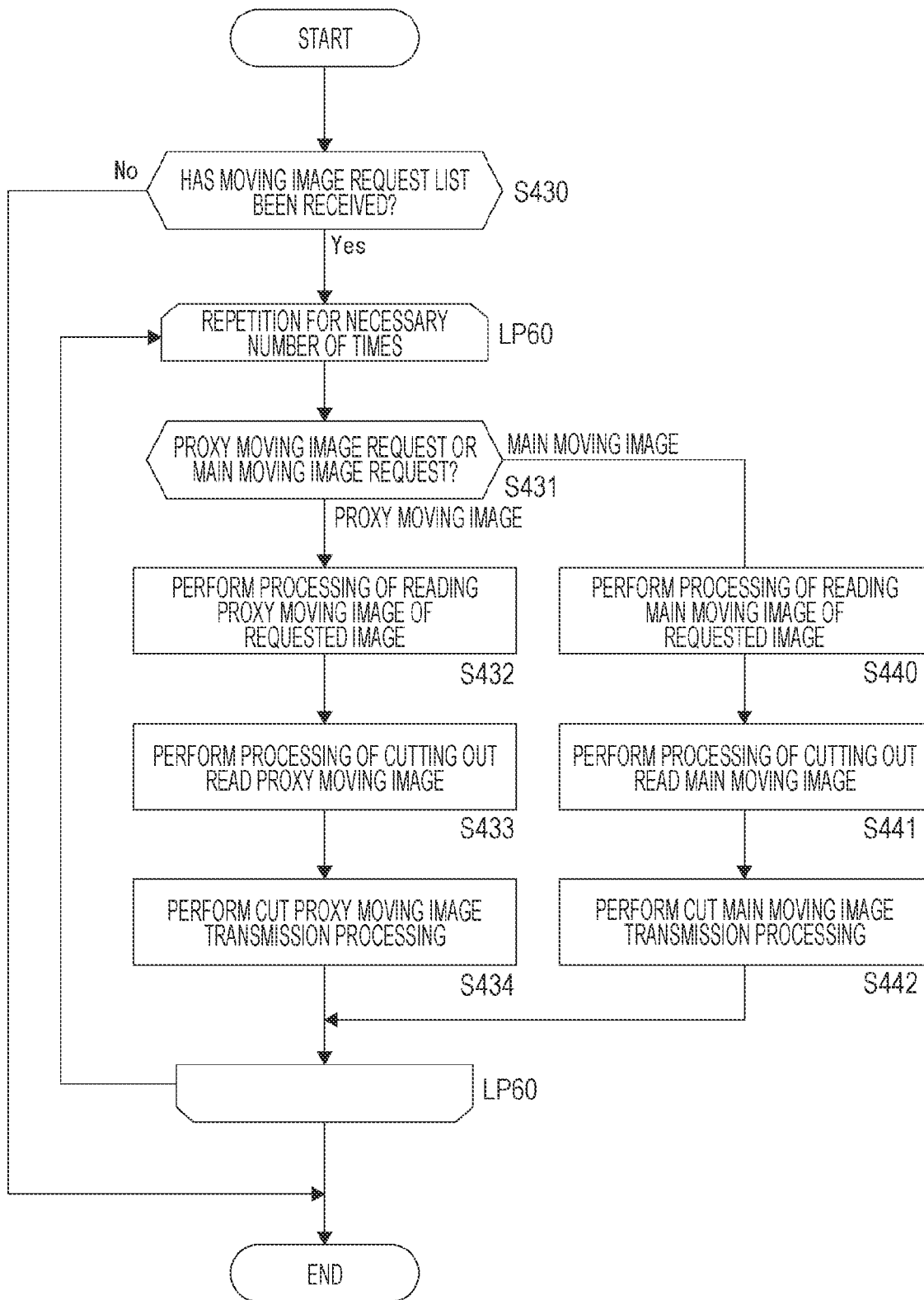
FIG. 43 is a flowchart of processing at the time of moving image clip request reception of an imaging apparatus applicable to eighth, ninth, and tenth transmission patterns of the embodiment.

A processing example of the imaging apparatus 1 for the processing PS41 and the communication TP75 is illustrated in FIG. 43.

In step S430, the camera control unit 18 checks the reception of a moving image request from the server apparatus 2.

Then, when a moving image request list is received, the camera control unit 18 executes loop processing LP60.

In the loop processing LP60, the camera control unit 18 repeats the processing of steps S431 to S442 a necessary number of times (the number of requested moving images) according to the content of the moving image request.

First, in step S431, the camera control unit 18 determines whether the moving image request content is a proxy moving image or a main moving image (request of partial clip of main moving image), and branches the processing.

Note that the case where the proxy moving image is requested occurs in the ninth transmission pattern and the tenth transmission pattern to be described later, and the processing from steps S432 to S434 will be described later.

In the case of the request of a partial clip of the main moving image, the camera control unit 18 performs processing of steps S440, S441, and S442.

In step S440, the camera control unit 18 causes the recording control unit 14 to read the main moving image from the recording medium.

In step S441, the camera control unit 18 causes, for example, the camera signal processing unit 13 to execute processing of cutting out the requested section from the main moving image read from the recording medium.

Then, in step S442, the camera control unit 18 performs processing of transmitting the main moving image partial clip generated in the cutting processing to the server apparatus 2 via the communication unit 16.

Figure 44:
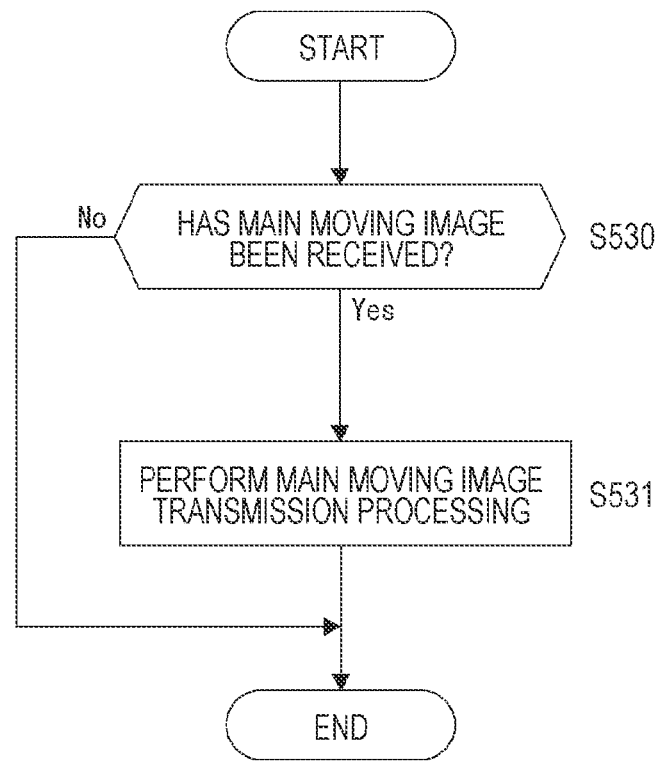
FIG. 44 is a flowchart of processing at the time of main moving image clip reception of a server apparatus applicable to the eighth, ninth, and tenth transmission patterns of the embodiment.

The processing of the server apparatus 2 for the communication TP76 is illustrated in FIG. 44.

In step S530, the control unit 2a of the server apparatus 2 checks the reception of a main moving image from the imaging apparatus 1.

Then, when the main moving image is received, the control unit 2a performs processing of transmitting the received main moving image to the client terminal 3 in step S531.

Therefore, a partial clip of the main moving image is delivered to the client terminal 3.

13. Ninth Transmission Pattern

The ninth transmission pattern will be described with reference to FIG. 45.

Communication TP81

The imaging apparatus 1 transmits a sound-only file to the server apparatus 2 for a moving image. The sound-only file is a file with only audio data recorded at the time of moving image recording.

Communication TP82

The server apparatus 2 transmits the received sound-only file to the client terminal 3.

Processing PS42

The client terminal 3 performs UI processing using the received sound-only file.

For example, the client terminal 3 executes display as illustrated in FIG. 46A on the display unit 77. In this case, since only the sound-only file is received, the proxy moving image reproduction image 46 cannot be reproduced and a blank image is provided. As the timeline 47, only a speech waveform is displayed.

Moreover, a proxy moving image request button 49 is displayed so that the person in charge can operate.

Such a UI screen is performed for the person in charge of the client terminal 3 to first designate a roughly necessary section from the timeline 47 of the speech waveform. For example, it is possible to determine a section in which the audience is excited according to the speech waveform, or the like.

The person in charge operates the proxy moving image request button 49 after designating a section DKA.

In the processing PS42, the CPU 71 of the client terminal 3 controls the display of such UI screen and senses the input by the person in charge corresponding to it.

Communication TP83

The client terminal 3 transmits a request of a partial clip of the proxy moving image to the server apparatus 2. That is, the client terminal 3 generates information requesting the proxy moving image of the section DKA designated by the person in charge in the UI processing of the processing PS42, and transmits the information.

Communication TP84

The server apparatus 2 transfers the request of a partial clip of a proxy moving image received from the client terminal 3 to the imaging apparatus 1.

Processing PS43

In response to receiving the request of a partial clip of a proxy moving image, the imaging apparatus 1 performs processing of creating a clip of the proxy moving image obtained by cutting out a designated section.

Communication TP85

The imaging apparatus 1 transmits a proxy moving image partial clip generated in the processing PS43 to the server apparatus 2.

The server apparatus 2 transmits the received proxy moving image to the client terminal 3 as the communication TP72.

The communication TP72 and the subsequent communication are similar to the communication TP72 and the subsequent communication illustrated in FIG. 39.

In the client terminal 3, the UI display as illustrated in FIG. 46B is executed as the processing PS40. This is a display content similar to that in FIG. 40.

However, this case is different from the example of FIG. 39 in that the proxy moving image is not the proxy moving image of the entire moving image recorded by the imaging apparatus 1 but the proxy moving image of the section designated in the processing PS42.

Since the communication TP73 and the subsequent communication are repeated, the description thereof will be omitted.

That is, in the ninth transmission pattern, first, a section is roughly designated by using the sound-only file, a proxy moving image is transmitted according to the designated section, and the client terminal 3 side checks the proxy moving image and designates a necessary section. Accordingly, as the main image transfer processing, a partial clip of the main moving image in a necessary section is transferred.

Figure 47:
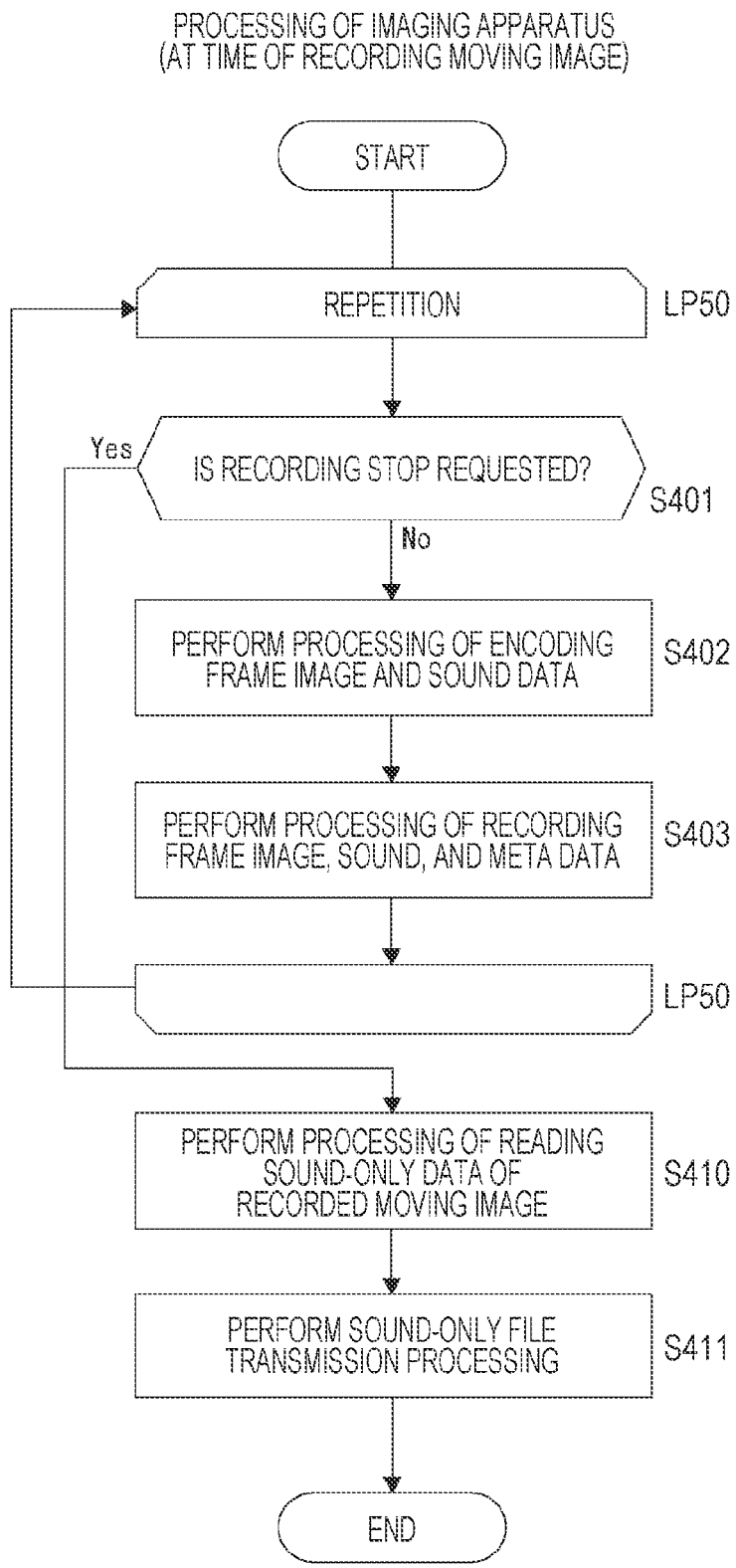
FIG. 47 is a flowchart of processing at the time of moving image recording by an imaging apparatus applicable to the ninth transmission pattern of the embodiment.

FIG. 47 illustrates a processing example at the time of moving image recording by the imaging apparatus 1 for the ninth transmission pattern.

The camera control unit 18 of the imaging apparatus 1 performs moving image recording processing as loop processing LP50 similarly to FIG. 41.

Thereafter, for example, when recording stop is requested by an operation of the camera operator or the like, the camera control unit 18 proceeds to step S410 and performs control of reading the audio data only for the recorded moving image. For example, only the audio data is read out of the moving image file by the recording control unit 14, and the sound-only file is generated by the camera signal processing unit 13.

Then, in step S411, the camera control unit 18 controls the communication unit 16 to transmit the sound-only file.

Figure 45:
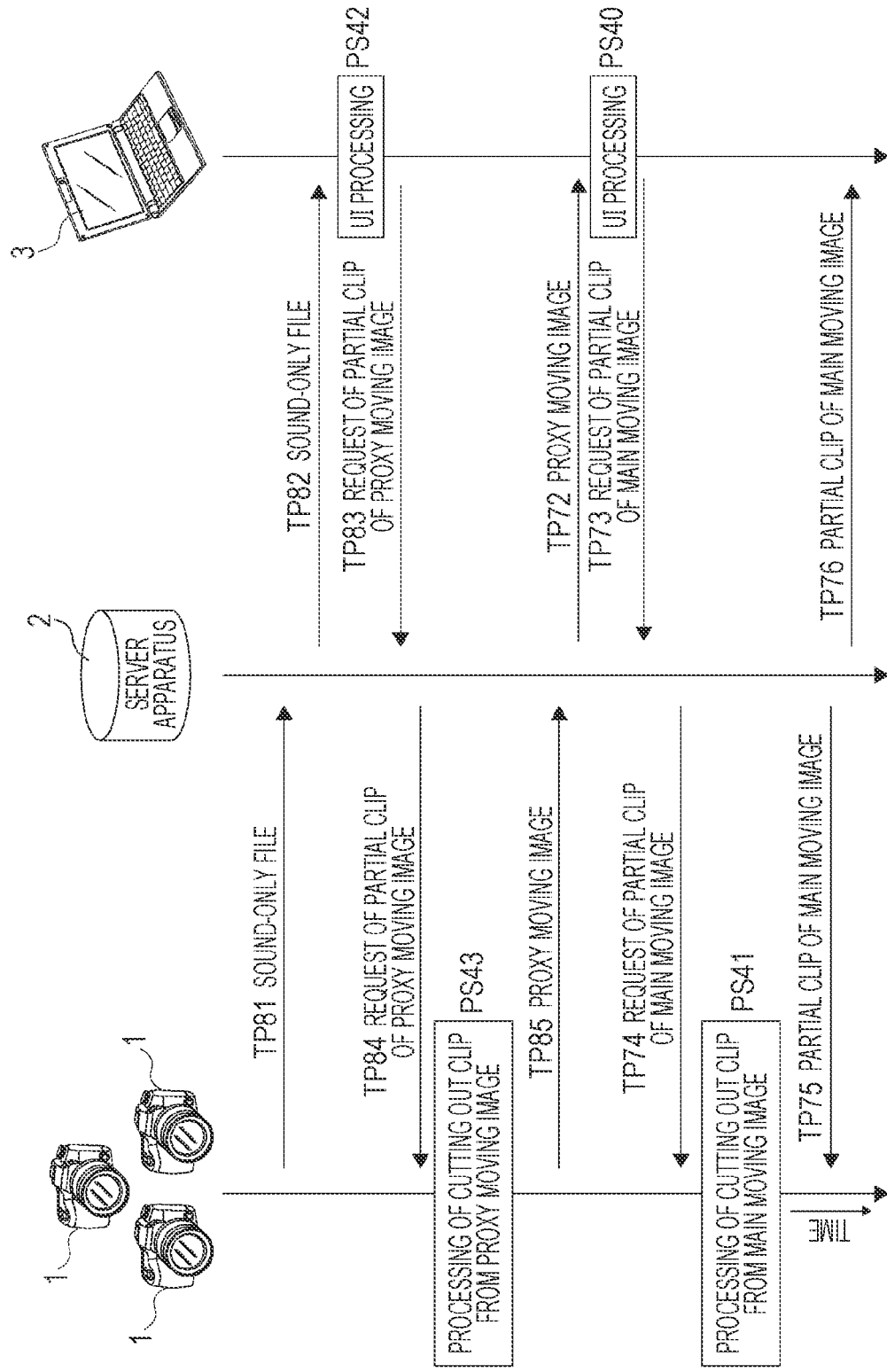
FIG. 45 is an explanatory diagram of the ninth transmission pattern of the embodiment.

Through the above processing, the communication TP81 of FIG. 45 is performed.

Figure 48:
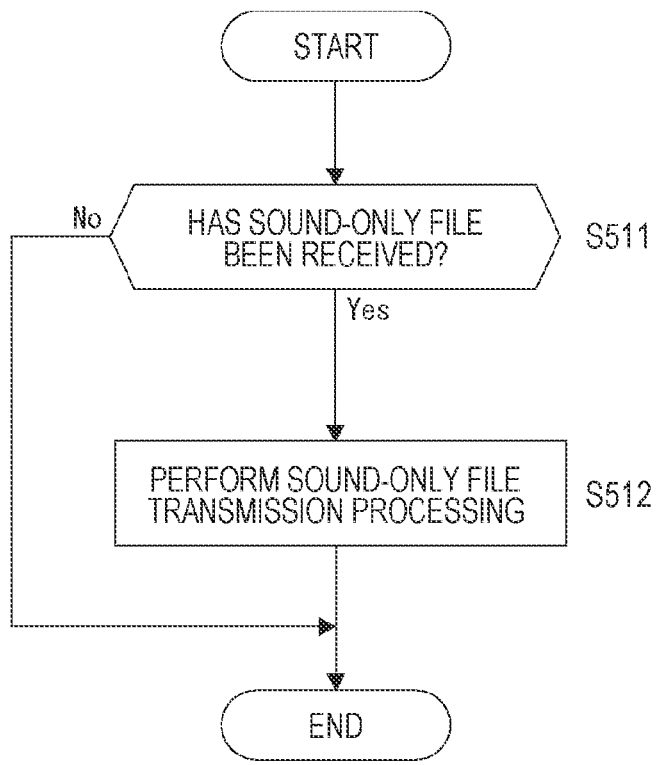
FIG. 48 is a flowchart of processing at the time of sound-only file reception of a server apparatus applicable to the ninth transmission pattern of the embodiment.

The processing of the server apparatus 2 for the communication TP82 is illustrated in FIG. 48.

In step S511, the control unit 2a of the server apparatus 2 checks the reception of the sound-only file from the imaging apparatus 1.

Then, when the sound-only file is being received, the control unit 2a executes processing of transmitting the sound-only file to the client terminal 3 in step S512.

In response to this, the client terminal 3 side performs the UI processing as the processing PS42 as described above, and transmits the request of a partial clip of the proxy moving image as the communication TP83.

The processing of the server apparatus 2 for the communication TP84 in response to the request of a partial clip of the proxy moving image is similar to that in FIG. 8 described above.

The processing PS43 of the imaging apparatus 1 and the processing for the communication TP85 are performed according to FIG. 43 described above.

That is, in a case where the request of a partial clip of the proxy moving image is received, the processing proceeds from step S431 to step S432 in FIG. 43.

In step S432, the camera control unit 18 causes the recording control unit 14 to read the proxy moving image from the recording medium.

In step S433, the camera control unit 18 causes, for example, the camera signal processing unit 13 to execute processing of cutting out the requested section from the proxy moving image read from the recording medium.

Then, in step S434, the camera control unit 18 performs processing of transmitting the proxy moving image partial clip generated in the cutting processing to the server apparatus 2 via the communication unit 16.

Processing of the server apparatus 2 and the imaging apparatus 1 after the communication TP72 in FIG. 45 is similar to that described with respect to the eighth transmission pattern.

14. Tenth Transmission Pattern

The tenth transmission pattern will be described with reference to FIG. 49.
Communication TP91

The imaging apparatus 1 transmits a meta time-series file to the server apparatus 2 for a moving image. The meta time-series file is a file of data that can present meta information (for example, imaging position information) generated at the time of moving image recording in time series.
Communication TP92

The server apparatus 2 transmits the received meta time-series file to the client terminal 3.
Processing PS44

The client terminal 3 performs UI processing using the received meta time-series file.

Figure 50:
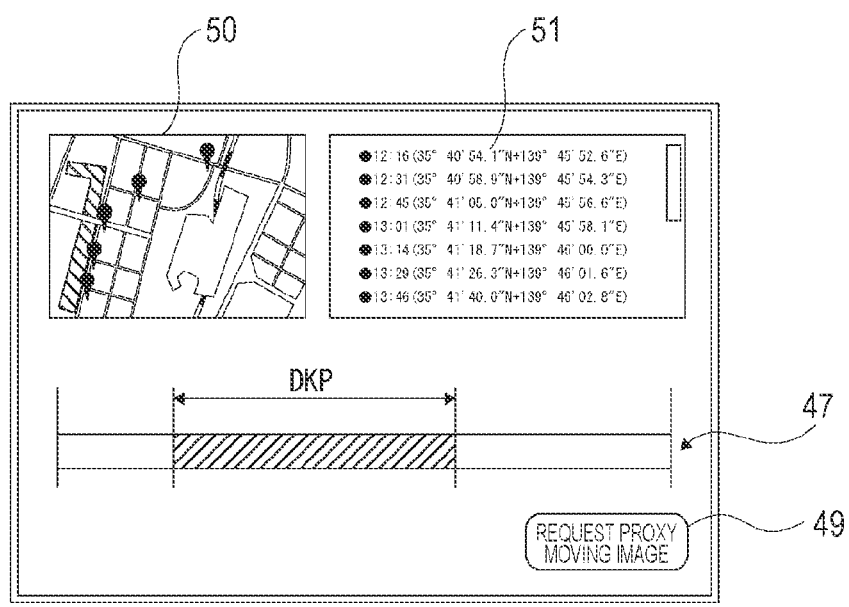
FIG. 50 is an explanatory diagram of an UI screen and the like in the tenth transmission pattern of the embodiment.

For example, the client terminal 3 executes display based on the meta time-series file as illustrated in FIG. 50 on the display unit 77. For example, in a case where a time-series change in the imaging position information can be determined as the meta time-series file, a map image 50 and time-series information 51 according to the imaging position information are displayed. In the map image 50, each imaging position is indicated by a marker. The time-series information 51 indicates time and imaging position information in time series in association with each other. As the timeline 47, only that indicating a section length is displayed. In the timeline 47, it is desirable to display the position at each point of time.

The proxy moving image request button 49 is also displayed so that the person in charge can operate.

Such a UI screen is performed for the person in charge of the client terminal 3 to roughly designate a section in which a necessary subject is considered to appear from the imaging position. By knowing information that some event has occurred at a certain place at a certain time, the person in charge can determine a moving image section that may be imaged for the event.

The person in charge operates the proxy moving image request button 49 after designating a section DKP.

In the processing PS44, the CPU 71 of the client terminal 3 controls the display of such UI screen and senses the input by the person in charge corresponding to it.

As the communication TP83, the client terminal 3 generates information requesting the proxy moving image of the section DKP designated by the person in charge in the UI processing of the processing PS44, and transmits the information.

Since the communication TP83 and the subsequent communication are similar to the that of the ninth transmission pattern illustrated in FIG. 45, the description thereof is omitted.

That is, in the tenth transmission pattern, first, a section is roughly designated by using the time-series information, a proxy moving image is transmitted according to the designated section, and the client terminal 3 side checks the proxy moving image and designates a necessary section. Accordingly, as the main image transfer processing, a partial clip of the main moving image in a necessary section is transferred.

Figure 51:
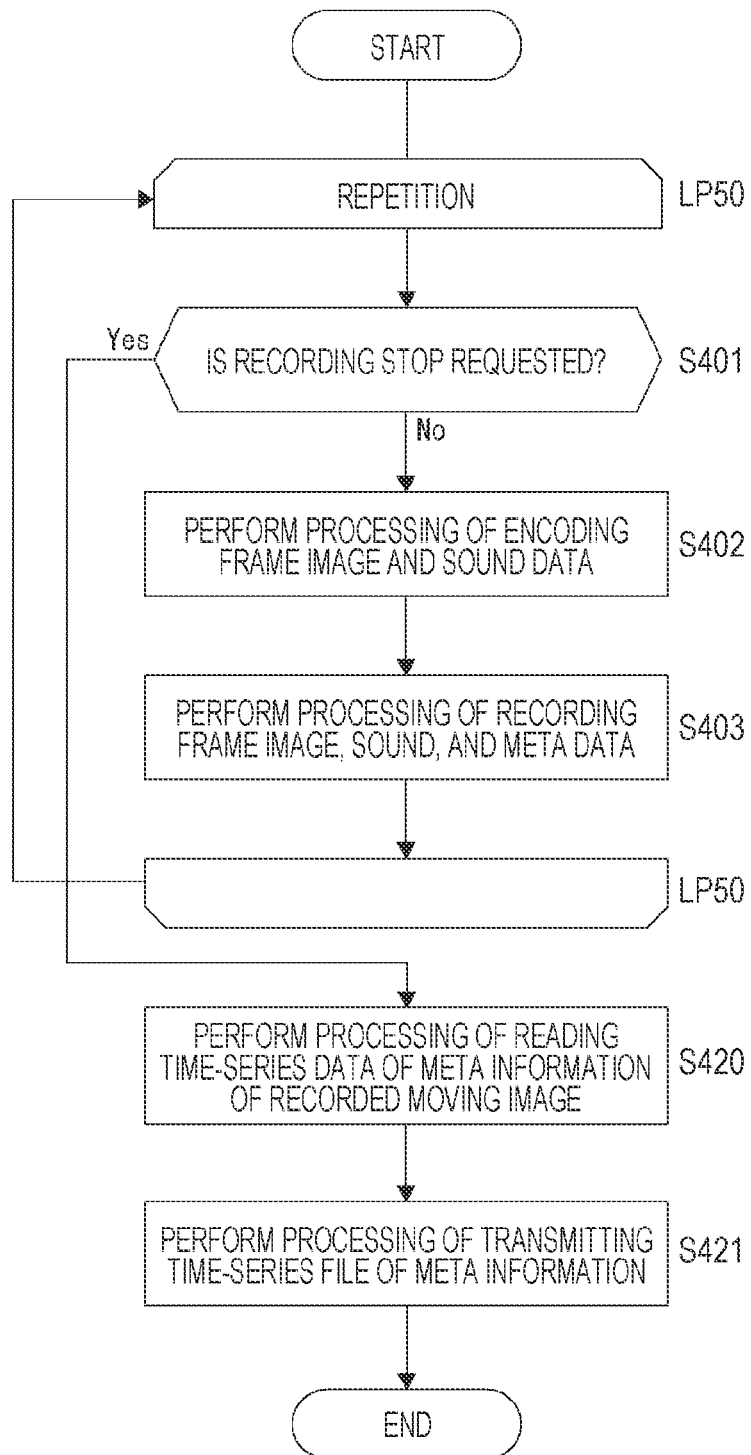
FIG. 51 is a flowchart of processing at the time of moving image recording by an imaging apparatus applicable to the tenth transmission pattern of the embodiment.

FIG. 51 illustrates a processing example at the time of moving image recording by the imaging apparatus 1 for the tenth transmission pattern.

The camera control unit 18 of the imaging apparatus 1 performs moving image recording processing as loop processing LP50 similarly to FIG. 41.

Thereafter, for example, when recording stop is requested by an operation of the camera operator or the like, the camera control unit 18 proceeds to step S420 and performs control of reading the time-series data of the meta information for the recorded moving image. For example, the meta information of the moving image file is read out by the recording control unit 14, and the time-series file is generated by the camera signal processing unit 13.

Then, in step S421, the camera control unit 18 controls the communication unit 16 to transmit the time-series file.

Figure 49:
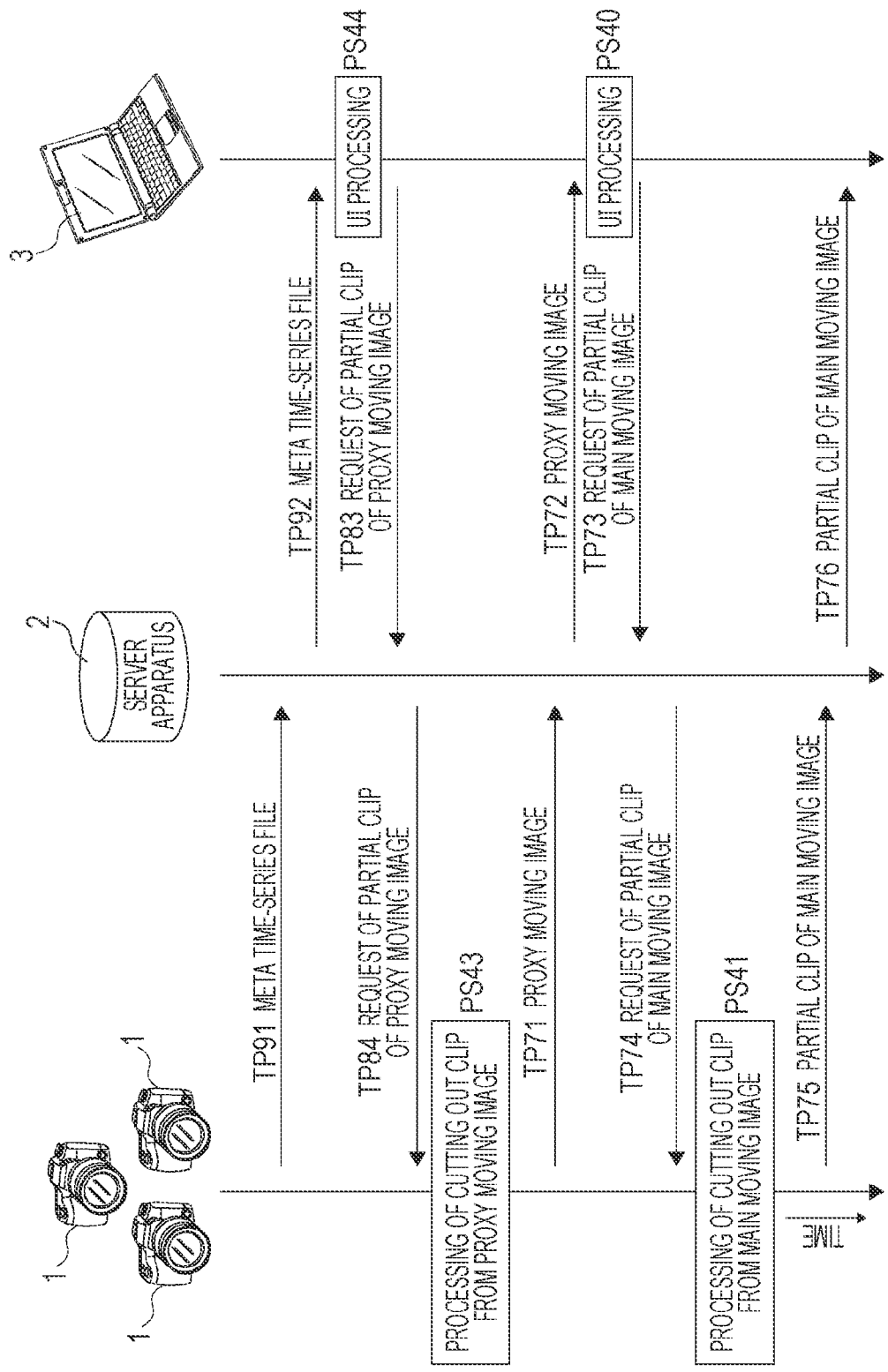
FIG. 49 is an explanatory diagram of the tenth transmission pattern of the embodiment.

Through the above processing, the communication TP91 of FIG. 49 is performed.

The processing of the server apparatus 2 for the communication TP92 is illustrated in FIG. 52.

In step S521, the control unit 2a of the server apparatus 2 checks the reception of the time-series file from the imaging apparatus 1.

Then, when the time-series file is being received, the control unit 2a executes processing of transmitting the time-series file to the client terminal 3 in step S522.

In response to this, the client terminal 3 side performs the UI processing as the processing PS44 as described above, and transmits the request of a partial clip of the proxy moving image as the communication TP83.

Subsequent processing of the server apparatus 2 and the imaging apparatus 1 is similar to that described with respect to the eighth and ninth transmission patterns.

15. Summary and Variation Example

According to the above embodiment, the following effects can be obtained.

The control unit 2a of the server apparatus 2 of the embodiment performs the initial information transfer processing of obtaining additional information on the basis of associated information and transmitting the associated information and the additional information to the client terminal 3 in response to reception of the associated information which is information associated with an image captured by the imaging apparatus 1 and has a smaller data amount than the image. Furthermore, the control unit 2a performs the main image transfer processing of transmitting the image transmitted from the imaging apparatus 1 to the client terminal 3 according to request information generated by selection processing in the client terminal 3 based on the transmission of the associated information or the additional information.

By performing such processing, the server apparatus 2 can appropriately transfer a high-definition main image required on the client terminal 3 side while realizing image transfer that does not increase a network load and a storage capacity load of a system at a site where immediate delivery after imaging of, for example, news reporting or the like is required and does not cause a transfer delay.

Furthermore, since the presentation based on the associated information can be executed in the client terminal 3, an environment in which a person in charge can easily and appropriately select a necessary image can be provided.

Note that, as a specific example of the information processing apparatus as the server apparatus 2 or the client terminal 3, for example, various examples such as a personal computer apparatus, a tablet type information processing apparatus, a mobile phone apparatus, game equipment, audio equipment, video equipment, a communication apparatus, a television apparatus, and a server apparatus are assumed. An apparatus capable of performing calculation as information processing, for example, an apparatus incorporating a microcomputer can be implemented as the information processing apparatus of the present disclosure.

Furthermore, although the MEC 5 is illustrated in FIG. 1, the MEC 5 may have a function to replace the server apparatus 2 in the embodiment.

Further, the MEC 5 may have a part of the function (transmission function) of the imaging apparatus 1.

The example has been described in which the server apparatus 2 of the embodiment obtains the additional information by performing the DB search on the basis of the associated information (for example, the meta information) in the initial information transfer processing (see the first transmission pattern).

By obtaining more detailed additional information from the meta information or the like regarding the main image by DB search, it is possible to provide information suitable for image selection more easily understandable to the person in charge on the client terminal 3 side. Therefore, the selection operation is optimized, and the network communication efficiency is also improved.

In the embodiment, the example has been described in which an image (for example, a thumbnail image) having a smaller data amount and representing an image captured by the imaging apparatus 1 is included as the associated information, and the server apparatus 2 obtains the additional information by image recognition processing for the image included in the associated information in the initial information transfer processing (see the second transmission pattern).

Also when the information of the subject is obtained by image analysis and is used as the additional information, it is possible to provide information suitable for image selection more easily understandable to the person in charge on the client terminal 3 side, which also contributes to optimization of the selection operation and improvement of network communication efficiency.

As described above, the server apparatus 2 of the embodiment performs, as the initial information transfer processing, the switching processing of the plurality of transmission patterns including the first and second transmission patterns to which the additional information is added and the transmission patterns (the second to tenth transmission patterns) to which the additional information is not added.

Since there are environments, situations, image (subject) contents, and the like that are not suitable for the transfer of the additional information, it is not always appropriate for the server apparatus 2 to perform processing of obtaining the additional information. Therefore, in some cases, the server apparatus 2 does not perform the processing of obtaining the additional information, so that the processing suitable for the situation and circumstance can be executed. This also contributes to reduction in server load, improvement in network efficiency, and the like.

In the embodiment, the example has been described in which the server apparatus 2 performs processing of transmitting audio information included in the associated information to the client terminal 3 as transmission of a predetermined transmission pattern that is one of the plurality of transmission patterns (see the fifth transmission pattern).

In a case where an audio memo associated with a still image or a moving image is transmitted from the imaging apparatus, the server apparatus 2 transfers the audio memo to the client terminal 3 at the time of the initial information transfer processing, so that the person in charge of the client terminal 3 can perform image selection by reproducing the audio memo. Therefore, it is possible to provide an environment in which more desirable image selection can be performed.

In the embodiment, the example has been described in which the server apparatus 2 performs processing of converting the audio information included in the associated information into text data and transmitting the text data to the client terminal 3 as transmission of a predetermined transmission pattern that is one of the plurality of transmission patterns (see the sixth transmission pattern).

In a case where an audio memo associated with a still image or a moving image is transmitted from the imaging apparatus, the server apparatus 2 converts the audio memo into text data and transfers the text data to the client terminal 3 in the initial information transfer processing. By converting into text data, the data amount can be made smaller than that of the audio information.

Furthermore, since the audio memo content is displayed by text, it is not necessary for the person in charge of the client terminal 3 to reproduce the audio memo, and it is possible to provide an environment in which image selection can be performed more easily.

In the embodiment, the example has been described in which the server apparatus 2 performs the switching processing according to the determination result of the communication status (see Switching Processing Example I).

By switching the transmission pattern according to a change in the communication status such as the communication speed of the transmission path of the network, the packet rate, the situation of 4G/5G, and the communication environment depending on the location of the imaging apparatus, image transfer according to the situation at that time can be realized.

In particular, in the transfer of an image of a sport, the communication environment can easily fluctuate outdoors. Furthermore, in a large-scale sports event, there are many reporters and the like, and congestion of a transmission path is also considered. Selecting an appropriate transmission pattern according to such a situation is suitable for maintaining an appropriate real-time transfer state.

The network state is likely to be assumed to change particularly between the imaging apparatus 1 and the server apparatus 2. This is because factors such as the position and movement of a camera operator, region, location, facility, and situation of the venue of an event such as sports are added.

Therefore, regarding the presence or absence of the transfer of the additional information, it is also conceivable to switch the transmission pattern from the viewpoint of the presence or absence of the transfer of the associated information for obtaining the additional information.

For example, in a case where additional information is obtained by image analysis, by switching between a case where a thumbnail image is requested to the imaging apparatus 1, a case where transmission of a thumbnail image is not required due to not obtaining the additional information, and the like, the data amount can be adjusted according to the communication status.

Furthermore, it is not limited to the switching processing between the transmission pattern (for example, the first or second transmission pattern) including the additional information and the transmission pattern (for example, the third to seventh transmission patterns) not including the additional information, and for example, the switching may be performed among the third to seventh transmission patterns according to the communication status. For example, switching is performed between the third transmission pattern and the fourth transmission pattern, or switching is performed between the fifth transmission pattern and the third transmission pattern.

Similarly, switching can be performed between the first transmission pattern and the second transmission pattern.

Furthermore, switching from one of the first to seventh transmission patterns to one of the eighth to tenth transmission patterns may be performed by switching from the still image transfer to the moving image transfer, and moreover, switching may be performed from the eighth transmission pattern to the tenth transmission pattern according to the communication status at the time of moving image transfer.

In the embodiment, the example has been described in which the server apparatus 2 performs the switching processing on the basis of the information of an imaging target a notification of which is given from the imaging apparatus 1 (see Switching Processing Example II).

Depending on the type of competition, additional information may not be appropriately obtained. For example, in a case where the additional information is a player name, the player name can be obtained by performing DB search from the date and time, place, and the like of imaging in a competition in which the schedule is determined, but there is a competition in which the player name cannot be obtained. Regarding an image of a competition regarding which the additional information cannot be acquired, performing processing of acquiring the additional information can reduce the processing efficiency. Therefore, it is preferable to switch the transmission pattern according to the information of the competition type as in Switching Processing Example II.

In the embodiment, the example has been described in which the server apparatus 2 performs processing of estimating an imaging target of the imaging apparatus 1 and performs the switching processing on the basis of the information of the estimated imaging target (see Switching Processing Example III).

There is a case where it is appropriate to switch the transmission pattern depending on the type of competition. For example, in Switching Processing Example III, the project information is registered in advance. Therefore, it is possible to estimate the competition type of an imaging target on the basis of the time information, the camera ID, the camera operator information, and the like in the meta information as the associated information of the image. By switching the transmission pattern by this processing of estimating, transfer suitable for the competition type can be executed.

In the embodiment, the example has been described in which the server apparatus 2 performs processing of notifying the client terminal 3 or the imaging apparatus 1 of the transmission pattern of the initial information transfer processing set by the switching processing (see Switching Processing Examples I, II, and III).

For example, the imaging apparatus 1 can set the content of information to be transmitted according to the notification of the transmission pattern. For example, it is possible to set whether the meta information is transmitted or the thumbnail image is transmitted in the first transmission, or what kind of meta information is transmitted.

Note that the switching processing includes not only switching between the transmission pattern for acquiring the additional information and the transmission pattern not doing it, but also, for example, switching as to which of the first to tenth transmission patterns to use, and further includes a pattern of whether or not to perform or not to perform the initial information transfer processing in the first to tenth transmission patterns. For example, the main image can be transferred from the beginning without performing the initial information transfer processing according to the communication status or the like. Therefore, notifying the imaging apparatus 1 of the transmission pattern is useful for cooperation control.

Furthermore, by notifying the client terminal 3 of the transmission pattern of the initial information transfer processing, for example, display as illustrated in FIG. 31 becomes possible, and the person in charge can easily understand what kind of transfer is being performed.

In the embodiment, the example has been described in which the associated information is the meta information associated with the image captured by imaging apparatus 1.

That is, it is information associated with an image on the imaging apparatus 1 side and transmitted to the server apparatus 2. For example, various types of information are assumed, such as information of the imaging apparatus 1, information of the camera operator, information of an image capturing place and time, image analysis information on the imaging apparatus 1 side, various parameters regarding imaging operation and processing, sensing information of various sensors in the imaging apparatus 1 at the time of image capturing, information regarding image data/file, a thumbnail image, a screen nail image, and text information and audio memo information associated with an image by the camera operator.

These pieces of meta information are information useful for presenting the image content and obtaining additional information about the image.

In the embodiment, the example has been described in which the associated information is an image having a smaller data amount representing the image captured by the imaging apparatus 1.

Examples of the image having a smaller data amount include a thumbnail image, a screen nail image, a proxy moving image, and the like.

The thumbnail image, the proxy moving image, or the like as an image having a smaller data amount than the main image is extremely useful information, for example, for the person in charge of the client terminal 3 to determine the content of the main image. Furthermore, it is also useful as information for obtaining additional information by image analysis.

In the embodiment, the example has been described in which the associated information is an image representing grouped images continuously captured by the imaging apparatus 1 (see the seventh transmission pattern).

When a series of images by continuous capturing is set as grouped images, an image representing the whole of the grouped images as a single image, for example, a thumbnail image of the first image, or the like is set as associated information.

The grouped images by continuous imaging includes a large number of images and a large data amount, but have substantially the same image content of the subject. Therefore, it is desirable to be able to express an image with a representative thumbnail image or the like and transmit such a thumbnail image in the initial information transfer processing for improving processing efficiency and reducing a network load.

In the embodiment, the example has been described in which the associated information is audio information recorded together with a moving image by moving image capturing (see the ninth transmission pattern).

For example, in the initial information transfer processing, the server apparatus 2 receives a sound-only file recorded simultaneously at the time of moving image recording as the associated information, and transmits the information to the client terminal 3.

The audio information of the moving image is useful information for the person in charge of the client terminal 3 to listen to check the content of the moving image and specify the necessary scene.

In the embodiment, the example has been described in which the associated information is time-series data at the time of capturing a moving image (see the tenth transmission pattern).

The time-series data of the moving image is useful information for the person in charge of the client terminal 3 to check the content of the moving image and specify the necessary scene.

The example has been described in which, as the initial information transfer processing, the server apparatus 2 of the embodiment performs the processing of transmitting first associated information to the client terminal 3 with the additional information or without the additional information, the processing of transferring the request information generated by the selection processing in the client terminal 3 based on the transmission including the first associated information to the imaging apparatus 1, and the processing of transmitting second associated information transmitted from the imaging apparatus 1 to the client terminal 3 according to the request information (see the first to seventh, ninth, and tenth transmission patterns).

That is, as the initial information transfer processing, information transmission is performed a plurality of times before the main image is transmitted to the client terminal 3.

As the initial information transfer processing, for example, the server apparatus 2 transmits the meta information to the client terminal 3 in the first time to cause the client terminal 3 to perform rough selection, and transmits the thumbnail image in the second time to cause the client terminal 3 to perform final selection, and the like, so that it is possible to cause the client terminal 3 side to execute selection more appropriately and easily understandable for the person in charge without excessively increasing the data amount to be transferred.

Note that, in the embodiment, the example has been described in which transfer of mainly two round trips is performed as the initial information transfer processing, but as the initial information transfer processing before the transmission of the main image, only transfer of one round trip may be performed, or three or more round trips may be performed.

In the embodiment, the first associated information in a case where the initial information transfer processing is performed a plurality of times is information having a smaller data amount than the second associated information.

For example, an example is conceivable in which the first associated information is meta information indicating an imaging time, an imaging place, or the like, and the second associated information is a thumbnail image or the like.

In the first round trip of the initial information transfer processing, the first associated information, which indicates the imaging time, the imaging place, or the like and has a relatively small data amount, is transmitted to the client terminal 3, and it is possible to present information indicating many transferable images without increasing the transfer load. In the second round trip, for example, a thumbnail image or the like is transferred in order to present more detailed image content according to the first selection of the client terminal 3. Therefore, since it is only required to transfer the thumbnail images only for the images narrowed down to some extent, it is also possible to allow the person in charge of the client terminal 3 to more clearly understand the image content and to perform selection without increasing the transfer load.

The imaging apparatus 1 of the embodiment includes the camera control unit 18 that performs associated information transmission processing of transmitting, to the external server apparatus 2, associated information that is information associated with a captured image and has a smaller data amount than the image, and main image transmission processing of transmitting an image indicated by request information to the server apparatus 2 according to the request information received from the server apparatus 2.

Therefore, it is possible to realize the imaging apparatus 1 that performs an operation suitable for the image transfer system of the embodiment.

A program of the embodiment is a program that causes, for example, a CPU, a DSP, or the like, or a device including them to execute the processing of the server apparatus 2 described above.

That is, the program of the embodiment is a program for causing an information processing apparatus to execute: the initial information transfer processing of obtaining additional information on the basis of associated information and transmitting the associated information and the additional information to the client terminal 3 in response to reception of the associated information that is information associated with an image captured by the imaging apparatus 1 and has a smaller data amount than the image; and the main image transfer processing of transmitting an image transmitted from the imaging apparatus 1 to the client terminal 3 according to request information generated by selection processing in the client terminal 3 based on transmission of the associated information and the additional information.

With such a program, the server apparatus 2 described above can be realized by various computer apparatuses.

Furthermore, the program of the embodiment is a program that causes, for example, a CPU, a DSP, or the like, or a device including them to execute the processing of the imaging apparatus 1.

That is, the program is a program for causing a processor or the like as a control unit to execute: the associated information transmission processing of transmitting, to the external server apparatus 2, associated information that is information associated with a captured image and has a smaller data amount than the image, and the main image transmission processing of transmitting an image indicated by request information to the server apparatus 2 according to the request information received from the server apparatus 2.

With such a program, the imaging apparatus 1 described above can be realized.

Such programs can be recorded in advance in an HDD, which is a recording medium built in equipment such as a computer apparatus, or a ROM in a microcomputer having a CPU, and the like.

Alternatively, furthermore, it can be temporarily or permanently stored (recorded) in a removable recording medium including a flexible disc, a compact disc read only memory (CD-ROM), a magneto optical (MO) disc, a digital versatile disc (DVD), a Blu-ray disc (registered trademark), a magnetic disk, a semiconductor memory, a memory card, or the like. Such a removable recording medium can be provided as so-called package software.

Furthermore, such a program can be installed from a removable recording medium into a personal computer or the like, or can be downloaded from a download site via a network such as a local area network (LAN) or the Internet.

Furthermore, such a program is suitable for providing the server apparatus 2 or the imaging apparatus 1 of the embodiment in a wide range. For example, by downloading the program to a portable terminal apparatus such as a smartphone or a tablet, a mobile phone, a personal computer, game equipment, video equipment, a personal digital assistant (PDA), or the like, the smartphone or the like can be caused to function as the server apparatus 2 or the imaging apparatus 1 of the present disclosure.

Note that the effects described in the present description are merely illustrative and are not limitative, and other effects may be provided.

Note that the present technology may also adopt the configuration described below.

(1)

An information processing apparatus including:

a control unit that performs:

initial information transfer processing of obtaining additional information on the basis of associated information and transmitting the associated information and the additional information to a client terminal in response to reception of the associated information that is information associated with an image captured by an imaging apparatus and has a smaller data amount than the image; and main image transfer processing of transmitting an image transmitted from the imaging apparatus to the client terminal according to request information generated by selection processing in the client terminal based on transmission of the associated information or the additional information.

(2)

The information processing apparatus according to (1), in which the control unit obtains the additional information by performing database search on the basis of the associated information in the initial information transfer processing.

(3)

The information processing apparatus according to (1) or (2), in which the associated information includes an image having a smaller data amount and representing an image captured by the imaging apparatus, and the control unit obtains the additional information by image recognition processing on an image included in the associated information in the initial information transfer processing.

(4)

The information processing apparatus according to any of (1) to (3),
in which the control unit
performs, as the initial information transfer processing, switching processing of a plurality of transmission patterns including a transmission pattern to which the additional information is added and a transmission pattern to which the additional information is not added.

(5)

The information processing apparatus according to (4),
in which the control unit
performs processing of transmitting audio information included in the associated information to the client terminal as transmission of a predetermined transmission pattern that is one of the plurality of transmission patterns.

(6)

The information processing apparatus according to (4),
in which the control unit
performs processing of transmitting, to the client terminal, text data obtained by converting audio information included in the associated information into text data as transmission of a predetermined transmission pattern that is one of the plurality of transmission patterns.

(7)

The information processing apparatus according to any of (4) to (6),
in which the control unit
performs the switching processing according to a determination result of communication status.

(8)

The information processing apparatus according to any of (4) to (7),
in which the control unit
performs the switching processing on the basis of information of an imaging target a notification of which is given from the imaging apparatus.

(9)

The information processing apparatus according to any of (4) to (8),
in which the control unit
performs processing of estimating an imaging target of the imaging apparatus and performs the switching processing on the basis of information of the estimated imaging target.

(10)

The information processing apparatus according to any of (4) to (9),
in which the control unit
performs processing of notifying the client terminal or the imaging apparatus of a transmission pattern of the initial information transfer processing set by the switching processing.

(11)

The information processing apparatus according to any of (1) to (10),
in which the associated information includes meta information associated with an image captured by the imaging apparatus.

(12)

The information processing apparatus according to any of (1) to (11),
in which the associated information includes an image having a smaller data amount representing an image captured by the imaging apparatus.

(13)

The information processing apparatus according to any of (1) to (12),
in which the associated information includes an image representing grouped images that are a plurality of images continuously captured by the imaging apparatus.

(14)

The information processing apparatus according to any of (1) to (13),
in which the associated information includes audio information recorded together with a moving image by moving image capturing by the imaging apparatus.

(15)

The information processing apparatus according to any of (1) to (14),
in which the associated information includes time-series data at a time of capturing of a moving image captured by the imaging apparatus.

(16)

The information processing apparatus according to any of (1) to (15),
in which, as the initial information transfer processing, the control unit performs
processing of transmitting first associated information to the client terminal with the additional information or without the additional information,
processing of transferring request information generated by selection processing in the client terminal based on transmission including the first associated information to the imaging apparatus, and
processing of transmitting second associated information transmitted from the imaging apparatus to the client terminal according to the request information.

(17)

The information processing apparatus according to (16),
in which the first associated information includes information having a smaller data amount than the second associated information.

(18)

An information processing method in which an information processing apparatus performs:
initial information transfer processing of obtaining additional information on the basis of associated information and transmitting the associated information and the additional information to a client terminal in response to reception of the associated information that is information associated with an image captured by an imaging apparatus and has a smaller data amount than the image; and
main image transfer processing of transmitting an image transmitted from the imaging apparatus to the client terminal according to request information generated by selection processing in the client terminal based on transmission of the associated information and the additional information.

(19)

An imaging apparatus including:
a control unit that performs:
associated information transmission processing of transmitting, to an external information processing apparatus, associated information that is information associated with a captured image and has a smaller data amount than the image; and
main image transmission processing of transmitting an image indicated by request information to the information processing apparatus according to the request information received from the information processing apparatus.

(20) An image transfer system that
enables information communication between an imaging apparatus and an information processing apparatus, and
enables information communication between the information processing apparatus and a client terminal,
the imaging apparatus including:
a control unit that performs
associated information transmission processing of transmitting, to the information processing apparatus, associated information that is information associated with a captured image and has a smaller data amount than the image, and
main image transmission processing of transmitting, to the information processing apparatus, an image indicated by request information according to the request information generated by selection processing in the client terminal that has received the associated information via the information processing apparatus and received via the information processing apparatus,
the information processing apparatus including:
a control unit that performs
initial information transfer processing of obtaining additional information on the basis of the associated information and transmitting the associated information and the additional information to the client terminal in response to reception of the associated information from the imaging apparatus, and
main image transfer processing of transmitting an image transmitted from the imaging apparatus to the client terminal according to the request information.

REFERENCE SIGNS LIST

1 Imaging apparatus
2 Server apparatus
2a Control unit
3 Client terminal
4 Base station
5 MEC
6 Network
7 DB
8 Text conversion engine
18 Camera control unit
70 Information processing apparatus
71 CPU

The invention claimed is:

1. An information processing apparatus comprising:
a control unit that performs:
initial information transfer processing of obtaining additional information on a basis of associated information and transmitting the associated information and the additional information to a client terminal in response to reception of the associated information that is information associated with an image captured by an imaging apparatus and has a smaller data amount than the image;
main image transfer processing of transmitting an image transmitted from the imaging apparatus to the client terminal according to request information generated by selection processing in the client terminal based on transmission of the associated information or the additional information; and as the initial information transfer processing, switching processing of a plurality of transmission patterns including a transmission pattern to which the additional information is added and a transmission pattern to which the additional information is not added.

2. The information processing apparatus according to claim 1, wherein the control unit obtains the additional information by performing database search on a basis of the associated information in the initial information transfer processing.

3. The information processing apparatus according to claim 1, wherein
the associated information includes an image having a smaller data amount and representing an image captured by the imaging apparatus, and
the control unit obtains the additional information by image recognition processing on an image included in the associated information in the initial information transfer processing.

4. The information processing apparatus according to claim 1,
wherein the control unit
performs processing of transmitting audio information included in the associated information to the client terminal as transmission of a predetermined transmission pattern that is one of the plurality of transmission patterns.

5. The information processing apparatus according to claim 1,
wherein the control unit
performs processing of transmitting, to the client terminal, text data obtained by converting audio information included in the associated information into text data as transmission of a predetermined transmission pattern that is one of the plurality of transmission patterns.

6. The information processing apparatus according to claim 1,
wherein the control unit
performs the switching processing according to a determination result of communication status.

7. The information processing apparatus according to claim 1,
wherein the control unit
performs the switching processing on a basis of information of an imaging target a notification of which is given from the imaging apparatus.

8. The information processing apparatus according to claim 1,
wherein the control unit
performs processing of estimating an imaging target of the imaging apparatus and performs the switching processing on a basis of information of the estimated imaging target.

9. The information processing apparatus according to claim 1, wherein the control unit performs processing of notifying the client terminal or the imaging apparatus of a transmission pattern of the initial information transfer processing set by the switching processing.

10. The information processing apparatus according to claim 1, wherein the associated information includes meta information associated with an image captured by the imaging apparatus.

11. The information processing apparatus according to claim 1, wherein the associated information includes an image having a smaller data amount representing an image captured by the imaging apparatus.

12. The information processing apparatus according to claim 1, wherein the associated information includes an image representing grouped images that are a plurality of images continuously captured by the imaging apparatus.

13. The information processing apparatus according to claim 1, wherein the associated information includes audio information recorded together with a moving image by moving image capturing by the imaging apparatus.

14. The information processing apparatus according to claim 1, wherein the associated information includes time-series data at a time of capturing of a moving image captured by the imaging apparatus.

15. An information processing apparatus comprising:
a control unit that performs:
initial information transfer processing of obtaining additional information on a basis of associated information and transmitting the associated information and the additional information to a client terminal in response to reception of the associated information that is information associated with an image captured by an imaging apparatus and has a smaller data amount than the image; and
main image transfer processing of transmitting an image transmitted from the imaging apparatus to the client terminal according to request information generated by selection processing in the client terminal based on transmission of the associated information or the additional information,
wherein, as the initial information transfer processing, the control unit performs
processing of transmitting first associated information to the client terminal with the additional information or without the additional information,
processing of transferring request information generated by selection processing in the client terminal based on transmission including the first associated information to the imaging apparatus, and
processing of transmitting second associated information transmitted from the imaging apparatus to the client terminal according to the request information.

16. The information processing apparatus according to claim 15,
wherein the first associated information includes information having a smaller data amount than the second associated information.

17. An information processing method for an information processing apparatus, the information processing method comprising:
initial information transfer processing of obtaining additional information on a basis of associated information and transmitting the associated information and the additional information to a client terminal in response to reception of the associated information that is information associated with an image captured by an imaging apparatus and has a smaller data amount than the image;
main image transfer processing of transmitting an image transmitted from the imaging apparatus to the client terminal according to request information generated by selection processing in the client terminal based on transmission of the associated information and the additional information; and
as the initial information transfer processing, switching processing of a plurality of transmission patterns including a transmission pattern to which the additional information is added and a transmission pattern to which the additional information is not added.

18. A non-transitory computer readable medium storing program code, the program code being executable by a processor to perform operations comprising:
initial information transfer processing of obtaining additional information on a basis of associated information and transmitting the associated information and the additional information to a client terminal in response to reception of the associated information that is information associated with an image captured by an imaging apparatus and has a smaller data amount than the image;
main image transfer processing of transmitting an image transmitted from the imaging apparatus to the client terminal according to request information generated by selection processing in the client terminal based on transmission of the associated information and the additional information; and
as the initial information transfer processing, switching processing of a plurality of transmission patterns including a transmission pattern to which the additional information is added and a transmission pattern to which the additional information is not added.

19. A non-transitory computer readable medium storing program code, the program code being executable by a processor to perform operations comprising:
initial information transfer processing of obtaining additional information on a basis of associated information and transmitting the associated information and the additional information to a client terminal in response to reception of the associated information that is information associated with an image captured by an imaging apparatus and has a smaller data amount than the image;
main image transfer processing of transmitting an image transmitted from the imaging apparatus to the client terminal according to request information generated by selection processing in the client terminal based on transmission of the associated information or the additional information; and
performing, as the initial information transfer processing:
processing of transmitting first associated information to the client terminal with the additional information or without the additional information,
processing of transferring request information generated by selection processing in the client terminal based on transmission including the first associated information to the imaging apparatus, and
processing of transmitting second associated information transmitted from the imaging apparatus to the client terminal according to the request information.

* * * * *